US012199338B2

(12) United States Patent
Shams

(10) Patent No.: US 12,199,338 B2
(45) Date of Patent: Jan. 14, 2025

(54) CONTINUOUSLY STEERING PHASED ARRAY AND HEADLIGHT RADARS

(71) Applicant: BDCM A2 LLC, Dover, DE (US)

(72) Inventor: Soren Shams, Carlsbad, CA (US)

(73) Assignee: BDCM A2 LLC, Dover, DE (US)

( * ) Notice: Subject to any disclaimer, the term of this patent is extended or adjusted under 35 U.S.C. 154(b) by 169 days.

(21) Appl. No.: 17/204,675

(22) Filed: Mar. 17, 2021

(65) Prior Publication Data

US 2021/0296764 A1 Sep. 23, 2021

Related U.S. Application Data

(60) Provisional application No. 62/990,861, filed on Mar. 17, 2020.

(51) Int. Cl.
*H01Q 1/32* (2006.01)
*G01S 7/03* (2006.01)
(Continued)

(52) U.S. Cl.
CPC .......... *H01Q 1/3233* (2013.01); *G01S 7/032* (2013.01); *G01S 13/931* (2013.01); *H01Q 3/385* (2013.01);
(Continued)

(58) Field of Classification Search
CPC ...... H01Q 1/3233; H01Q 3/385; H01Q 21/08; H01Q 21/065; H01Q 21/24; H01Q 3/36; G01S 7/032; G01S 13/931; G01S 2013/93277; G01S 13/865; G01S 2013/93271
See application file for complete search history.

(56) References Cited

U.S. PATENT DOCUMENTS

2006/0267830 A1\* 11/2006 O'Boyle ............... G01S 13/931
340/436
2010/0008079 A1 1/2010 Brass et al.
(Continued)

FOREIGN PATENT DOCUMENTS

DE 102017109905 11/2018

OTHER PUBLICATIONS

P. Priyanka and O. C. Vishnu., "Sidelobe canceller system for phased array radar," 2011 12th International Radar Symposium (IRS), Leipzig, Germany, 2011, pp. 855-862. (Year: 2011).\*
(Continued)

*Primary Examiner* — Olumide Ajibade Akonai
*Assistant Examiner* — Yonghong Li
(74) *Attorney, Agent, or Firm* — Dinsmore & Shohl LLP

(57) ABSTRACT

Examples disclosed herein relate to a radar system for use in millimeter wave applications. The radar system includes a lighting device, such as a light bulb or an array of light emitting diodes (LEDs). The radar system further includes an array of transmit elements to transmit at least one transmit signal, where at least one transmit signal reflects off of at least one object to generate at least one receive signal. The array of transmit elements is configured around at least a first portion of a perimeter of the lighting device. Also, the radar system includes an array of receive elements to receive at least one receive signal, where the array of receive elements is configured around at least a second portion of the perimeter of the lighting device.

20 Claims, 31 Drawing Sheets

(51) Int. Cl.
*G01S 13/931* (2020.01)
*H01Q 3/38* (2006.01)
*H01Q 21/08* (2006.01)

(52) U.S. Cl.
CPC .... *H01Q 21/08* (2013.01); *G01S 2013/93277* (2020.01)

(56) References Cited

U.S. PATENT DOCUMENTS

| | | |
|---|---|---|
| 2011/0279304 A1 | 11/2011 | Yonemoto et al. |
| 2012/0050128 A1 | 3/2012 | Olson et al. |
| 2013/0194126 A1* | 8/2013 | Paoletti ................... G01S 13/87 342/55 |
| 2014/0132449 A1* | 5/2014 | Roper ................... H01Q 3/2635 342/368 |
| 2016/0291146 A1* | 10/2016 | Wang .................... G01S 13/867 |
| 2018/0348365 A1 | 12/2018 | Achour et al. |
| 2019/0041493 A1 | 2/2019 | Greenberg et al. |
| 2019/0074588 A1 | 3/2019 | Scarborough et al. |
| 2019/0243378 A1* | 8/2019 | Satyavolu ............ G05D 1/0088 |

OTHER PUBLICATIONS

R. S. Narasimhan, A. Vengadarajan and K. R. Ramakrishnan, "Mitigation of sidelobe clutter discrete using sidelobe blanking technique in airborne radars," 2018 IEEE Aerospace Conference, Big Sky, MT, USA, 2018, pp. 1-12, doi: 10.1109/AERO.2018.8396403 (Year: 2018).*

\* cited by examiner

CONTINUOUSLY STEERING PHASED ARRAY AND HEADLIGHT RADARS

CROSS-REFERENCE TO RELATED APPLICATIONS

This application claims priority from U.S. Provisional Application No. 62/990,861, filed on Mar. 17, 2020, and incorporated by reference in its entirety.

FIELD OF INVENTION

The present application relates to phased array radar systems, and in particular, to continuously steering phased array radar systems and integrated radar systems.

BACKGROUND

In a wireless transmission system, such as radar or cellular communications, the size of the antenna is determined by the transmission characteristics. With the widespread application of wireless applications, the footprint and other parameters allocated for a given antenna, or radiating structure, are constrained. In addition, the demands on the capabilities of the antenna continue to increase, such as increased bandwidth, finer control, increased range and so forth. In automated applications, such as self-driving vehicles, the radar and other sensors are expected to scan the environment of the vehicle with sufficient speed to enable instructions to be provided to the vehicle within a fast response time.

Phased array antennas form a radiation pattern by combining signals from a number of antenna elements and controlling the phase and amplitude of each element. The antenna or radiating elements are arranged in an array, or sub-arrays, and typically include patches in a patch antenna configuration, a dipole, or a magnetic loop, among others. The relative phase between each radiating element can be fixed or adjusted by employing phase shifters coupled to each element. The direction of the beam generated by the antenna is controlled by changing the phase of the individual elements.

BRIEF DESCRIPTION OF THE DRAWINGS

The present application may be fully appreciated in connection with the following detailed description taken in conjunction with the accompanying drawings, which are not drawn to scale and in which like reference characters refer to like parts throughout, and wherein.

DETAILED DESCRIPTION

Figure 1:
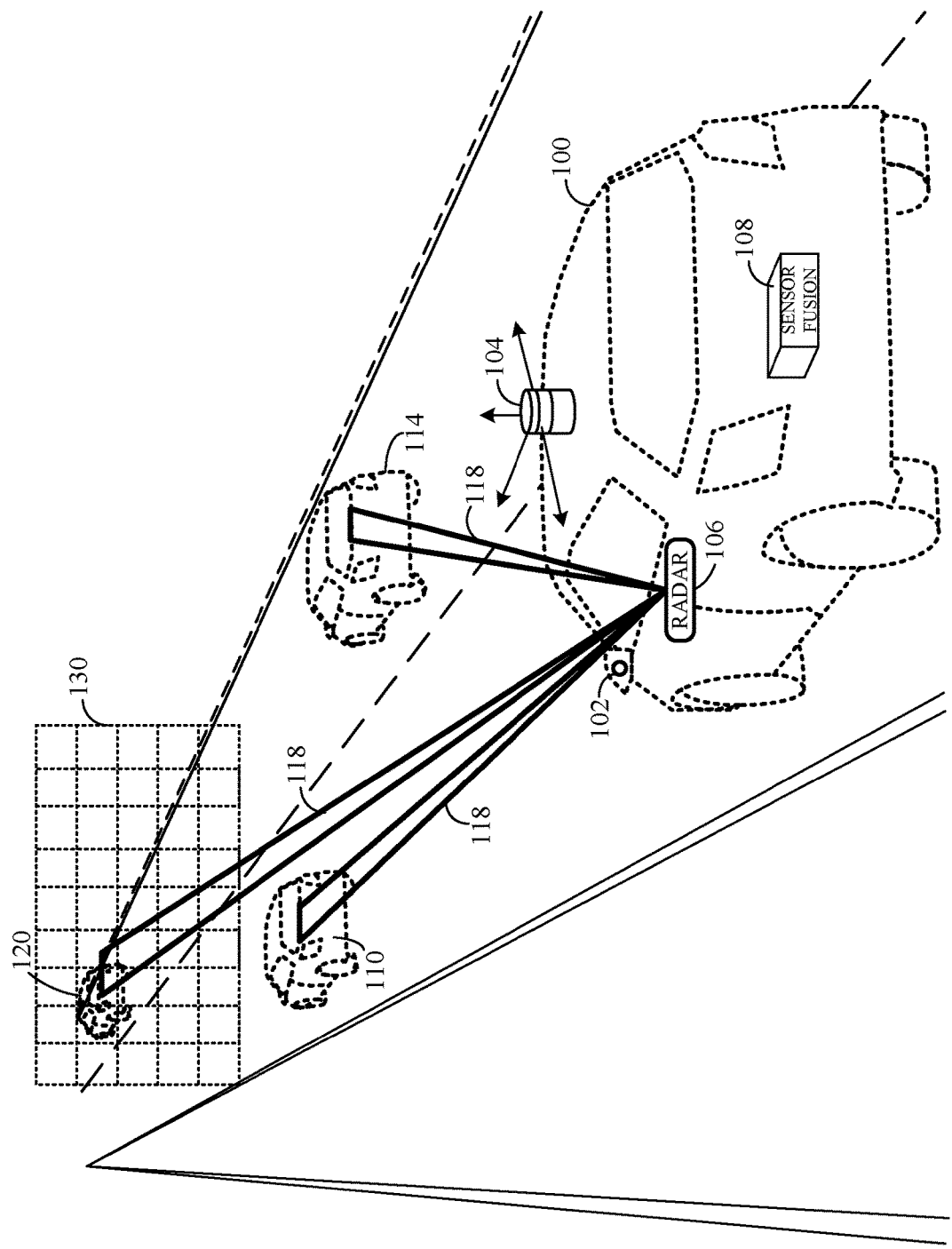
FIG. 1 illustrates an example environment in which a beam steering radar in an autonomous vehicle is used to detect and identify objects, according to various implementations of the subject technology.

Two-dimensional (2D) phased array antennas offer pencil beams with scanning capabilities in both U and V planes. To achieve a specific beam width in the azimuth and elevation planes, antenna elements are formed in a grid with N and M elements in the azimuth and elevation directions for a total of N×M elements. Radar systems based on planar 2D arrays utilize an outgoing pencil beam for transmitter (TX) U/V scanning to a target and an incoming pencil beam for receiver (RX) U/V scanning from a target, which offers higher gain at the expense of much higher cost and complexity in terms of N×M Radio Frequency (RF) channels for each RX and TX antenna and translates into a total number of 2×N×M RF channels. In this respect, a symmetric beam width in elevation and azimuth planes (M=N) requires $2N^2$ RF channels. This number of RF channels needed for 2D phased array antenna creates a challenging burden in terms of size, complexity and cost.

The present disclosure provides for a 2D radar for millimeter wave applications that significantly reduces the number of RF channels needed to provide 2D beam scanning and to meet beam width requirements. For example, the subject technology utilizes N and M RF channels for RX and TX antennas, respectively, to provide similar multiplied beam-width. This amounts to a total number of N+M RF channels (2N for symmetric azimuth and elevation beam widths), which is significantly fewer than that of 2D phased array antennas. This results in significant savings in terms of size, cost and complexity. The TX beam scanning utilizes an outgoing fan beam for scanning one axis (e.g., U-axis) to a target at a first scan rate and the RX beam scanning utilizes an incoming fan beam for scanning the other axis (e.g., V-axis) from the target at a second scan rate, where the RX and TX fan beams are perpendicular. In this respect, fan beams offer significantly lower cost and more simplified system design with lower gain. In some embodiments, the Total Radiated Power (TRP) can be increased to an Effective Isotropic Radiated Power (EIRP) threshold to compensate for the lower gain.

In some implementations, an antenna structure of the two-dimensional radar includes a transmit array arranged along a first axis and configured to scan a field of view (FoV) along the first axis at a first scan rate with radio frequency (RF) beams in a first polarization, and a receive array arranged along a second axis orthogonal to the first axis and configured to receive return RF beams in the first polarization to scan the FoV along the second axis at a second scan rate different from the first scan rate. The various examples described herein enable a radar system to transmit signals along one axis and receive signals along another axis. In the disclosed examples, the geometries of the transmit and receive antennas are orthogonal. In some implementations, the receive antenna can be designed to receive return RF beams in both first and second polarizations separately to speed up the system performance, where the receive antenna operating in the second polarization can be synchronized with the transmit antenna operating in the second polarization to have a coarse scan at either the U-axis or V-axis.

The subject technology is applicable in wireless communication and radar applications, and, in particular, those incorporating meta-structures capable of manipulating electromagnetic waves using engineered radiating structures. For example, the present disclosure provides for antenna structures having Meta-Structure (MTS) elements and arrays. There are structures and configurations within a feed network to the MTS elements that increase performance of the antenna structures in many applications, including vehicular radar modules. In various examples, the MTS elements include metamaterial elements.

Metamaterials derive their unusual properties from structure rather than composition and they possess exotic properties not usually found in nature. The metamaterials are structures engineered to have properties not found in nature. The metamaterial antennas may take any of a variety of forms, some of which are described herein for comprehension; however, this is not an exhaustive compilation of the possible implementations of the present disclosure. Metamaterials are typically arranged in repeating patterns. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

The subject technology relates to smart active antennas with unprecedented capability of manipulating Radio Frequency (RF) waves to scan an entire environment in a fraction of the time of current systems. The subject technology also relates to smart beam steering and beam forming using MTS radiating structures in a variety of configurations, in which electrical changes to the antenna are used to achieve phase shifting and adjustment reducing the complexity and processing time and enabling fast scans of up to an approximately 360° FoV for both long- and short-range object detection. The subject technology uses radar to provide information for 2D image capability as they measure range and azimuth angle, providing distance to an object and azimuth angle identifying a projected location on a horizontal plane, respectively, without the use of large antenna elements.

The present disclosure relates to radiating structures, such as for radar and cellular antennas, that provide enhanced phase shifting of the transmitted signal to achieve transmission in the autonomous vehicle communication and detection spectrum, which in the US is approximately 77 gigahertz (GHz) and has a 5 GHz range, specifically, 76 GHz to 81 GHz, to reduce the computational complexity of the system, and to increase the transmission speed. The disclosure is not limited to these applications and may be readily employed in other antenna applications, such as wireless communications, 5G cellular, fixed wireless and so forth. In some implementations, the present disclosure accomplishes these goals by taking advantage of the properties of MTS elements coupled with novel feed structures.

Autonomous driving is quickly moving from the realm of science fiction to becoming an achievable reality. Already in the market are Advanced-Driver Assistance Systems (ADAS) that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

The present disclosure relates to automotive radar sensors capable of reconstructing the world around them and are effectively a radar "digital eye," having true three-dimensional (3D) vision and capable of human-like interpretation of the world. For example, the subject technology supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered, in one example, within 30 meters of a vehicle, such as to detect a person in a cross walk directly in front of the vehicle; and long-range is considered, in one example, to be 250 meters or more, such as to detect approaching cars on a highway.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100 but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., less than 100 m). Detecting both vehicles in a short amount of time and with enough range and velocity resolution is imperative for full autonomy of driving functions of the ego vehicle. The radar 106 has an adjustable Long-Range Radar (LRR) mode that enables the detection of long-range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain but can make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
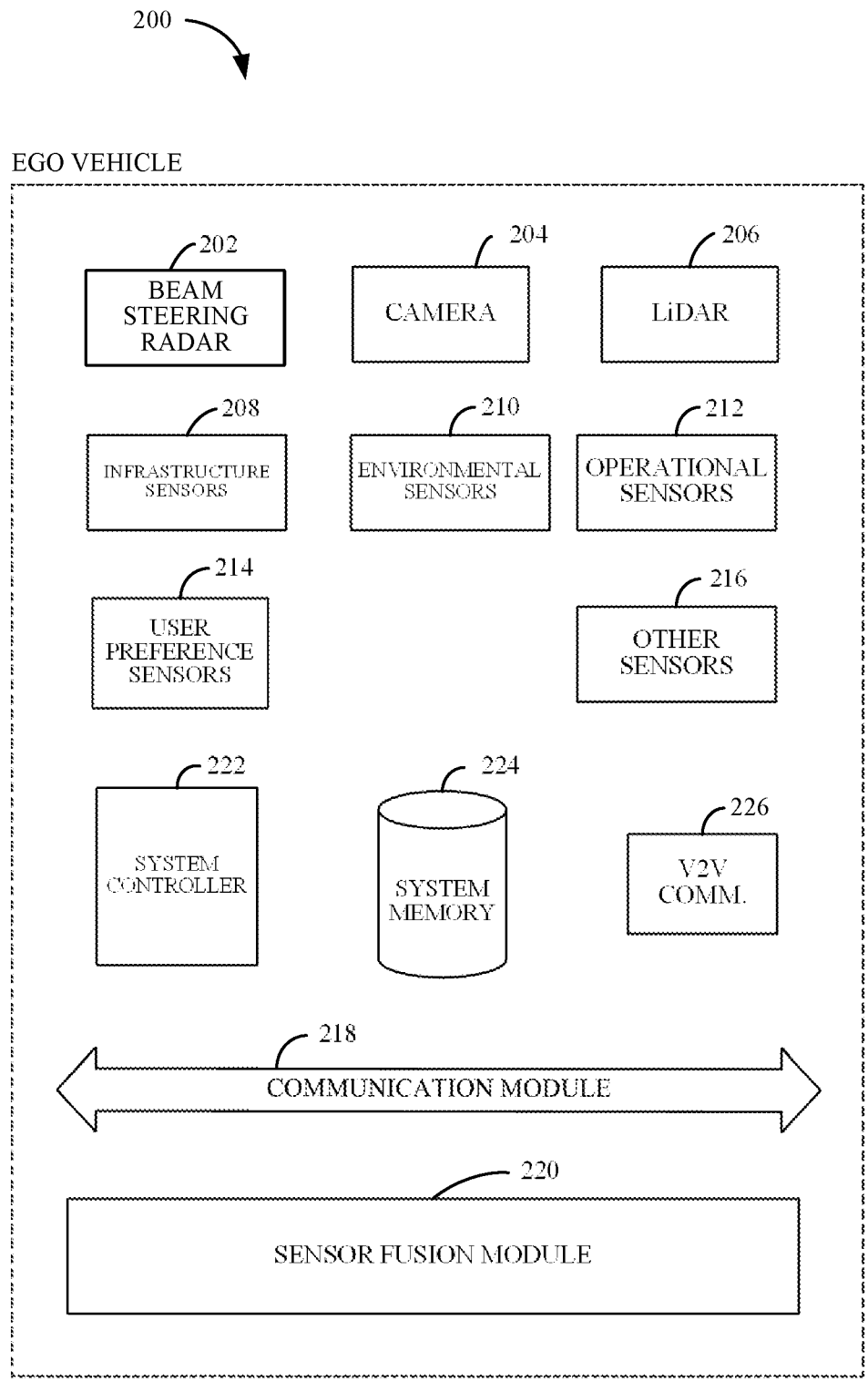
FIG. 2 illustrates a schematic diagram of an autonomous driving system for an ego vehicle (e.g., an autonomous vehicle) in accordance with various implementations of the subject technology.

Attention is now directed to FIG. 2, which illustrates a schematic diagram of an autonomous driving system 200 for an ego vehicle in accordance with various implementations of the subject technology. The autonomous driving system 200 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a radar system 202 and other sensor systems such as camera 204, lidar 206, infrastructure sensors 208, environmental sensors 210, operational sensors 212, user preference sensors 214, and other sensors 216. The autonomous driving system 200 also includes a communications module 218, a sensor fusion module 220, a system controller 222, a system memory 224, and a Vehicle-to-Vehicle (V2V) communications module 226. It is appreciated that this configuration of the autonomous driving system 200 is an example configuration and not meant to be limiting to the specific structure illustrated in FIG. 2. Additional systems and modules not shown in FIG. 2 may be included in autonomous driving system 200.

In various examples, the beam steering radar 202 includes at least one beam steering antenna for providing dynamically controllable and steerable beams that can focus on one or multiple portions of a 360° FoV of the vehicle. The beams radiated from the beam steering antenna are reflected from objects in the vehicle's path and surrounding environment and received and processed by the radar 202 to detect and identify the objects. The radar 202 includes a perception module that is trained to detect and identify objects and control the radar module as desired. The camera 204 and lidar 206 may also be used to identify objects in the path and surrounding environment of the ego vehicle, albeit at a much lower range.

Infrastructure sensors 208 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, among others. Operational sensors 212 provide information about the functional operation of the vehicle. This may be tire pressure, fuel levels, brake wear, and so forth. The user preference sensors 214 may detect conditions that are part of a user preference. This may be temperature adjustments, smart window shading, etc. Other sensors 216 may include additional sensors for monitoring conditions in and around the ego vehicle.

In various examples, the sensor fusion module 220 optimizes these various functions to provide an approximately comprehensive view of the ego vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in the radar 202 to adjust the scan parameters of the radar 202 to avoid these other signals and minimize interference.

In another example, environmental sensor 210 may detect that the weather is changing, and/or visibility is decreasing. In this situation, the sensor fusion module 220 may determine to configure the other sensors to improve the ability of the vehicle to navigate in these new conditions. The configuration may include turning off the camera 204 and/or the lidar 206 or reducing the sampling rate of these visibility-based sensors. This effectively places reliance on the sensor(s) adapted for the current situation. In response, the perception module configures the radar 202 for these conditions as well. For example, the radar 202 may reduce the beam width to provide a more focused beam, and thus a finer sensing capability.

In various examples, the sensor fusion module 220 may send a direct control to the radar 202 based on historical conditions and controls. The sensor fusion module 220 may also use some of the sensors within the autonomous driving system 200 to act as feedback or calibration for the other sensors. In this way, the operational sensor 212 may provide feedback to the perception module and/or to the sensor fusion module 220 to create templates, patterns and control scenarios. These are based on successful actions or may be based on poor results, where the sensor fusion module 220 learns from past actions.

Data from the sensors 202, 204, 206, 208, 210, 212, 214, 216 may be combined in the sensor fusion module 220 to improve the target detection and identification performance of autonomous driving system 200. The sensor fusion module 220 may itself be controlled by the system controller 222, which may also interact with and control other modules and systems in the ego vehicle. For example, the system controller 222 may power on or off the different sensors 202, 204, 206, 208, 210, 212, 214, 216 as desired, or provide instructions to the ego vehicle to stop upon identifying a driving hazard (e.g., deer, pedestrian, cyclist, or another vehicle suddenly appearing in the vehicle's path, flying debris, etc.).

All modules and systems in the autonomous driving system 200 communicate with each other through the communication module 218. The system memory 224 may store information and data (e.g., static and dynamic data) used for operation of the autonomous driving system 200 and the ego vehicle using the autonomous driving system 200. The V2V communications module 226 is used for communication with other vehicles. The V2V communications module 226 may also obtain information from other vehicles that is non-transparent to the user, driver, or rider of the ego vehicle, and may help vehicles coordinate with one another to avoid any type of collision.

Figure 3:
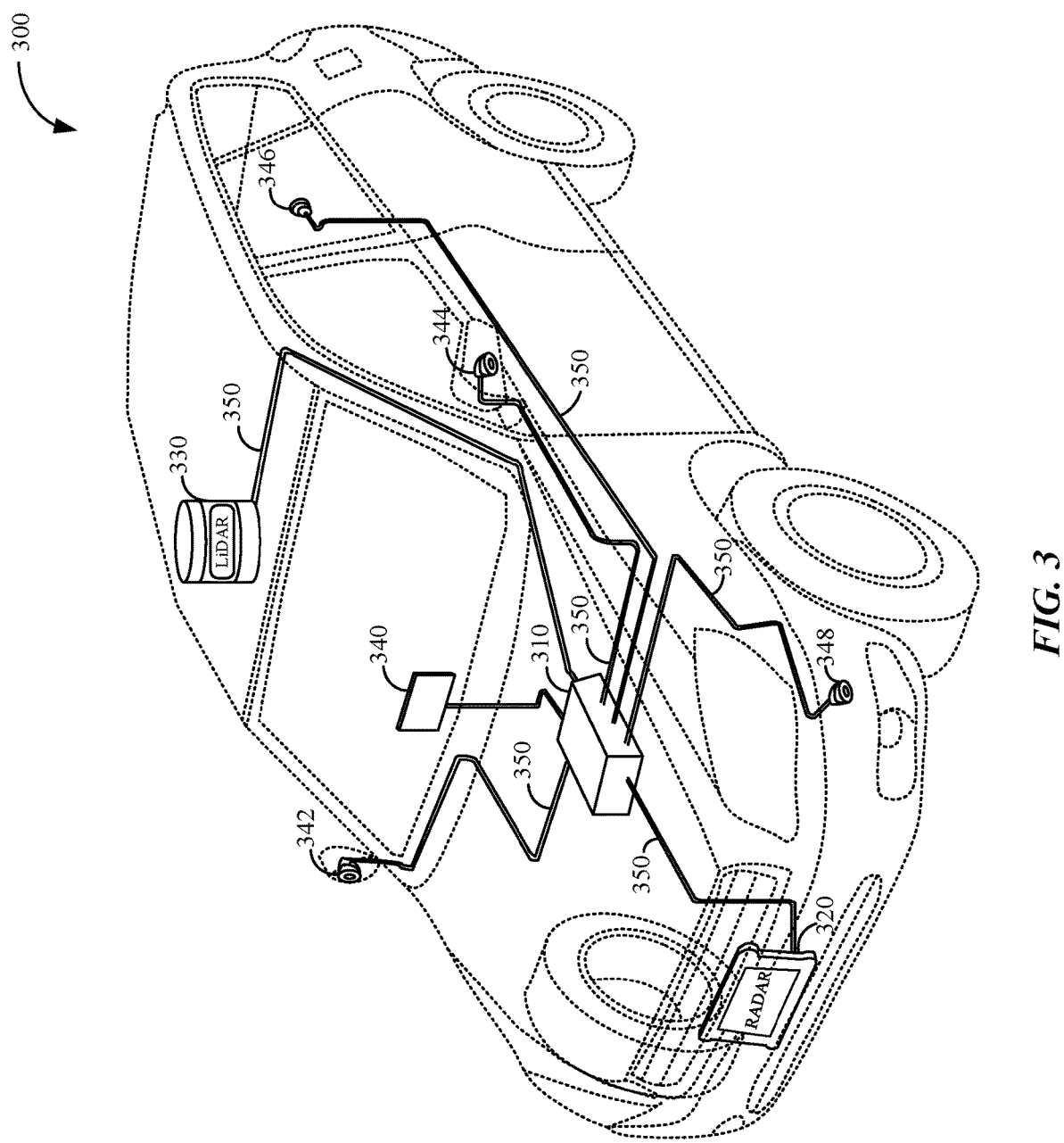
FIG. 3 illustrates an example network environment in which a radar system may be implemented in accordance with one or more implementations of the subject technology.

FIG. 3 illustrates an example network environment 300 in which a radar system may be implemented in accordance with one or more implementations of the subject technology. The example network environment 300 includes a number of electronic devices 320, 330, 340, 342, 344, 346, and 348 that are coupled to an electronic device 310 via the transmission lines 350. The electronic device 310 may communicably couple the electronic devices 342, 344, 346, 348 to one another. In one or more implementations, one or more of the electronic devices 342, 344, 346, 348 are communicatively coupled directly to one another, such as without the support of the electronic device 310. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 350 include wired transmission lines such as Ethernet transmission lines (e.g., 802.3) or wireless transmission lines such as WiFi (e.g., 802.11) or Bluetooth (e.g., 802.15). In this respect, the electronic devices 320, 330, 340, 342, 344, 346, 348 and 310 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 310 may be, or may include, a switch device, a routing device, a hub device, or generally any device that may communicably couple the electronic devices 320, 330, 340, 342, 344, 346, and 348.

In one or more implementations, at least a portion of the example network environment 300 is implemented within a vehicle, such as a passenger car, truck, or bus. For example, the electronic devices 342, 344, 346, 348 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 3, the electronic device 310 is depicted as a central processing unit, the electronic device 320 is depicted as a radar system, the electronic device 330 is depicted as a LiDAR system, the electronic device 340 is depicted as an entertainment interface unit, and the electronic devices 342, 344, 346, 348 are depicted as camera devices, such as forward-view, rear-view and side-view cameras. In one or more implementations, the electronic device 310 and/or one or more of the electronic devices 342, 344, 346, 348 may be communicatively coupled to a public communication network, such as the Internet. In some implementations, the radar system 320 is, or includes at least a portion of, a license plate frame with two-dimensional beam scanning for automotive radar applications as will be discussed in more detail below.

Figure 4:
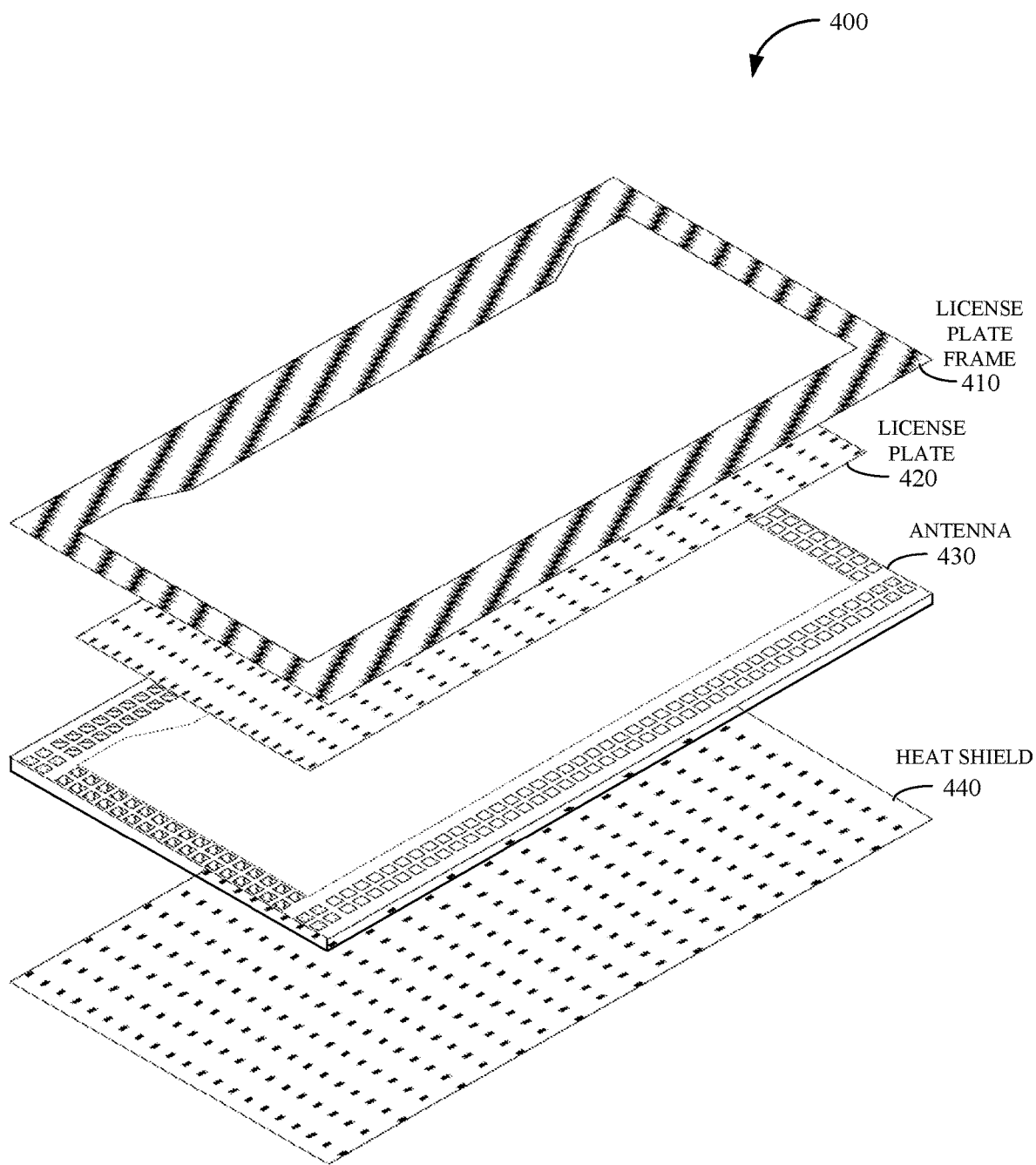
FIG. 4 illustrates an exploded perspective view of an example vehicle license plate frame integrated with a radar system in accordance with some implementations of the subject technology.

FIG. 4 illustrates an exploded perspective view of an example vehicle license plate frame 400 integrated with a radar system in accordance with some implementations of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The vehicle license plate frame 400 includes a license plate frame 410 and an antenna 430. In some implementations, the radar system 320 of FIG. 3 is, or includes at least a portion of, the antenna 430. In some embodiments, the license plate frame 410 may be fabricated with a dielectric material or a non-conductive material serving as a cover or radome for the antenna 430 as well as a fastener for license plate 420, where the antenna 430 may be a printed circuit board. The antenna 430 may be mechanically coupled to a back surface of the license plate frame 410. In some embodiments, the antenna 430 may be non-permanently fastened to the license plate frame 410 with fasteners at corners of the license plate frame 410. In other implementations, the antenna 430 may be permanently fastened to the license plate frame 410 with an adhesive resin material. In still other implementations, the antenna 430 and the license plate frame 410 may be fabricated from a same material such that the antenna 430 and the license plate frame 410 are an integrated unit. The license plate 420 may be interposed between the antenna 430 and the license plate frame 410. For example, the license plate 420 may be inserted into a cavity formed when the license plate frame 410 and the antenna 430 are assembled (or mechanically coupled together). In some embodiments, the license plate frame 410 is, or includes at least a portion of, conformal slot antennas that are excited through coupling with the antenna 430.

In some embodiments, an enclosure (not shown) may be fabricated with conductive or metallic material that serves as a shield for the electronic components and RF circuitry in the antenna 430 that helps isolate electromagnetic interference to the antenna 430 (e.g., shield against any undesired radiation from feed network). In some embodiments, the license plate frame 410 has a thickness in a range of 2 mm to 3 mm, a width of about 160 mm and a length of about 312 mm, however, the dimensions of the license plate frame 410 may vary depending on implementation. In some implementations, the vehicle license plate frame 400 also includes a heat sink or heat shield 440 that helps reduce thermal heating at the antenna 430 and regulate thermal transfer throughout the vehicle license plate frame 400. In other implementations, the license plate 420 may serve as a heatsink to the antenna 430 in lieu of the heat sink 440. In some implementations, license plate frame 410 may include digital circuitry that electrically interacts with the antenna 430 for displaying visual indicators relating to the radar functionality of the antenna 430 (e.g., status indicators). In this respect, the antenna 430 may supply power to the license plate frame 410 through vias formed by means of the mechanical coupling or through a dedicated connector, between the license plate frame 410 and the antenna 430.

Figure 5:
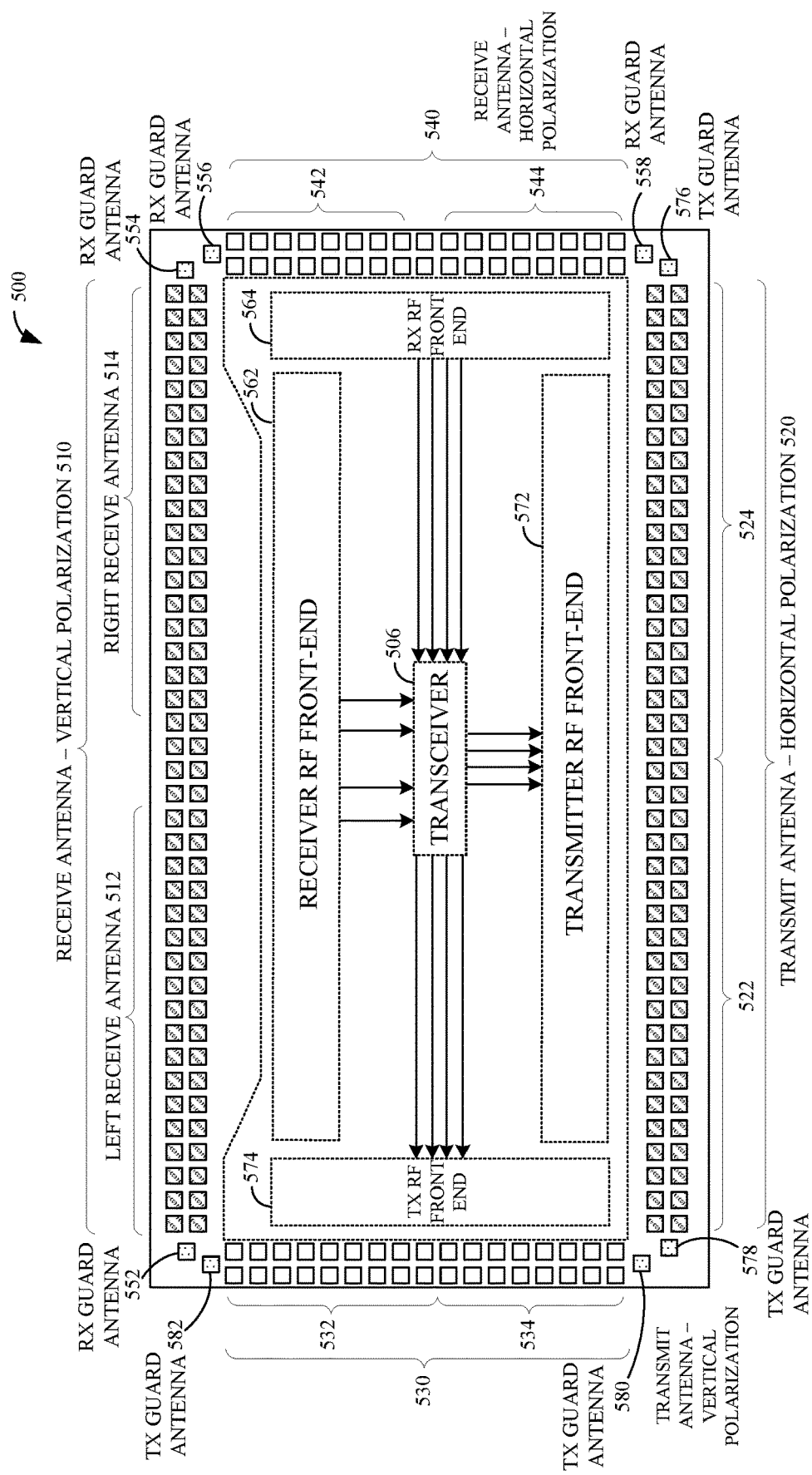
FIG. 5 illustrates a schematic diagram of a radar antenna for use in the vehicle license plate frame of FIG. 4 in accordance with some implementations of the subject technology.

FIG. 5 illustrates a schematic diagram of a radar antenna 500 for use in the vehicle license plate frame 400 of FIG. 4 in accordance with some implementations of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The radar antenna 500 includes multiple antenna arrays for transmission and reception at different polarizations. For example, the radar antenna 500 includes a receive antenna 510 with vertical polarization and a transmit antenna 530 with vertical polarization. The radar antenna 500 also includes a receive antenna 540 with horizontal polarization and a transmit antenna 520 with horizontal polarization. In this respect, the transmit antenna 520 can transmit RF beams in the azimuth direction and the receive antenna 540 can receive return RF beams over the azimuth direction, while the transmit antenna 530 can transmit RF beams in the elevation direction and the receive antenna 510 can receive return RF beams over the elevation direction. In some implementations, the receive antenna 510 includes a left receive antenna 512 and a right receive antenna 514 of which are arranged laterally along the top periphery of the antenna substrate. Similarly, the receive antenna 540 includes a top receive antenna 542 and a bottom receive antenna 544 of which are arranged laterally along the right-side periphery of the antenna substrate. In some embodiments, the left receive antenna 512 is separated by a predetermined distance from the right receive antenna 514, and the top receive antenna 542 is separated by a predetermined distance from the bottom receive antenna 544. In other implementations, the transmit antenna 520 includes a left transmit antenna 522 and a right transmit antenna 524 of which are arranged laterally along the bottom periphery of the antenna substrate. Similarly, the transmit antenna 530 includes a top transmit antenna 532 and a bottom transmit antenna 534 of which are arranged laterally along the left-side periphery of the antenna substrate. Although the transmit antennas 520 and 530 operate at orthogonal polarizations, the receive antennas 510 and 540 can receive both polarizations and pass the received RF signals to a transceiver 506 in separate channels to speed up the beam scan.

The receive antenna 510 is arranged orthogonal to the transmit antenna 530, while the receive antenna 540 is arranged orthogonal to the transmit antenna 520 (as well as orthogonal to the receive antenna 510). The transmit and receive antennas arrays are arranged in such a manner that aligns with the license plate frame (e.g., 410) layout. For example, the receive antenna 510 may be positioned along a top periphery of the antenna substrate, and the transmit antenna 530 may be positioned along a side periphery (e.g., left side) of the antenna substrate. Similarly, the receive antenna 540 may be positioned along a side periphery (e.g., right-side) of the antenna substrate, and the transmit antenna 520 may be positioned along a bottom periphery of the antenna substrate. Note that as illustrated, there are four antenna arrays 510, 520, 530 and 540. However, the radar antenna 500 may incorporate multiple other antenna arrays. In various examples, each antenna array may be for transmission and/or receiving of radiation patterns.

In some implementations, the radar antenna 500 includes receiver guard antennas 552, 554, 556 and 558 to serve as side lobe filters for the receive antennas 510 and 540. For example, the receiver guard antennas 552 and 554 are arranged proximate to the receive antenna 510. In particular, the receiver guard antenna 552 is arranged proximate to the left receive antenna 512 and the receiver guard antenna 554 is arranged proximate to the right receive antenna 514 such that the receiver guard antennas 552 and 554 are arranged on opposite ends of the receive antenna 510. In this respect, the receiver guard antennas 552 and 554 serve as side lobe filters for the left receive antenna 512 and the right receive antenna 514, respectively. In another example, the receiver guard antennas 556 and 558 are arranged proximate to the receive antenna 540. In particular, the receiver guard antenna 556 is arranged proximate to the top receive antenna 542 and the receiver guard antenna 558 is arranged proximate to the bottom receive antenna 544 such that the receiver guard antennas 556 and 558 are arranged on opposite ends of the receive antenna 540. In this respect, the receiver guard antennas 556 and 558 serve as side lobe filters for the left receive antenna 542 and the right receive antenna 544, respectively. In some implementations, the radar antenna 500 includes transmitter guard antennas 576, 578, 580, 582 for transmit side lobe cancelation with the transmit antennas 520 and 530. For example, the transmitter guard antennas 576 and 578 are arranged proximate to the transmit antenna 520. In particular, the transmitter guard antenna 576 is arranged proximate to the right transmit antenna 524 and the guard antenna 578 is arranged proximate to the left transmit antenna 522 such that the transmitter guard antennas 576 and 578 are arranged on opposite ends of the transmit antenna 520. In this respect, the transmitter guard antennas 576 and 578 serve as side lobe filters for the right transmit antenna 524 and the left transmit antenna 522, respectively. In another example, the transmitter guard antennas 580 and 582 are arranged proximate to the transmit antenna 530. In particular, the transmitter guard antenna 580 is arranged proximate to the bottom transmit antenna 534 and the guard antenna 582 is arranged proximate to the top transmit antenna 532 such that the transmitter guard antennas 580 and 582 are arranged on opposite ends of the transmit antenna 530. In this respect, the transmitter guard antennas 580 and 582 serve as side lobe filters for the bottom transmit antenna 534 and the top transmit antenna 532, respectively.

As illustrated in FIG. 5, the receive arrays 510 and 540 and the transmit arrays 520 and 530 are coupled to the transceiver 506 and are configured such that their radiation beams are orthogonal to each other. In some embodiments, orthogonal beams can be achieved through orthogonal linear or circular polarization, encoding, chirps or different frequencies. For each transmit and receive pairing, one array scans the vertical angles of the field of view (or U axis), while the other array scans the horizontal angles of the field of view (or V axis). For example, the receive antenna 510 and the transmit antenna 530 may be paired together to scan the U-V axis with radiation beams in the vertical polarization. The receive antenna 510 may be coupled to receiver RF front end 562 and the transmit antenna 530 may be coupled to transmitter RF front end 574. In this respect, the outgoing RF signaling from the transceiver 506 is driven to the transmitter RF front end 574 for radiating through the transmit antenna 530 and return RF signaling received by the receive antenna 510 is driven to the transceiver 506 by the receiver RF front end 562 for processing. In another example, the receive antenna 540 and the transmit antenna 520 may be paired together to scan the U-V axis with radiation beams in the horizontal polarization. The receive antenna 540 may be coupled to receiver RF front end 564 and the transmit antenna 520 may be coupled to transmitter RF front end 572. In this respect, the outgoing RF signaling from the transceiver 506 is driven to the transmitter RF front end 572 for radiating through the transmit antenna 520 and return RF signaling received by the receive antenna 540 is driven to the transceiver 506 by the receiver RF front end 564 for processing. In some embodiments, the receiver RF front ends 562 and 564 may include low-noise amplifiers, phase shift elements, analog-to-digital converters, combination networks and other receiver circuitry along the receive chain to the transceiver 506. In some embodiments, the transmitter RF front ends 572 and 574 may include power amplifiers, phase shift elements, feed networks, and other transmitter circuitry along the transmit chain to the transmit antennas 520 and 530.

In some implementations, the number of receiver inputs to the transceiver 506 from either of the two receive arrays may vary depending on the linear array size of the receiver antennas. For example, there may be four groups of 32 elements for a 128-element linear array, which can produce four inputs to the transceiver 506. In another example, there may be eight (8) groups of 16 elements for the 128-element linear array, which can produce eight inputs to the transceiver 506. In still another example, there may be two groups of 32 elements for a 64-element linear array, which can produce two inputs to the transceiver 506. In yet another example, there may be four groups of 16 elements for the 64-element linear array, which can produce four inputs to the transceiver 506. This antenna clustering can improve the overall system performance relying more on digital signal processing.

In some implementations, there is one transmitter output by the transceiver 506 to the transmit arrays in either polarizations (e.g., azimuth, elevation). In other implementations, the transceiver 506 may output more than one transmitter output to the transmit arrays for both polarizations.

In some implementations, each of the transmit and receive antennas can produce a shaped beam, such as a fan beam. In some implementations, the fan beam has a narrow beam-width in one dimension (e.g., about 10°, about 15°, about 20°, about 25°, or about 30° in elevation) and a wider beam-width in the other dimension (e.g., about 30°, about 35°, about 40°, about 45°, or about 50° in azimuth). To scan a direction, the phase shift elements apply a phase shift to the signaling on a corresponding transmission line to a transmit antenna or from a receive antenna to shape the output radiation beam in a target direction. The phase shifting enables the radar antenna 500 to scan in the vertical or elevation with one array while the other array is phase shifted to scan the horizontal or azimuth. For example, the receive antenna 540 is controlled by the transceiver 506 through the receiver RF front end 564 so that the receive antenna 540 scans the elevation angle range, and the transmit antenna 520 is controlled by the transceiver 506 through the transmitter RF front end 572 so that the transmit antenna 520 scans the azimuth angle range.

In some implementations, the scanning in the azimuth angle range is performed at a scan rate that is different from that in the elevation angle range. In particular, the scan rate along the azimuth angle range (or U-axis) is greater than the scan rate along the elevation angle range (or V-axis). For example, the scan rate along the elevation angle range may be about 10 Hz, while the scan rate along the azimuth angle range may be about 10 kHz. The scan rates along the azimuth and elevation angle ranges may vary depending on implementation. In some embodiments, the receive antenna 540 operates in conjunction with the transmit antenna 530 for one-dimensional (1D) scanning in the elevation plane, and concurrently, the receive antenna 510 operates in conjunction with the transmit antenna 520 for 1D scanning in the azimuth plane to perform a quick scan of the frame. In some implementations, the receive antennas (e.g., 510, 540) can operate to receive return RF beams in both polarizations.

Figure 6:
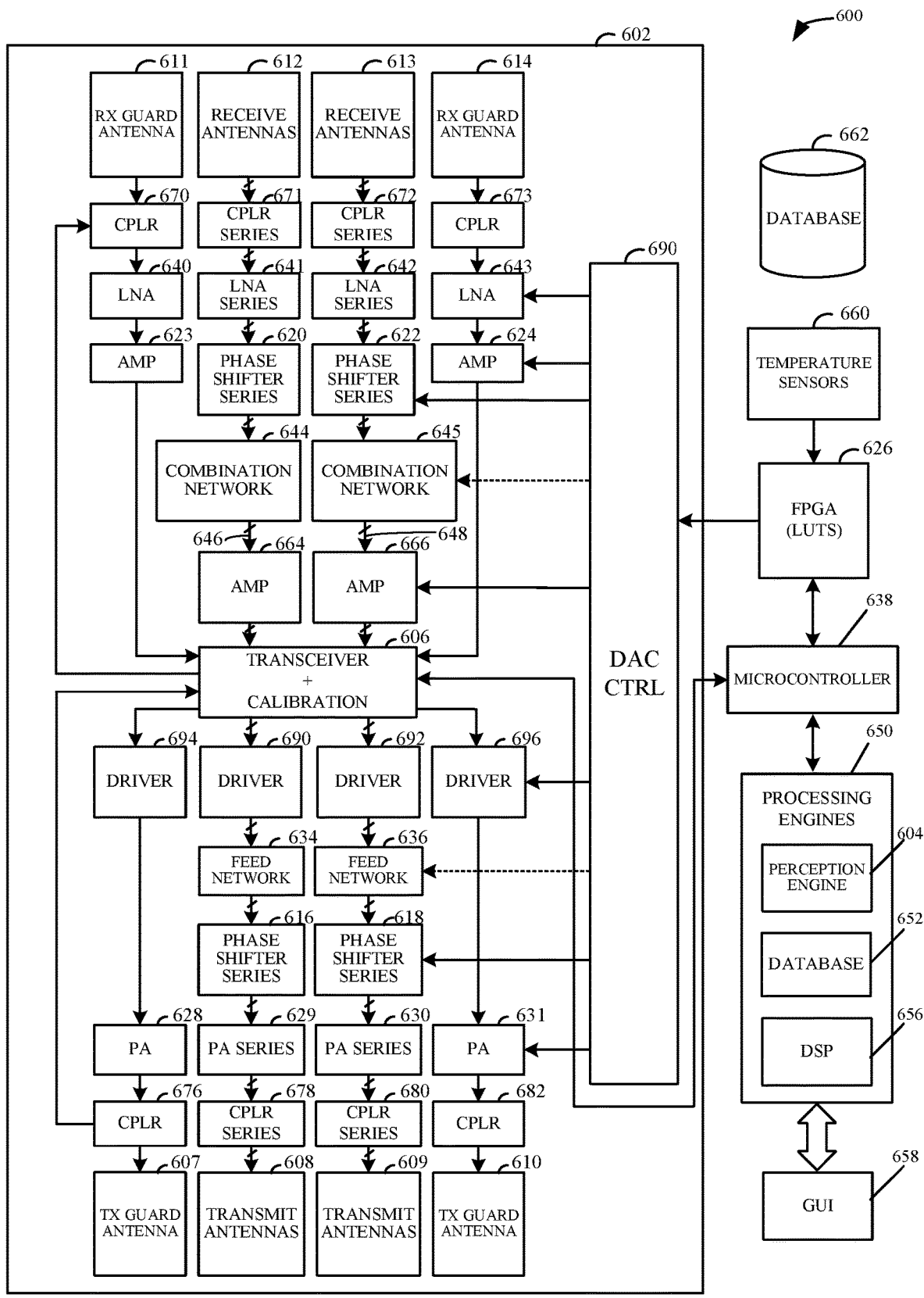
FIG. 6 illustrates a schematic diagram of a radar system in accordance with various implementations of the subject technology.

FIG. 6 illustrates a schematic diagram of a radar system 600 in accordance with various implementations of the subject technology. The radar system 600 includes a radar module 602 that comprises a receive chain and a transmit chain. The receive chain includes receive antennas 612 and 613, receive guard antennas 611 and 614, optional couplers 670-673, low-noise amplifiers (LNAs) 640-643, phase shifter (PS) circuits 620 and 622, amplifiers 623, 624, 664 and 666, and combination networks 644 and 645. The transmit chain includes drivers 690, 692, 694 and 696, feed networks 634 and 636, PS circuits 616 and 618, power amplifiers 628-631, optional couplers 676, 678, 680 and 682, transmit antennas 608 and 609, and transmit guard antennas 607 and 610. The radar module 602 also includes a transceiver 606, a digital-to-analog (DAC) controller 690, a Field-Programmable Gate Array (FPGA) 626, a microcontroller 638, processing engines 650, a General User Interface (GUI) 658, temperature sensors 660 and a database 662. The processing engines 650 includes perception engine 604, database 652 and Digital Signal Processor (DSP) 656. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, the transceiver 506 of FIG. 5 is, or includes at least a portion of the transceiver 606. The receive antenna 510 may correspond to receive antenna 612 and the receive antenna 540 may correspond to receive antenna 613. Receive guard antennas 552 and 554 may correspond to guard antennas 611 and 614. Additional guard antennas may be added to radar module 602 to correspond to receive guard antennas 556 and 558 of FIG. 5. In some examples, the receiver RF front end 562 of FIG. 5 includes at least the couplers 670, 671, the LNAs 640, 641, the PS circuit 620, the amplifiers 623, 664 and the combination network 644. In some examples, the receiver RF front end 564 of FIG. 5 includes the couplers 672, 673, the LNAs 642, 643, the PS circuit 622, the amplifiers 624, 666 and the combination network 645. In some examples, the transmitter RF front end 572 of FIG. 5 includes the couplers 676, 678, the power amplifiers 628, 629, the PS circuit 616, the feed network 634 and the drivers 690 and 694. In some examples, the transmitter RF front end 574 of FIG. 5 includes the couplers 680, 682, the power amplifiers 630, 631, the PS circuit 618, the feed network 636 and the drivers 692 and 696. In some implementations, the DAC controller 690 may be included in each of the receiver RF front ends 562, 564 and transmitter RF front ends 572, 574. In other implementations, the DAC controller 690 may be coupled to each of the receiver RF front ends 562, 564 and transmitter RF front ends 572, 574 as a separate circuit on the same printed circuit board as that of the RF front-end modules. In some implementations, the electronic device 310 of FIG. 3 may include one or more of the FPGA 626, the microcontroller 638, the processing engines 650, the temperature sensors 660 or the database 662. In some implementations, the electronic device 340 of FIG. 3 is, or includes at least a portion of, the GUI 658.

Radar module 602 is capable of both transmitting RF signals within a FoV and receiving the reflections of the transmitted signals as they reflect from objects in the FoV.

With the use of analog beamforming in radar module 602, a single transmit and receive chain can be used effectively to form a directional, as well as a steerable, beam. A transceiver 606 in radar module 602 can generate signals for transmission through a series of transmit antennas 608 and 609 as well as manage signals received through a series of receive antennas 612 and 613. In some implementations, the transmit antennas 608 include a first set of transmit antennas in a first polarization (e.g., transmit antenna 520) and the transmit antennas 609 include a second set of transmit antennas in a second polarization orthogonal to the first polarization (e.g., transmit antenna 530). For example, the transmit antennas 608 may be horizontal polarized and the transmit antennas 609 may be vertically polarized. Conversely, in other implementations, the transmit antennas 609 may be horizontally polarized and the transmit antennas 608 may be vertically polarized. In other examples, the transmit antennas 608 may be right hand circular polarized and the transmit antennas 609 may be left hand circular polarized. Similarly, the receive antennas 612 include a first set of receive antennas in a first polarization (e.g., receive antenna 510) and the receive antennas 613 include a second set of receive antennas in a second polarization (e.g., receive antenna 540). Beam steering within the FoV is implemented with phase shifter (PS) circuits 616 and 618 coupled to the transmit antennas 608 and 609, respectively, on the transmit chain and PS circuits 620 and 622 coupled to the receive antennas 612 and 613, respectively, on the receive chain. Careful phase and amplitude calibration of the transmit antennas 608, 609 and receive antennas 612, 613 can be performed in real-time with the use of couplers integrated into the radar module 602 as described in more detail below. In other implementations, calibration is performed before the radar is deployed in an ego vehicle and the couplers may be removed.

The use of PS circuits 616, 618 and 620, 622 enables separate control of the phase of each element in the transmit antennas 608, 609 and receive antennas 612, 613. Unlike early passive architectures, the beam is steerable not only to discrete angles but to any angle (i.e., from 0° to) 360° within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 600 with a significantly longer detection range.

The major challenge with implementing analog beam steering is to design PS circuits to operate at 77 GHz. PS circuits 616, 618 and 620, 622 solve this problem with a reflective PS design implemented with a distributed varactor network fabricated using suitable semiconductor materials, such as Gallium-Arsenide (GaAs) materials, among others. Each PS circuit 616, 618 and 620, 622 has a series of PSs, with each PS coupled to an antenna element to generate a phase shift value of anywhere from 0° to 360° for signals transmitted or received by the antenna element. The PS circuit design is scalable in future implementations to other semiconductor materials, such as Silicon-Germanium (SiGe) and CMOS, bringing down the PS circuit cost to meet specific demands of customer applications. Each PS circuit 616, 618 and 620, 622 is controlled by a Field Programmable Gate Array (FPGA) 626, which provides a series of voltages to the PSs in each PS circuit that results in a series of phase shifts.

The DAC controller 690 is coupled to each of the LNAs 640-643, the amplifiers 623, 624, 664, 666, PS circuits 616, 618, 620, 622, the drivers 690, 692, 694, 696, and the power amplifiers (PAS) 628-631. In some embodiments, the DAC controller 690 is coupled to the FPGA 626, and the FPGA 626 can drive digital signaling to the DAC controller 690 to provide analog signaling to the LNAs 640-643, the amplifiers 623, 624, 664, 666, PS circuits 616, 618, 620, 622, the drivers 690, 692, 694, 696, and the PAs 628-631. In some implementations, the DAC controller 690 is coupled to the combination networks 644, 645 and to the feed networks 634, 636.

In various examples, an analog control signal is applied to each PS in the PS circuits 616, 618 and 620, 622 by the DAC controller 690 to generate a given phase shift and provide beam steering. The analog control signals applied to the PSs in PS circuits 616, 618 and 620, 622 are based on voltage values that are stored in Look-up Tables (LUTs) in the FPGA 626. These LUTs are generated by an antenna calibration process that determines which voltages to apply to each PS to generate a given phase shift under each operating condition. Note that the PSs in PS circuits 616, 618 and 620, 622 can generate phase shifts at a very high resolution of less than one degree. This enhanced control over the phase allows the transmit and receive antennas in radar module 602 to steer beams with a very small step size, improving the capability of the radar system 600 to resolve closely located targets at small angular resolution.

In various examples, each of the transmit antennas 608, 609 and the receive antennas 612, 613 may be a meta-structure antenna, a phased array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 608, 609 and the receive antennas 612, 613 may be used to implement specific designs and meet specific constraints.

The transmit chain in the radar module 602 starts with the transceiver 606 generating RF signals to prepare for transmission over-the-air by the transmit antennas 608 and 609 in their respective polarization. The RF signals may be, for example, Frequency-Modulated Continuous Wave (FMCW) signals or chirps. An FMCW signal enables the radar system 600 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 606, the FMCW signals are fed to drivers 690 and 692. From the drivers 690 and 692, the signals are divided and distributed through feed networks 634 and 636, respectively, which form a power divider system to divide an input signal into multiple signals, one for each element of the transmit antennas 608 and 609, respectively. The feed networks 634 and 636 may divide the signals so power is equally distributed among them or alternatively, so power is distributed according to another scheme, in which the divided signals do not all receive the same power. Each signal from the feed networks 634 and 636 is then input to the PS circuits 616 and 618, respectively, where the FMCW signals are phase shifted based on control signaling from the DAC controller 690 (corresponding to voltages generated by the FPGA 626 under the direction of microcontroller 638), and then transmitted to the PAs 629 and 630. Signal amplification is needed for the FMCW signals to reach the long ranges desired for object detection, as the signals attenuate as they radiate by the transmit antennas 608 and 609. From the PAs 629 and 630, the FMCW signals are fed to couplers 678 and 680, respectively, to generate calibration signaling that is fed back to the transceiver 606. From the couplers 678 and 680, the FMCW signals are transmitted through transmit antennas 608 and 609 to radiate the outgoing signaling in the respective polarization. In some implementations, the PS circuit 616 is coupled to the transmit antennas 608 operating in a first polarization (e.g., horizontal polarization) through the PA 629 and coupler 678, and the PS circuit 618 is coupled to the transmit antennas 609 operating in a second polarization (e.g., vertical polarization) through the PA 630 and coupler 680.

In some embodiments, the transceiver 606 feeds the FMCW signals to drivers 694 and 696, which are then fed to PAs 628 and 632 and to the couplers 676 and 682. From these couplers, the FMCW signals are fed to the transmit guard antennas 607 and 610 for side lobe cancelation of the transmission signal.

The microcontroller 638 determines which phase shifts to apply to the PSs in PS circuits 616, 618, 620 and 622 according to a desired scanning mode based on road and environmental scenarios. Microcontroller 638 also determines the scan parameters for the transceiver to apply at its next scan. The scan parameters may be determined at the direction of one of the processing engines 650, such as at the direction of perception engine 604. Depending on the objects detected, the perception engine 604 may instruct the microcontroller 638 to adjust the scan parameters at a next scan to focus on a given area of the FoV or to steer the beams to a different direction.

In various examples, radar system 600 operates in one of various modes, including a full scanning mode and a selective scanning mode, among others. In a full scanning mode, the transmit antennas 608, 609 and the receive antennas 612, 613 can scan a complete FoV with small incremental steps. Even though the FoV may be limited by system parameters due to increased side lobes as a function of the steering angle, radar system 600 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 600 scans around an area of interest by steering to a desired angle and then scanning around that angle. This ensures the radar system 600 detects objects in the area of interest without wasting any processing or scanning cycles illuminating areas with no valid objects. Since the radar system 600 can detect objects at a long distance, e.g., 300$m$ or more at boresight, if there is a curve in a road, direct measures do not provide helpful information. Rather, the radar system 600 steers along the curvature of the road and aligns its beams towards the area of interest. In various examples, the selective scanning mode may be implemented by changing the chirp slope of the FMCW signals generated by the transceiver 606 and by shifting the phase of the transmitted signals to the steering angles needed to cover the curvature of the road.

Objects are detected with radar system 600 by reflections or echoes that are received at the receive antennas 612 and 613 in the respective polarization. The received signaling is then optionally fed to couplers 672 and 673 using feedback calibration signaling from the transceiver 606. The couplers 670, 672-674 can allow probing to the receive chain signal path. From the couplers 672 and 673, the received signaling is fed to LNAs 641 and 642. The LNAs 641 and 642 are positioned between the receive antennas 612 and 613 and PS circuits 620 and 622, which include PSs similar to the PSs in PS circuits 616 and 618. For receive operation, PS circuits 620 and 622 create phase differentials between radiating elements in the receive antennas 612 and 613 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 612 and 613. Similar to PS circuits 616, 618 on the transmit chain, PS circuits 620, 622 are controlled by the DAC controller 690, which provides control signaling to each PS to generate the desired phase shift. In some embodiments, the FPGA 626 can provide bias voltages to the DAC controller 690 to generate the control signaling to PS circuits 620, 622.

The receive chain then combines the signals fed by the PS circuits 620 and 622 at the combination networks 644 and 645, respectively, from which the combined signals propagate to the amplifiers 664 and 666 for signal amplification. The amplified signal is then fed to the transceiver 606 for receiver processing. Note that as illustrated, the combination networks 644 and 645 can generate multiple combined signals 646 and 648, of which each signal combines signals from a number of elements in the receive antennas 612 and 613, respectively. In one example, the receive antennas 612 and 613 include 128 and 64 radiating elements partitioned into two 64-element and 32-element clusters, respectively. For example, the signaling fed from each cluster is combined in a corresponding combination network (e.g., 644, 645) and delivered to the transceiver 606 in a separate RF transmission line. In this respect, each of the combined signals 646 and 648 can carry two RF signals to the transceiver 606, where each RF signal combines signaling from the 64-element and 32-element clusters of the receive antennas 612 and 613. Other examples may include 8, 26, 34, or 62 elements, and so on, depending on the desired configuration. The higher the number of antenna elements, the narrower the beam width. In some implementations, the combination network 644 is coupled to the receive antennas 612 operating in the first polarization (e.g., horizontal polarization) and the combination network 645 is coupled to receive antennas 613 operating in the second polarization (e.g., vertical polarization). In some embodiments, the receive guard antennas 610 and 614 feed the receiving signaling to couplers 670 and 674, respectively, which are then fed to LNAs 640 and 643. The filtered signals from the LNAs 640 and 643 are fed to amplifiers 623 and 624, respectively, which are then fed to the transceiver 606 for side lobe cancelation of the received signals by the receiver processing.

In some implementations, the radar module 602 includes receive guard antennas 610 and 614 that generate a radiation pattern separate from the main beams received by the 64-element receive antennas 612 and 613. The receive guard antennas 610 and 614 are implemented to effectively eliminate side-lobe returns from objects. The goal is for the receive guard antennas 610 and 614 to provide a gain that is higher than the side lobes and therefore enable their elimination or reduce their presence significantly. The receive guard antennas 610 and 614 effectively act as a side lobe filter. Similar, the radar module 602 includes transmit guard antennas 607 and 610 to eliminate side lobe formation or reduce the gain generated by transmitter side lobes at the time of a transmitter main beam formation by the transmit antennas 608 and 609.

Once the received signals are received by transceiver 606, the received signals are processed by processing engines 650. Processing engines 650 include perception engine 604 that detects and identifies objects in the received signal with one or more neural networks using machine learning or computer vision techniques, database 652 to store historical and other information for radar system 600, and the DSP engine 654 with an Analog-to-Digital Converter (ADC) module to convert the analog signals from transceiver 606 into digital signals that can be processed to determine angles of arrival and other valuable information for the detection and identification of objects by perception engine 604. In one or more implementations, DSP engine 656 may be integrated with the microcontroller 638 or the transceiver 606.

Radar system 600 also includes a Graphical User Interface (GUI) 658 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 600 has a temperature sensor 660 for sensing the temperature around the vehicle so that the proper voltages from FPGA 626 may be used to generate the desired phase shifts. The voltages stored in FPGA 626 are determined during calibration of the antennas under different operating conditions, including temperature conditions. A database 662 may also be used in radar system 600 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 604 controls further operation of the transmit antennas 608 and 609 by, for example, providing an antenna control signal containing beam parameters for the next RF beams to be radiated from MTM cells in the transmit antennas 608.

In operation, the microcontroller 638 is responsible for directing the transmit antennas 608 and 609 to generate RF beams in a respective polarization with determined parameters such as beam width, transmit angle, and so on. The microcontroller 638 may, for example, determine the parameters at the direction of perception engine 604, which may at any given time determine to focus on a specific area of a FoV upon identifying targets of interest in the ego vehicle's path or surrounding environment. The microcontroller 638 determines the direction, power, and other parameters of the RF beams and controls the transmit antennas 608 and 609 to achieve beam steering in various directions. The microcontroller 638 also determines a voltage matrix to apply to reactance control mechanisms coupled to the transmit antennas 608 and 609 to achieve a given phase shift. In some examples, the transmit antennas 608 and 609 are adapted to transmit a directional beam through active control of the reactance parameters of the individual MTM cells that make up the transmit antennas 608 and 609.

Next, the transmit antennas 608 and 609 radiate RF beams having the determined parameters. The RF beams are reflected from targets in and around the ego vehicle's path (e.g., in a 360° field of view) and are received by the transceiver 606. The receive antennas 612 and 613 send the received 4D radar data to the perception engine 604 for target identification.

In various examples, the perception engine 604 can store information that describes an FoV. This information may be historical data used to track trends and anticipate behaviors and traffic conditions or may be instantaneous or real-time data that describes the FoV at a moment in time or over a window in time. The ability to store this data enables the perception engine 604 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 604 may determine to narrow the beam width for a more focused view of that sector or area in the FoV. The next scan may indicate the targets' length or other dimension, and if the target is a vehicle, the perception engine 604 may consider what direction the target is moving and focus the beams on that area. Similarly, the echo may be from a spurious target, such as a bird, which is small and moving quickly out of the path of the vehicle. The database 652 coupled to the perception engine 604 can store useful data for radar system 600, such as, for example, information on which subarrays of the transmit antennas 608 and 609 perform better under different conditions.

In various examples described herein, the use of radar system 600 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 600, the driver (or driverless vehicle) may maintain the maximum safe speed without regard to the weather conditions. Even if other drivers slow down, a vehicle enabled with the radar system 600 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 604 adjusts the focus of the RF beam to a larger beam width, thereby enabling a faster scan of areas where there are few echoes. The perception engine 604 may detect this situation by evaluating the number of echoes received within a given time period and making beam size adjustments accordingly. Once a target is detected, the perception engine 604 determines how to adjust the beam focus. This is achieved by changing the specific configurations and conditions of the transmit antennas 608. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 600.

All of these detection scenarios, analysis and reactions may be stored in the perception engine 604, such as in the database 652, and used for later analysis or simplified reactions. For example, if there is an increase in the echoes received at a given time of day or on a specific highway, that information is fed into the microcontroller 638 to assist in proactive preparation and configuration of the transmit antennas 608 and 609. Additionally, there may be some subarray combinations that perform better, such as to achieve a desired result, and this is stored in the database 652.

Figure 7:
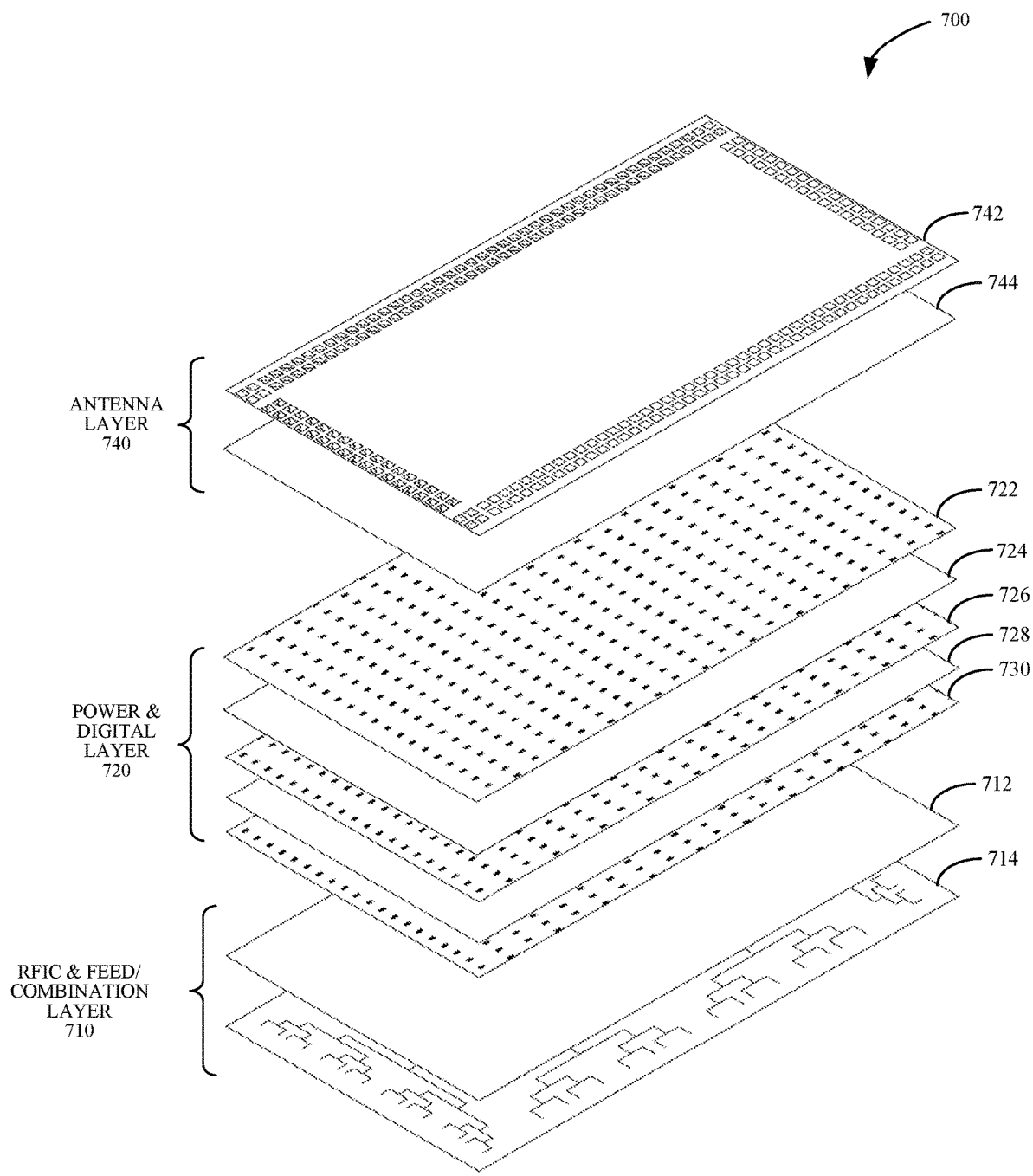
FIG. 7 illustrates an exploded perspective view of an example stack-up configuration of an antenna structure in accordance with some implementations of the subject technology.

FIG. 7 illustrates an exploded perspective view of an example stack-up configuration of an antenna structure 700 in accordance with some implementations of the subject technology. The antenna structure 700 is shown oriented with the x-y-z axis as illustrated. The antenna structure 700 includes an RFIC and feed/combination layer 710, a power and digital layer 720 and an antenna layer 740. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The present disclosure is described with respect to a radar system, where the antenna structure 700 is a structure having a corporate feed structure, such as the RFIC and feed/combination layer 710, with an array of transmission lines feeding a radiating array, such as the antenna layer 740, through the power and digital layer 720. In some implementations, the power and digital layer 720 includes a plurality of transmission lines coupled to power supplies and digital logic circuitry within conductive material and the antenna layer 740 is a lattice structure of unit cell radiating elements proximate the transmission lines.

The RFIC and feed/combination layer 710 includes a ground plane layer 712 and a signal plane layer 714. The signal plane layer 714 may include a feed network for transmit operations and a combination network for receive operations. The feed network may include power amplifiers for signal amplification and the combination network may include low-noise amplifiers for low-noise signal filtration. Each of the feed network and the combination network is coupled to respective phase shifter networks (not shown) included in the RFIC and feed/combination layer 710 for beam steering.

In some implementations, the signal plane layer 714 includes a separate feed network for each of transmit antennas in the respective polarization and a separate combination network for each of the receive antennas in the respective polarization. In this respect, the transmit antennas in the horizontal polarization are coupled to a first feed network with vias penetrating through the internal layering that includes the power and digital layer 720, while the transmit antennas in the vertical polarization are coupled to a second feed network through corresponding vias. Similarly, the receive antennas in the horizontal polarization are coupled to a first combination network through corresponding vias, while the receive antennas in the vertical polarization are coupled to a second combination network through corresponding vias. In other implementations, the transmit antennas associated with the two polarizations may share a common feed network, while the receive antennas associated with the two polarizations may share a common combination network.

In some implementations, one or more of the layers in the RFIC and feed/combination layer 710 may include a substrate formed of a polytetrafluoroethylene material having predetermined parameters (e.g., low dielectric loss) that are applicable to high frequency circuits. In some embodiments, a polytetrafluoroethylene substrate can exhibit thermal and phase stability across temperature and can be used in automotive radar and microwave applications.

The power and digital layer 720 includes signal plane layers 722, 726 and 730 and ground plane layers 724 and 728. The signal plane layers 722, 726 and 730 may include power supplies, such as DC power, and digital logic circuitry. Each of the feed and combination layer 714 and the power and digital layers (e.g., 722, 724, 726, 728, 730) includes a dielectric layer interposed between two conductive layers. In some embodiments, each of the conductive layers and the dielectric layer has a predetermined thickness (e.g., 20 mm for the dielectric layer thickness).

The antenna layer 740 includes an antenna 742 and a ground plane layer 744. The antenna 742 includes the receive antennas in both polarizations and the transmit antennas in both polarizations. The antenna 742 has a number of radiating elements creating paths for transmitted RF signals or reflections received from objects. In various examples, the radiating elements are patches or meta-structures in an array configuration such as in a 128-element transmit antenna in the horizontal polarization (and a 64-element transmit antenna in the vertical polarization) or a 64-element receive antenna in the vertical polarization (and 128-element receive antenna in the horizontal polarization). This may produce a Half Power Beam Width (HPBW) of about 1° in azimuth and HPBW of about 1.6° in elevation to meet any EIRP requirements. In some examples, the antenna 742 may include an array of slot elements. In other examples, the antenna 742 may include an array of patch antennas.

The antenna layer 740 may be composed of individual radiating elements discussed herein. The antenna layer 740 may take a variety of forms and is designed to operate in coordination with the power and digital layer 720, in which individual radiating elements correspond to elements within the power and digital layer 720. As used herein, the "unit cell element" is referred to as an "MTS unit cell" or "MTS element," and these terms are used interchangeably throughout the present disclosure without departing from the scope of the subject technology. The MTS unit cells include a variety of conductive structures and patterns, such that a received transmission signal is radiated therefrom. The MTS unit cell may serve as an artificial material, meaning a material that is not naturally occurring. Each MTS unit cell has some unique properties. These properties include a negative permittivity and permeability resulting in a negative refractive index; these structures are commonly referred to as left-handed materials (LHM). The use of LHM enables behavior not achieved in classical structures and materials.

The MTS array is a periodic arrangement of unit cells that are each smaller than the transmission wavelength. In some embodiments, each of the unit cell elements has a uniform size and shape; however, alternate and other implementations may incorporate different sizes, shapes, configurations and array sizes.

The antenna structure 700 may include multiple RFICs embedded into the RFIC and feed/combination layer 710, such as to correspond to the number of path levels in a feed network or combination network of the RFIC and feed/combination layer 710 or to the number of patch antennas in the antenna 742. The signal plane layer 714 in the RFIC and feed/combination layer 710 may include, or be coupled to, a connector (not shown). In some implementations, the antenna 742 may include a number of RF sub-components in lieu of fabrication on the RFIC and feed/combination layer 710.

The RFIC and feed/combination layer 710 includes phase shifters (e.g., a phase shift network) to achieve any desired phase shift in a range of 0° to 360°. In some embodiments, the phase shifters can provide a single analog beam with a phase shift. In some implementations, the phase shifter can be an IQ demodulator, where the signal is divided into two I and Q signals and the phase of the signal changes by modifying the ratio between the I and Q signals and combining them. In other implementations, the phase shifter can be a digital beam former, which can provide multiple digital signals at different phases to be radiated or received by antennas, to improve the system performance using multiple beams. In this respect, the phase shifters may have a connection to the antenna elements with the exclusion of a feed network located therebetween. The RFIC and feed/combination layer 710 may include transitions from the RFIC and feed/combination layer 710 to the antenna layer 740. In some implementations, the RFIC and feed/combination layer 710 includes a control circuit.

When the transmission signal is provided to the antenna structure 700, such as through a coaxial cable or other connector, the transmission signal propagates through the RFIC and feed/combination layer 710 to the power and digital layer 720 through which the transmission signal radiates to the antenna layer 740 for transmission through the air. The transmission line may have various portions, in which a first portion receives a transmission signal as an input, such as from a coaxial cable or other supply structure, and the transmission signal traverses a substrate portion to divide the transmission signal through a corporate feed-style network resulting in multiple transmission lines that feed the phase shift network (or reactance control mechanism). The phase shift network includes multiple phase control elements having one or more phase shifters. The transmission signal radiates through these phase control elements to the antenna layer 740, which may include an array of MTS elements. Control of the array of MTS elements results in a directed signal or beamform.

Figure 8:
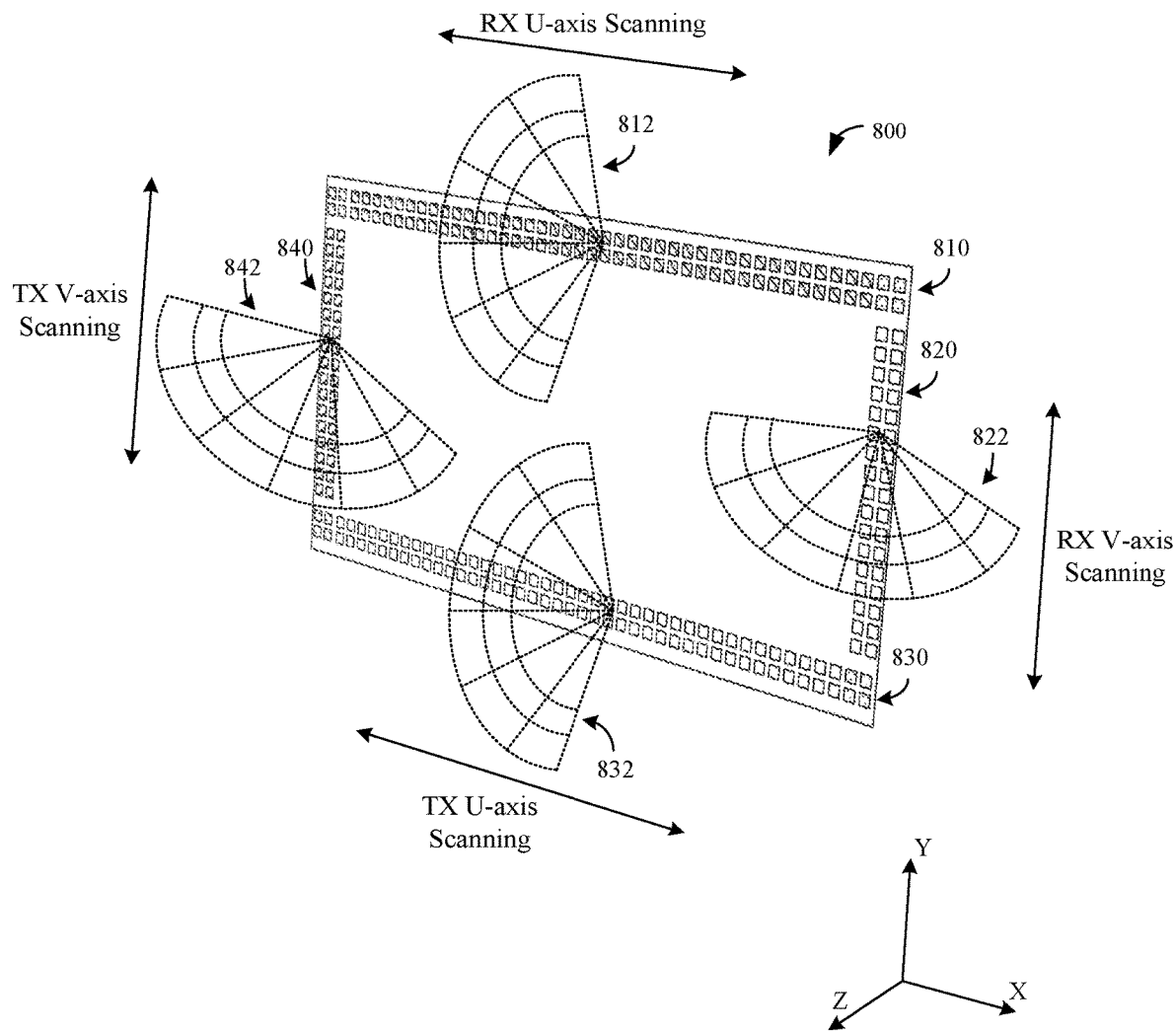
FIG. 8 illustrates a schematic diagram of example transmit and receive antennas producing radiating beams in dual polarizations in accordance with some implementations of the subject technology.

FIG. 8 illustrates a schematic diagram of an example of a radar antenna 800 having transmit antennas and receive antennas producing radiating beams in dual polarizations in accordance with some implementations of the subject technology. The radar antenna 800 includes a first receive array 810, a second receive array 820, a first transmit array 830 and a second transmit array 840.

The first receive array 810 produces a receive beam 812 with vertical polarization directed in the z-direction, in which phase shift elements tied to the individual unit cells of the first receive array 810 apply a phase shift to change the phase of the incident signal and thereby scan in the U-axis (or azimuth direction). The receive beam 812 illustrated identifies a receive area of the first receive array 810, meaning that the first receive array 810 can detect objects within that area.

The first transmit array 830 produces a radiating beam 832 with horizontal polarization directed in the z-direction, in which phase shift elements coupled to the individual unit cells of the first transmit array 830 change the phase of the radiated signal and thereby scan in the U-axis (or azimuth direction). The radiation beam 832 illustrated identifies a transmit area of the first transmit array 830, meaning that the first transmit array 830 is used to illuminate objects within that area.

The second receive array 820 produces a receive beam 822 with horizontal polarization directed in the z-direction, in which phase shift elements coupled to the individual unit cells of the second receive array 820 change the phase of the radiated signal and thereby scan in the V-axis (or elevation direction). The radiation beam 822 illustrated identifies a receive area of the second receive array 820, meaning that the second receive array 820 can detect objects within that area.

The second transmit array 840 produces a radiating beam 842 with vertical polarization directed in the z-direction, in which phase shift elements tied to the individual unit cells of the second transmit array 840 change the phase of the radiated signal and thereby scan in the V-axis (or elevation direction). The radiation beam 842 illustrated identifies a transmit area of the second transmit array 840, meaning that the second transmit array 840 is used to illuminate objects within that area.

The receive array 810 and the transmit array 840 are directed into the z-direction, so the arrays 810 and 840 have an overlap region in the U-V domain when scanning the V-axis angle range and U-axis angle range, respectively. In some embodiments, the first receive array 810 and the second receive array 820 are dual-polarized, in which the receive and transmit arrays of the same polarization can be grouped to provide a fan beam in the same plane such that a coarse beam can illuminate the plane for a quick 1D scan in the azimuth and elevation planes.

Figure 9:
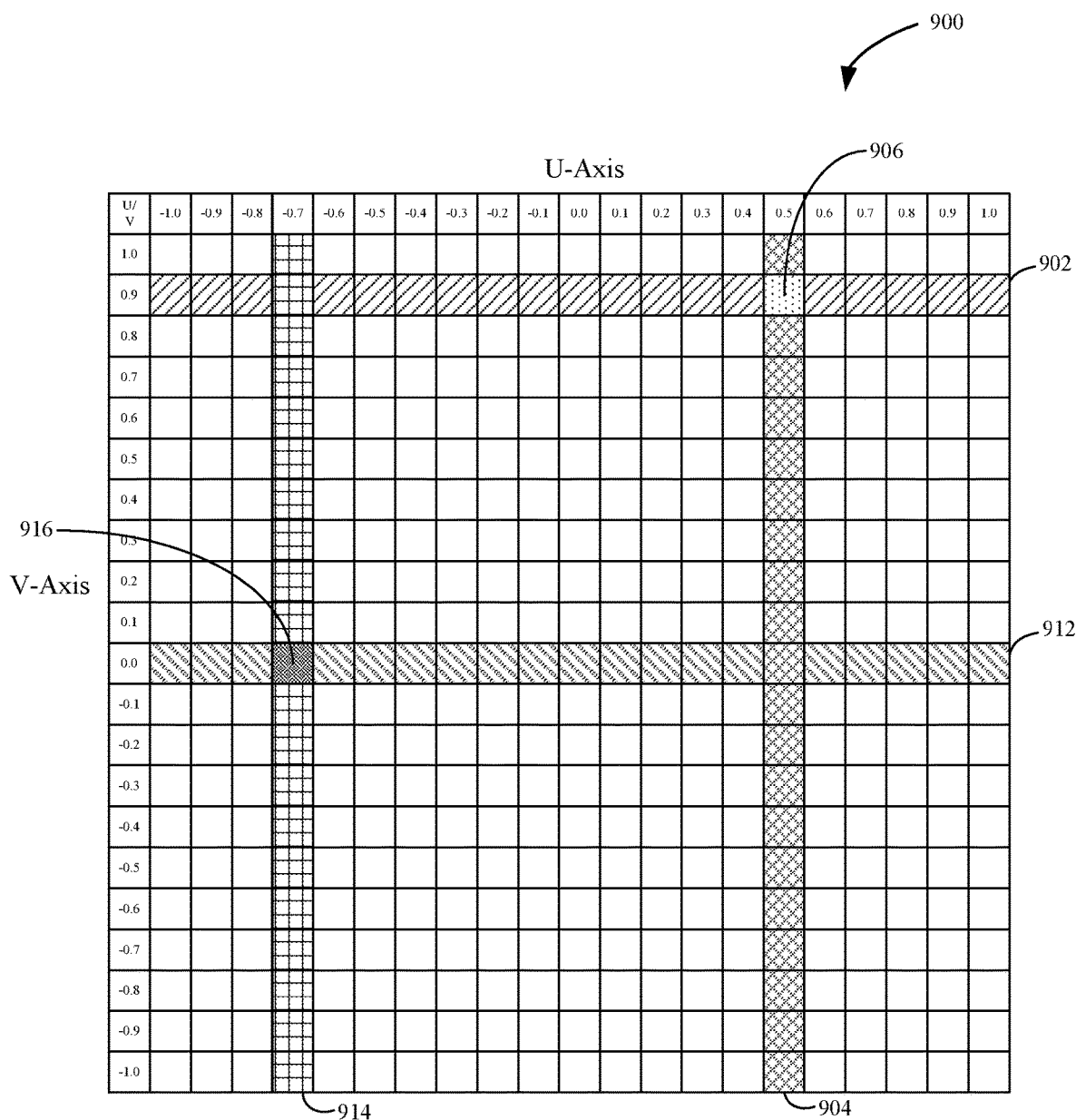
FIG. 9 illustrates a plot diagram of two-dimensional beam scanning of orthogonal antenna selections in accordance with some implementations of the subject technology.

FIG. 9 illustrates a plot diagram 900 of two-dimensional beam scanning of orthogonal antenna selections with an antenna array system in accordance with some implementations of the subject technology. The antenna array system enables steering of beamforms on orthogonal axes, in which the intersection of the beamform patterns has a directivity referred to herein as an artificial directivity or an effective directivity. In such systems, where a transmission pattern is on a first axis, such as a horizontal or azimuth axis, and a receive pattern is on a second axis orthogonal to the first axis, such as a vertical or elevation axis, the intersection of the patterns provides artificially enhanced directivity where a horizontal beam intersects with a vertical beam.

The plot diagram 900 depicts a first transmit scan 902 in the V-axis that scans with a fan beam, and a first receive scan 904 in the U-axis that scans with a fan beam, both in the horizontal polarization. In this respect, the U-axis scanning is handled by the RX fan beam and the V-axis scanning is handled by the TX fan beam. The radar link can have the U-V scanning when the RX and TX radiation patterns are multiplied.

The transmit antennas transmit in a first direction, referred to here as the z-direction, and scan across the horizontal or azimuth in the x-direction. The receive antennas are directed in the z-direction and scan in the vertical or elevation in the y-direction. Each set of antennas, and each individual antenna, has an associated radiation beamform. Where these beamforms can cross or intersect is the active aperture of the antenna system. The active aperture is therefore a combination of the multiple beams, having its own beam width and height. For example, the transmit antenna with the first transmit scan 902 and receive antenna with the first receive scan 904 form active aperture 906.

The plot diagram 900 also depicts a second transmit scan 914 in the U-axis that scans with a fan beam, and a second receive scan 912 in the V-axis that scans with a fan beam, both in the vertical polarization. Similarly, the transmit antenna with the second transmit scan 914 and receive antenna with the second receive scan 912 form active aperture 916.

Figure 10:
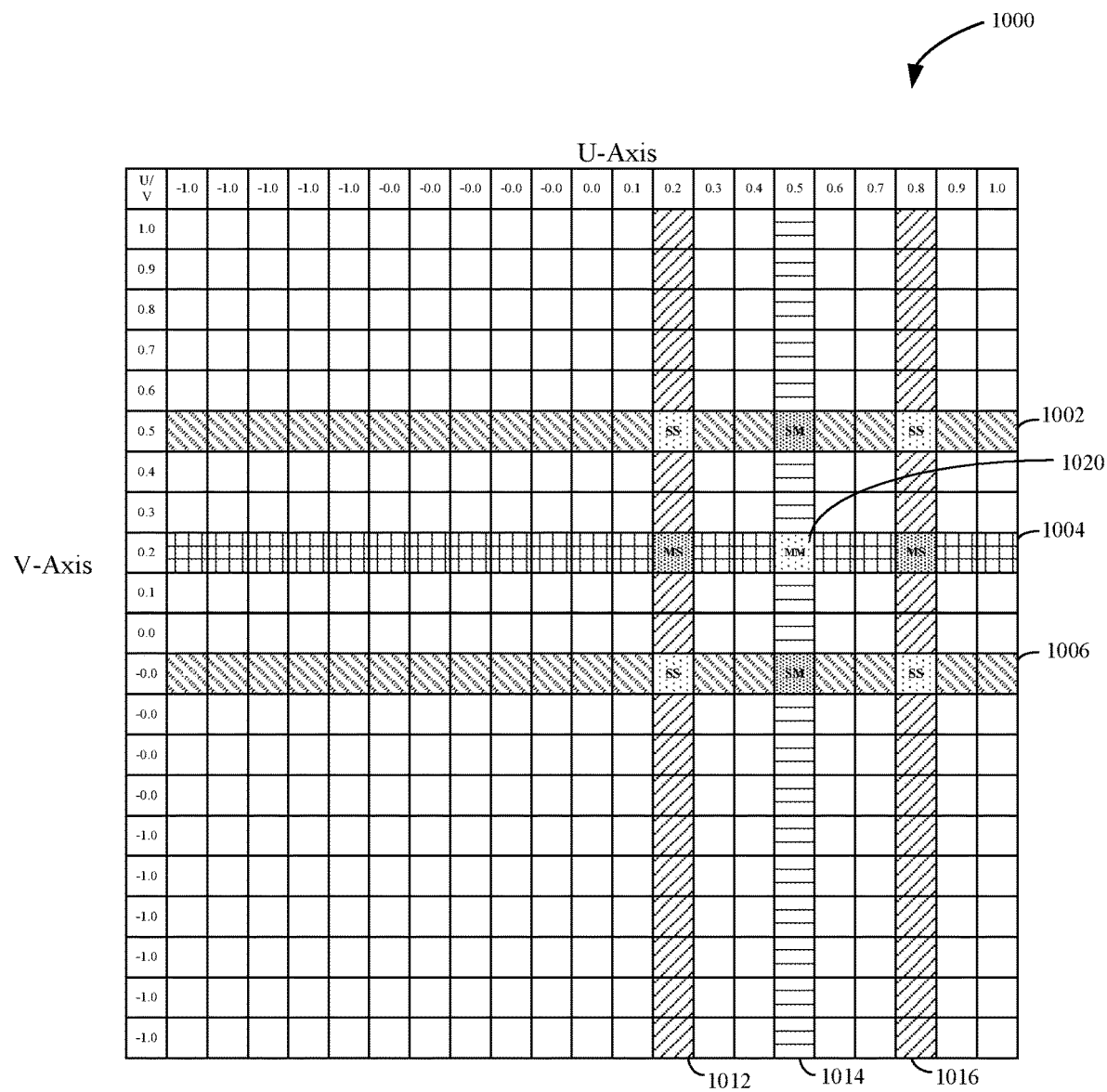
FIG. 10 illustrates a plot diagram of two-dimensional beam scanning with main lobe and side lobe levels in accordance with some implementations of the subject technology.

FIG. 10 illustrates a plot diagram 1000 of two-dimensional beam scanning with main lobe and side lobe levels in accordance with some implementations of the subject technology. The plot diagram 1000 depicts main lobe scan 1004 ("TX main lobe") and side lobe scans 1002 and 1006 ("TX sidelobe") that relate to the transmitter beams with horizontal polarization in the V-axis, and main lobe scan 1014 ("RX main lobe") and side lobe scans 1012 and 1016 ("RX side lobe") that relate to the receiver beams with horizontal polarization in the U-axis. The intersection of the main lobe scans 1004 and 1014 form active aperture 1020 (depicted as "MM"). Other intersections of the TX main lobe (e.g., 1004) with the RX side lobes (e.g., 1012 and 1016) form intersections depicted as "MS." Similarly, other intersections of the RX main lobe (e.g., 1014) with the TX side lobes (e.g., 1002 and 1006) form intersections depicted as "SM." Remaining intersections among the side lobe scans for both RX and TX are depicted as "SS." In some implementations, the SM and MS intersections are normalized to MM, resulting in -30 dB gain, while the SS intersections are also normalized to MM that results in -60 dB gain.

Figure 11:
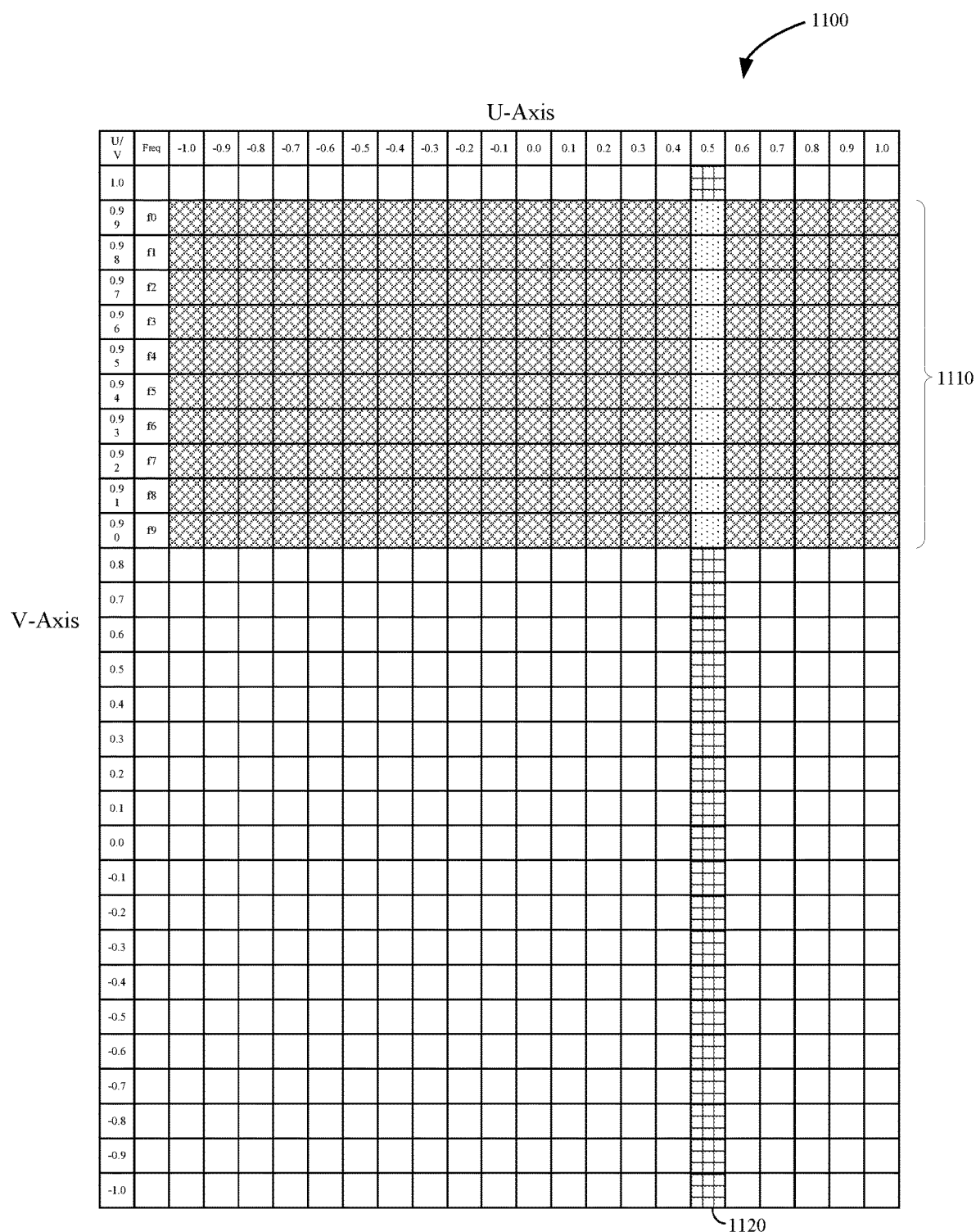
FIG. 11 illustrates a plot diagram of two-dimensional beam scanning with multiple frequency chirps in accordance with some implementations of the subject technology.

FIG. 11 illustrates a plot diagram 1100 of two-dimensional beam scanning with multiple frequency chirp in accordance with some implementations of the subject technology. The plot diagram 1100 depicts transmit scans 1110 in the V-axis across multiple frequencies (depicted as "f0-f9"), and a receive scan 1120 in the U-axis. In this respect, the transmit scans 1110 represent multiple frequency chirps transmitted concurrently with horizontal polarization. In some embodiments, the number of chirps can help to improve the Signal-to-Noise Ratio (SNR). In this respect, the number of chirps can be modified to improve the SNR at the expense of lowering the antenna system performance. The receive scan 1120 can intersect the transmit scans 1110 at the particular frequencies (e.g., f0-f9) to form an active aperture that spans multiple frequencies, and thereby provide improved scanning capability of the antenna array system. As noted above, the transmit scan with the multiple frequency chirps in the V-axis can operate with a scan rate of about 100 Hz, whereas the receive scan in the U-axis can operate with a scan rate of about 10 kHz. In some implementations, using more advanced beam formers and transceiver, the frequencies f0-f9 can be any type of orthogonal signal that includes orthogonal codes, multi-beams, and so on.

Figure 12:
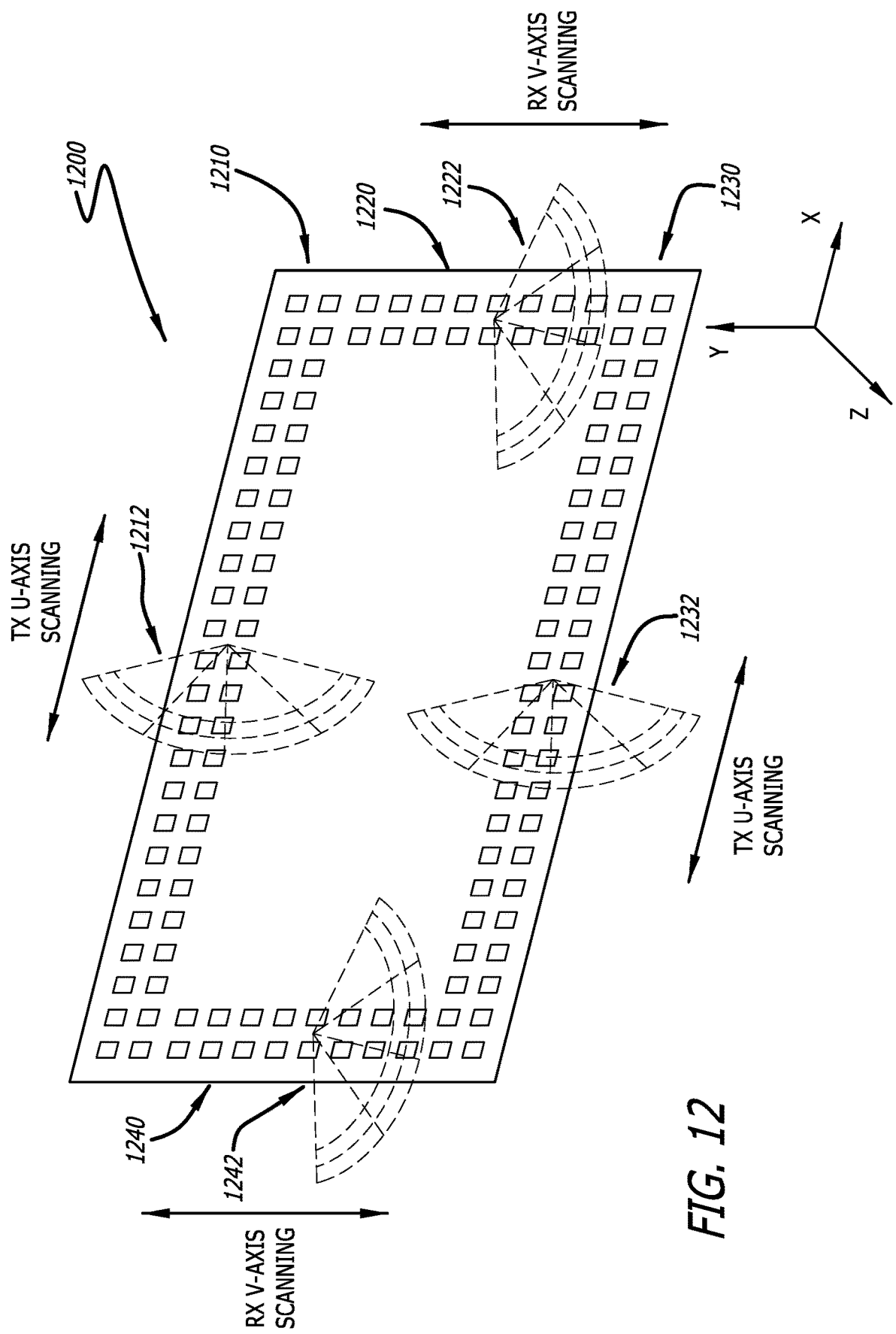
FIG. 12 illustrates a schematic diagram of a continuously steering phased array radar system radiating fan beams in accordance with some implementations of the subject technology.

FIG. 12 illustrates a schematic diagram of a continuously steering phased array radar system 1200 radiating fan beams in accordance with some implementations of the subject technology. It should be noted that radar systems employ transmit and receive beams that are high gain, narrow beams (e.g., pencil beams). In order to simplify the control and processing in the radar system, the continuously-steering phased-array radar system 1200 employs transmit and receive beams that are fan beams. In one or more implementations of the continuously-steering phased-array radar system 1200, the transmit beams scan and refresh continuously, while the receive beams are controlled using radar control.

In this figure, the continuously-steering phased-array radar system 1200 includes a first array of transmit elements 1210, a second array of transmit elements 1230, a first array of receive elements 1240, and a second array of receive elements 1220. The first array of transmit elements 1210 and the second array of transmit elements 1230 each comprise two rows of radio frequency (RF) transmit antenna elements (e.g., which may operate in the autonomous vehicle communication and detection spectrum, which in the US is approximately 77 GHz and has a 5 GHz range, specifically, 76 GHz to 81 GHZ). It should be noted that, in one or more examples, the first array of transmit elements 1210 and the second array of transmit elements 1230 may each comprise more than two rows of RF antenna elements than is shown in this figure.

Similarly, the first array of receive elements 1240 and the second array of receive elements 1220 each comprise two rows of RF receive antenna elements (e.g., which may operate in the autonomous vehicle communication and detection spectrum). In one or more examples, the first array of transmit elements 1210 and the second array of transmit elements 1230 may each comprise more than two rows of RF antenna elements than is shown in FIG. 12.

Various different types of antennas may be employed for each of the RF transmit antenna elements and each of the RF receive antenna elements. In one or more examples, types of antennas that may be employed for each of the RF transmit antenna elements and each of the RF receive antenna elements include, but are not limited to, a patch antenna, a dipole antenna, an antenna horn (e.g., a conical, pyramidal, or corrugated antenna horn), or a cup-dipole antenna. Each of the RF transmit antenna elements and each of the RF receive antenna elements may have the same or various different polarizations (in various different combinations), such has horizontal polarization, vertical polarization, right-hand circular polarization (RH-CP), and/or left-hand circular-polarization (LH-CP).

In some implementations, at least a portion of the continuously-steering phased-array radar system 1200 may be employed in a vehicle (e.g., a terrestrial vehicle, an airborne vehicle, a space vehicle, or a marine vehicle) or a structure (e.g., a building or a device). In some examples, at least a portion of the continuously-steering phased-array radar system 1200 may be employed in a vehicle license plate frame (e.g., implemented in the antenna 430 of vehicle license plate frame 400 of FIG. 4) or a headlight (e.g., refer to the headlight radar systems 1500, 1700, 1900, 2100 of FIGS. 15, 17, 19, and 21, and the reflector headlight radar systems 2200, 2400, 2500, 2600, 2700 of FIGS. 22A, 22B, 24, 25, 26, and 27) of an ego vehicle (e.g., an autonomous vehicle). In another example, at least a portion of the continuously-steering phased-array radar system 1200 may be employed in a traffic light (e.g., refer to the headlight radar systems 1800a, 1800b, 1800c of the traffic light 1810 of FIG. 18).

It should be noted that although the continuously-steering phased-array radar system 1200 of FIG. 12 comprises two arrays of transmit elements (i.e. the first array of transmit elements 1210 and the second array of transmit elements 1230) and two arrays of receive elements (i.e. the first array of receive elements 1240 and the second array of receive elements 1220), in some implementations, the continuously-steering phased-array radar system 1200 may comprise more or less than two arrays of transmit elements and more or less than two arrays of receive elements.

In one or more implementations, the first array of transmit elements 1210 is arranged along a first axis, the first array of receive elements 1240 is arranged along a second axis, the second array of transmit elements 1230 is arranged along a third axis, and the second array of receive 1220 elements is arranged along a fourth axis. In one or more examples, the first axis is orthogonal to the second axis and the fourth axis; the second axis is orthogonal to the first axis and the third axis; the third axis is orthogonal to the second axis and the fourth axis; and the fourth axis is orthogonal to the first axis and the third axis.

During operation of the continuously-steering phased-array radar system 1200, the first array of transmit elements 1210 produces (transmits) a transmit beam 1212, and the second array of transmit elements 1230 produces (transmits) a transmit beam 1232. The transmit beam 1212 and the transmit beam 1232 are each a fan beam in the elevation plane. As such, the transmit beams 1212, 1232 each have a wide beam width at the elevation plane and a narrow beam width at the azimuth plane (i.e. U-axis).

Phase shift elements coupled to the individual RF transmit antenna elements of the first array of transmit elements 1210 and the second array of transmit elements 1230 apply a phase shift to change the phase of the transmit beams 1212, 1232 to scan the transmit beams 1212, 1232 in the azimuth plane across an azimuth field of view ($FOV_{AZ}$) (e.g., from $-FOV_{AZ}/2$ to $+FOV_{AZ}/2$) at a specific transmit refresh rate (e.g., 50 hertz (Hz)). The transmit refresh rate, in some implementations, may be adaptively controlled depending upon the situation, such as an environmental condition, for example, but not limited to weather condition, visibility condition, congesting level of traffic or obstacles, etc., wherein for example, the transmit refresh rate can vary (i.e. a variable transmit refresh rate) from 1 to 100 Hz.

In some implementations, the scanning of each of the transmit beams 1212, 1232 is performed during a specific period of time, which allows for the azimuth location for each of the transmit beams 1212, 1232 to be known for a specific time. As such, when the transmit beams 1212, 1232 are scanned over a specific period of time, the transmit beams 1212, 1232 are each at their own specific predefined azimuth location at a specific predefined time (e.g., it is known that at time $T_d$, transmit beam 1212 will be pointed to azimuth location $AZ_d$).

Also during operation, as the transmit beams 1212, 1232 are scanning, the transmit beams 1212, 1232 reflect off of at least one object (e.g., a target, such as vehicles 110, 114, 120 of FIG. 1) to generate at least one receive beam. The first array of receive elements 1240 produces (receives) a receive beam 1242, and the second array of receive elements 1220 produces (receives) a receive beam 1222. The receive beam 1242 and the receive beam 1222 are each a fan beam in the azimuth plane. As such, the receive beams 1242, 1222 each have a wide beam width at the azimuth plane and a narrow beam width at the elevation plane (i.e. V-axis).

Phase shift elements coupled to the individual RF receive antenna elements of the first array of receive elements 1240 and the second array of receive elements 1220 apply a phase shift to change the phase of the receive beams 1242, 1222 to scan the receive beams 1242, 1222 in the elevation plane across an elevation field of view ($FOV_{EL}$) (e.g., from $-FOV_{EL}/2$ to $+FOV_{EL}/2$) or to a specific predetermined elevation (point) location ($EL_1$).

In some implementations, the receive beams 1242, 1222 are scanned in the elevation plane across the elevation field of view at a specific receive refresh rate (e.g., 1000 Hz). For these implementations, the receive refresh rate (e.g., 1000 Hz) is greater (e.g., much higher) than the transmit refresh rate (e.g., 50 Hz). The receive refresh rate, in some implementations, may be adaptively controlled depending upon the situation, such as environmental condition, for example, but not limited to weather condition, visibility condition, congesting level of traffic or obstacles, etc., wherein for example, the receive refresh rate can vary (i.e. a variable receive refresh rate).

In one or more implementations, the scanning of each of the receive beams 1242, 1222 across the elevation field of view is performed during a specific period of time, which allows for the elevation location for each of the receive beams 1242, 1222 to be known for a specific time. As such, when the receive beams 1242, 1222 are scanned across the elevation field of view over a specific period of time, the receive beams 1242, 1222 are each at their own specific predefined elevation location at a specific predefined time (e.g., it is known that at time $T_1$, receive beam 1242 will be pointed to azimuth location $EL_1$ (e.g., 20 degrees)). For these implementations, in order to have a receive beam (e.g., receive beam 1242 or receive beam 1222) pointed at a specific azimuth and elevation angle ($AZ_1$, $EL_1$), the receive beam will point to a predefined desired elevation location (e.g., $EL_{1=20}$ degrees) at a specific time ($T_1$). This means that the azimuth dimension can be replaced by time. In this case, $AZ_1$ can be replaced by $T_1$, such that the substitution would be ($T_1$, $EL_1$). As such, when it is desired to point the receive beam to a predefined desired elevation, the receive beam will be scanned to point to ($T_1$, $EL_1$).

In an example implementation, a transmit beam (e.g., transmit beam 1212 or transmit beam 1232) is scanned across the azimuth field of view at a transmit refresh rate of 50 Hz for a scan time of $\tau_s$=20 milliseconds (ms) (which is 1000 ms/50 Hz), where $\tau_s$=1/Fs and Fs is the refresh rate. If there are 100 points (cells) in the azimuth field of view to scan, then each point (cell) will be scanned for a scan time $\tau_c$=200 microseconds (µs) (which is 20 ms/100). This means that the transmit beam will be located at cell Ci (where i=1 to 100) at ($\tau_c$*(i−1))+($\tau_s$*N), where N is the scan number (e.g., N=0 to infinity). N*$\tau_s$ represents the set of numbers when the transmit beam is located at the first cell Ci. As such, for a 50 Hz transmit refresh rate, the transmit beam is scanned every 20 ms across the azimuth field of (e.g., from $-FOV_{AZ}/2$ to $+FOV_{AZ}/2$), which means that the transmit beam is at Ci at time T=0 and the transmit beam will finish scanning the azimuth field of view and return back to first cell Ci at the following time T=N*$\tau_s$ (where $\tau_s$=20 ms, 40 ms, 60 ms, etc.).

It should be noted that in other implementations, the first array of transmit elements 1210 and/or the second array of transmit elements 1230 may be arranged on an orthogonal axis than as shown in FIG. 12 such that their transmit beams are scanned in the elevation plane across an elevation field of view ($FOV_{EL}$) (e.g., from $-FOV_{EL}/2$ to $+FOV_{EL}/2$). Similarly, in some implementations, the first array of receive elements 1240 and/or the second array of receive elements 1220 are arranged on an orthogonal axis than as shown in FIG. 12 such that their receive beams are scanned in the azimuth plane across an azimuth field of view ($FOV_{AZ}$) (e.g., from $-FOV_{AZ}/2$ to $+FOV_{AZ}/2$).

Figure 13:
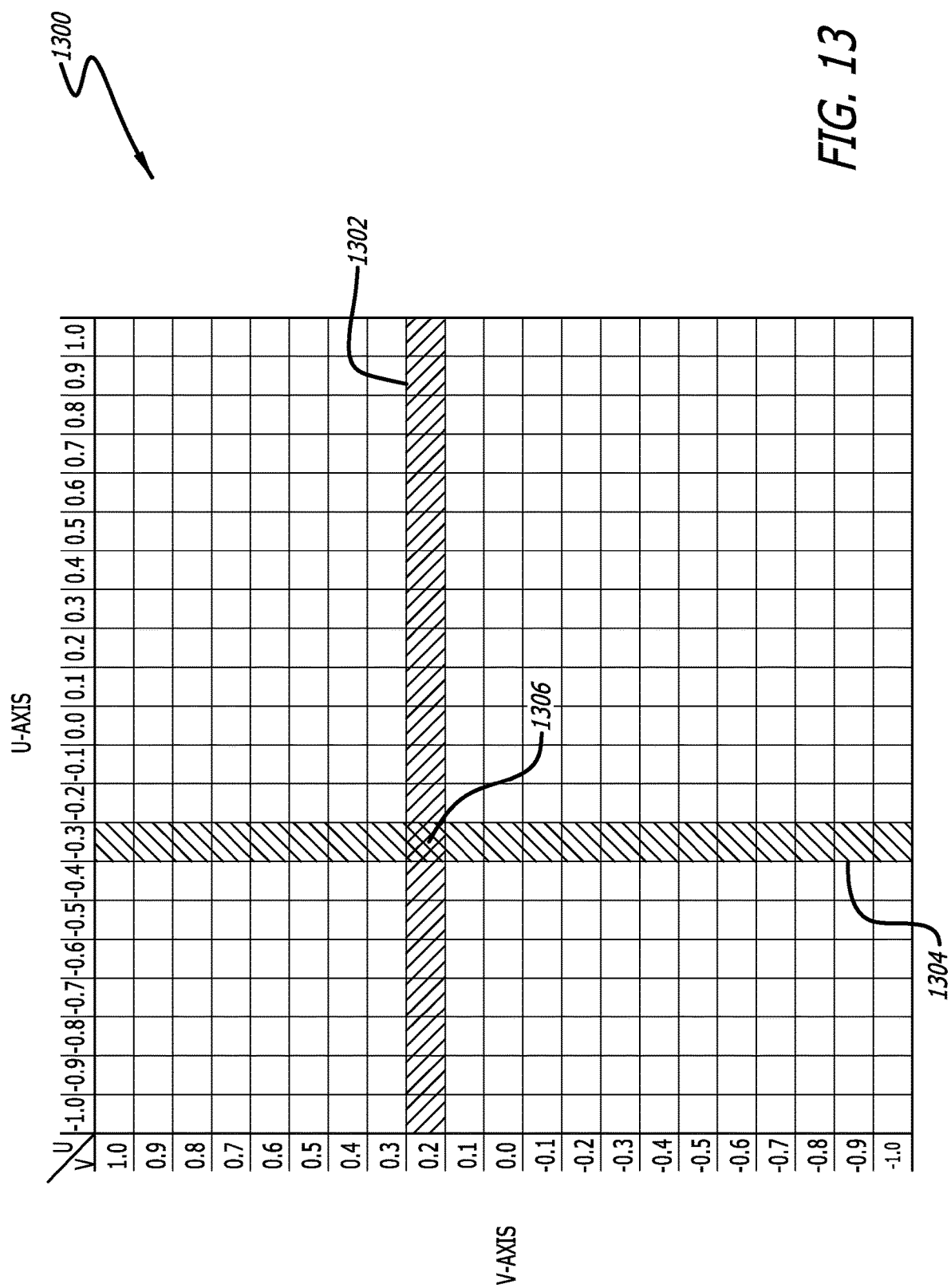
FIG. 13 illustrates a plot diagram of two-dimensional beam scanning of orthogonal antenna selections of the continuously steering phased array radar system of FIG. 12 in accordance with some implementations of the subject technology.

FIG. 13 illustrates a plot diagram 1300 of two-dimensional beam scanning of orthogonal antenna selections of the continuously steering phased array radar system 1200 of FIG. 12 in accordance with some implementations of the subject technology. In this figure, the continuously steering phased array radar system 1200 enables steering of beamforms on orthogonal axes, in which the intersection of the beamform patterns has a directivity referred to herein as an artificial directivity or an effective directivity. In such systems, where a transmit pattern is on a first axis, such as a horizontal or azimuth axis, and a receive pattern is on a second axis orthogonal to the first axis, such as a vertical or elevation axis, the intersection of the patterns provides artificially enhanced directivity where a horizontal beam intersects with a vertical beam.

The plot diagram 1300 depicts a receive scan 1302 in the V-axis that scans with a fan beam, and a transmit scan 1304 in the U-axis that scans with a fan beam. In this respect, the U-axis scanning is handled by the transmit fan beam and the V-axis scanning is handled by the receive fan beam. The radar link can have the U-V scanning when the transmit and receive radiation patterns are multiplied.

The transmit antennas transmit in a first direction, referred to here as the z-direction, and scan across the horizontal or azimuth in the x-direction. The receive antennas are directed in the z-direction and scan in the vertical or elevation in the y-direction. Each set of antennas, and each individual antenna, has an associated radiation beamform. Where these beamforms can cross or intersect is the active aperture of the antenna system. The active aperture is therefore a combination of the multiple beams, having its own beam width and height. For example, the transmit antenna (e.g., the first array of transmit elements 1210 of FIG. 12) with the transmit scan 1302 and the receive antenna (e.g., the first array of receive elements 1240 of FIG. 12) with the receive scan 1304 form active aperture 1306 (e.g. the intersection of the transmit beam 1212 and the receive beam 1242 form an active aperture).

Figure 14:
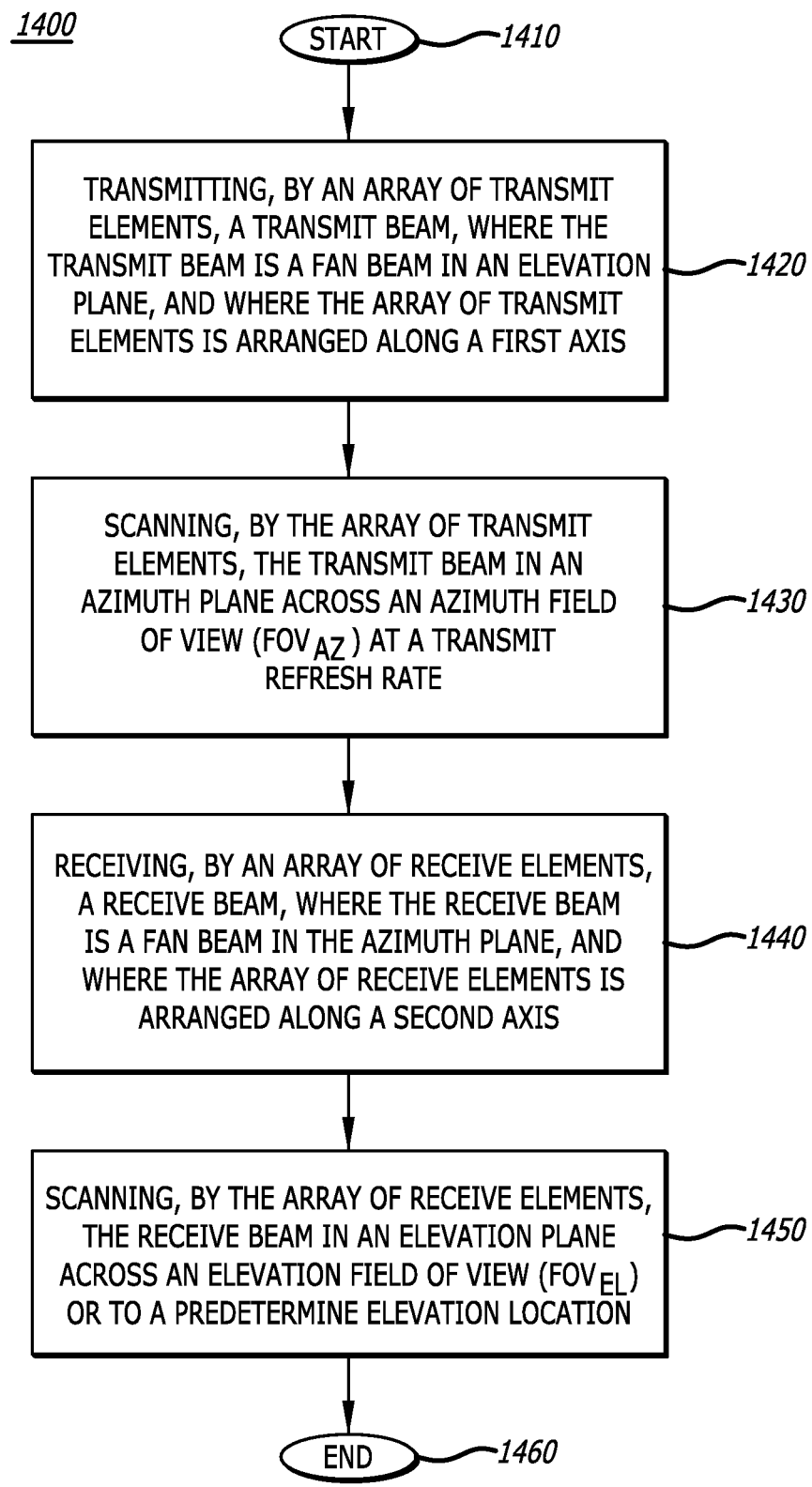
FIG. 14 illustrates a flow chart for the disclosed method for operation of the continuously steering phased array radar system of FIG. 12 in accordance with some implementations of the subject technology.

FIG. 14 illustrates a flow chart for the disclosed method 1400 for operation of the continuously steering phased array radar system 1200 of FIG. 12 in accordance with some implementations of the subject technology. At the start 1410 of the method 1400, an array of transmit elements transmits a transmit beam, where the transmit beam is a fan beam in an elevation plane, and where the array of transmit elements is arranged along a first axis 1420. The array of transmit elements scans the transmit beam in an azimuth plane across an azimuth field of view ($FOV_{AZ}$) at a transmit refresh rate 1430. Then, an array of receive elements receives a receive beam, where the receive beam is a fan beam in the azimuth plane, and where the array of receive elements is arranged along a second axis 1440. The array of receive elements scans the receive beam in an elevation plane across an elevation field of view ($FOV_{EL}$) or to a predetermined elevation location 1450. Then, the method 1400 ends 1460.

Figure 15:
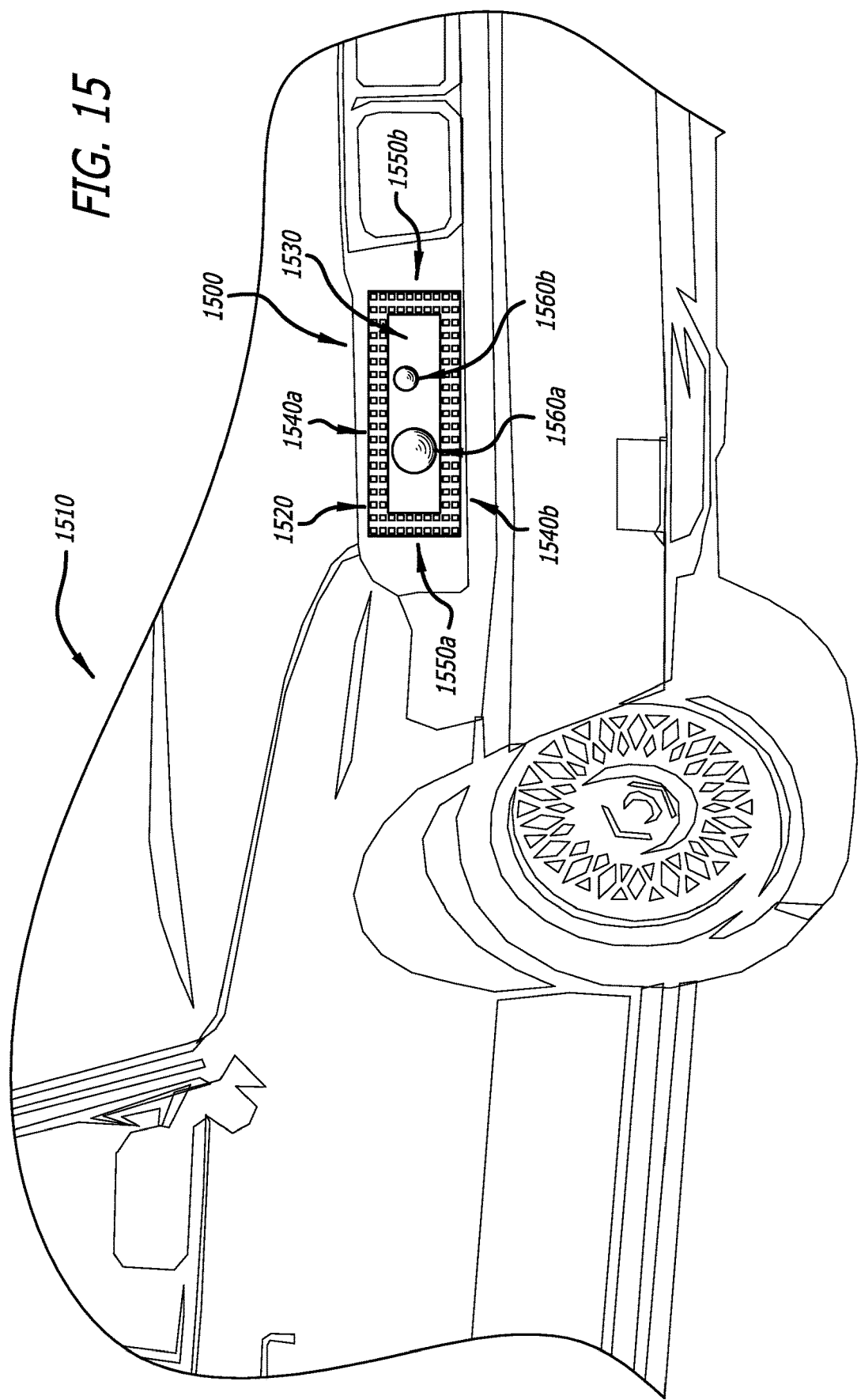
FIG. 15 illustrates a schematic diagram of a headlight radar system implemented in an ego vehicle in accordance with some implementations of the subject technology.

FIG. 15 illustrates a schematic diagram of a headlight radar system 1500 implemented in an ego vehicle (e.g., an automobile) 1510 in accordance with some implementations of the subject technology. In this figure, the headlight radar system 1500 comprises a conformal radar array 1520 (e.g., similar to the continuously steering phased array radar system 1200 of FIG. 12) implemented around a headlight (i.e. a lighting device) 1530 of the vehicle 1510. The headlight 1530 of the headlight radar system 1500 comprises two light bulbs, which are a high-beam light bulb 1560a and a low-beam light bulb 1560b. In one or more implementations, the headlight 1530 of the headlight radar system 1500 may comprise more or less than two light bulbs 1560a, 1560b as is shown in in FIG. 15.

The conformal radar array 1520 of the headlight radar system 1500 comprises two arrays of transmit elements 1540a, 1540b and two arrays of receive elements 1550a, 1550b. As is shown in FIG. 15, each of the two arrays of transmit elements 1540a, 1540b is configured around a respective portion of a perimeter of the headlight 1530, and each of the two arrays of receive elements 1550a, 1550b is configured around a respective different portion of the perimeter of the headlight 1530. It should be noted that, in one or more implementations of the headlight radar system 1500, there may be less or more than two arrays of transmit elements 1540a, 1540b and/or less or more than two arrays of receive elements 1550a, 1550b as is shown in FIG. 15.

It should be noted that the conformal radar array 1520 is conformal to the shape of the headlight 1530. As such, although the conformal radar array 1520 is depicted in FIG. 15 to be rectangular in shape, depending upon the shape of the perimeter of the headlight 1530, the conformal radar array 1520 may comprise various different shapes including, but not limited to, regular shapes (e.g., shapes each having all sides of equal length and all inside angles of equal size) and irregular shapes (e.g., shapes that each do not have all sides of equal length or all inside angles of equal size).

For one or more implementations of the headlight radar system 1500, refer to the description of the continuously steering phased array radar system 1200 of FIG. 12 for further details of the configuration of the arrays of transmit elements 1540a, 1540b and the arrays of receive elements 1550a, 1550b as well as for details of the RF antenna elements themselves of the arrays of transmit elements 1540a, 1540b and the arrays of receive elements 1550a, 1550b. Also, refer to the description of the continuously steering phased array radar system 1200 of FIG. 12 and the description of the method 1400 for operation of the continuously steering phased array radar system 1200 of FIG. 14 for details of the operation of the arrays of transmit elements 1540a, 1540b and the arrays of receive elements 1550a, 1550b.

During operation of the headlight radar system 1500, the high-beam light bulb 1560a and/or the low-beam light bulb 1560b radiate light. In addition, the arrays of transmit elements 1540a, 1540b each transmit at least one transmit signal. At least one transmit signal then reflects off of at least one object (e.g., a target, such as vehicles 110, 114, 120 of FIG. 1) to generate at least one receive signal. Then, the arrays of receive elements 1550a, 1550b each receive at least one receive signal.

In one or more implementations, the headlight radar system 1500 may be employed in various different types of vehicles other than an ego vehicle (e.g., an automobile) 1510 as is shown in FIG. 15. Various different types of vehicles that the headlight radar system 1500 may be employed in include, but are not limited to, terrestrial vehicles (e.g., trucks, tanks, buses, or trains), marine vehicles (e.g., boats or ships), and airborne vehicles (e.g., aircraft). The various different types of vehicles may be manual vehicles or autonomous vehicles, which may be unmanned. In some implementations, the headlight radar system 1500 may be employed in structures (e.g., buildings) or devices (e.g., a traffic light, such as traffic light 1810 of FIG. 18).

Figure 16:
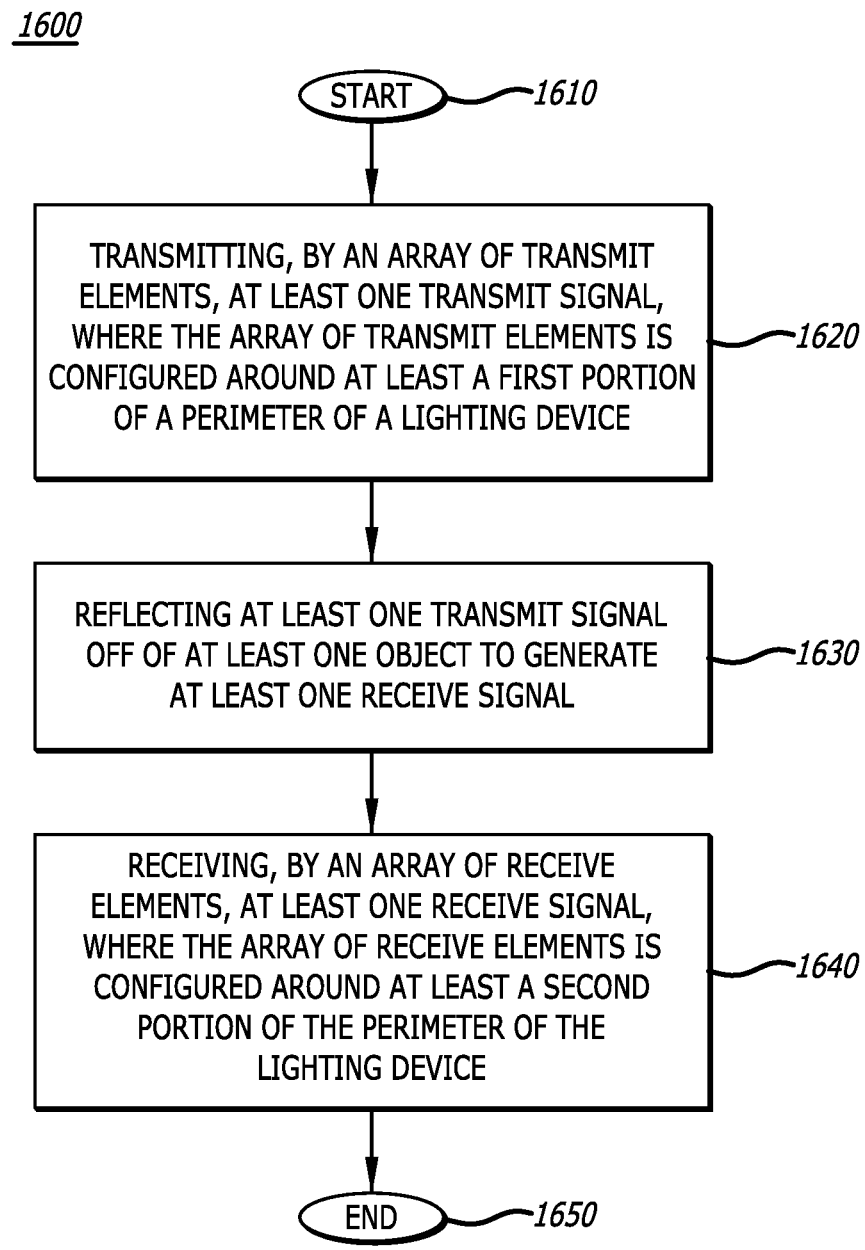
FIG. 16 illustrates a flow chart for the disclosed method for operation of a headlight radar system in accordance with some implementations of the subject technology.

FIG. 16 illustrates a flow chart for the disclosed method 1600 for operation of a headlight radar system (e.g., the headlight radar system 1500 of FIG. 15) in accordance with some implementations of the subject technology. At the start 1610 of the method 1600, an array of transmit elements transmits at least one transmit signal, where the array of transmit elements is configured around at least a first portion of a perimeter of a lighting device 1620. Then, at least one transmit signal reflects off of at least one object to generate at least one receive signal 1630. An array of receive elements then receives at least one receive signal, where the array of receive elements is configured around at least a second portion of the perimeter of the lighting device 1640. Then, the method 1400 ends 1650.

Figure 17:
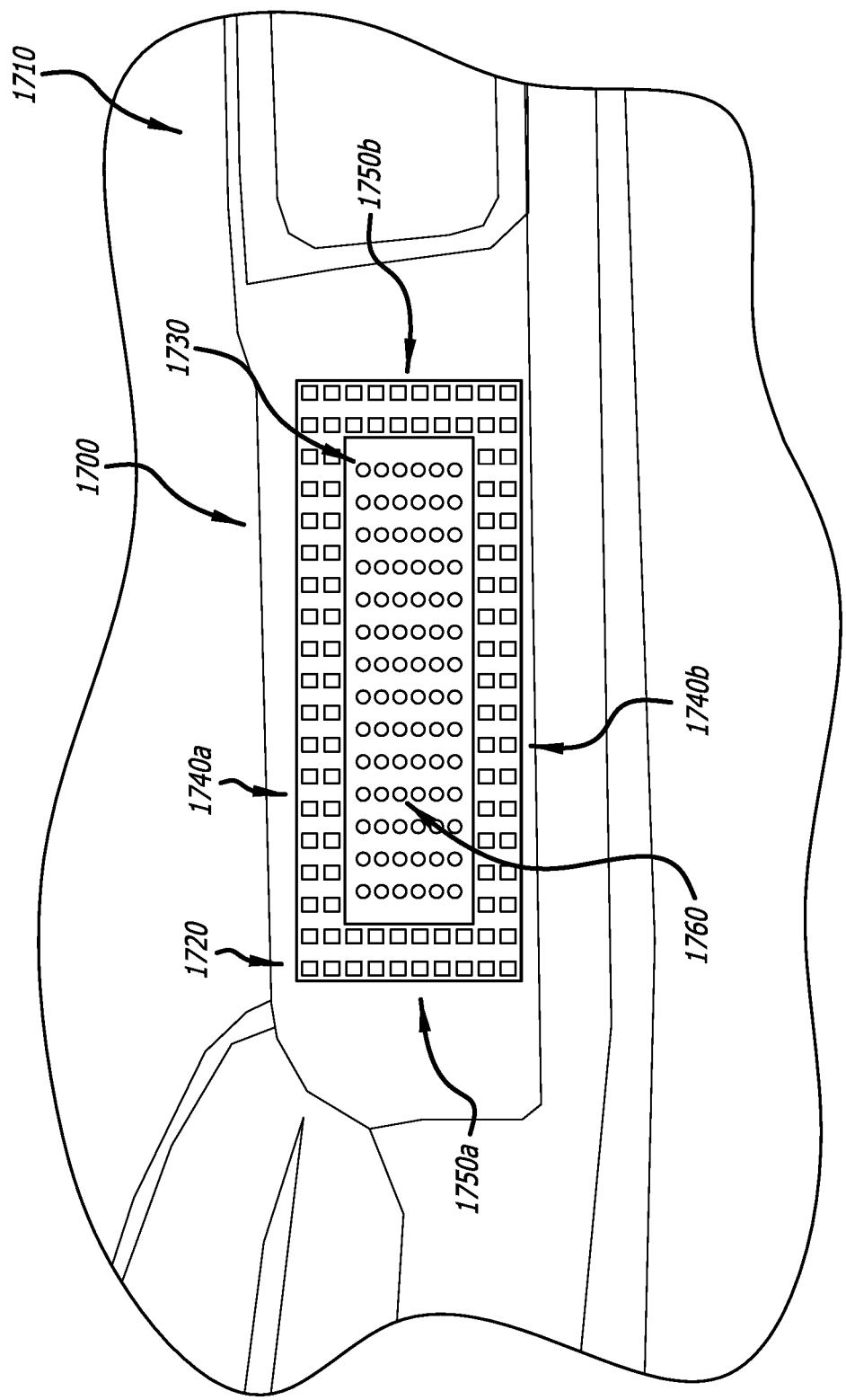
FIG. 17 illustrates a schematic diagram of headlight radar systems employing a plurality of light emitting diodes (LEDs) in accordance with some implementations of the subject technology.

FIGS. 17 through 21 show different designs and implementations of the headlight radar system 1500 of FIG. 15. In particular, FIG. 17 illustrates a schematic diagram of a headlight radar system 1700 employing a plurality of light emitting diodes (LEDs) 1760 in accordance with some implementations of the subject technology. The headlight radar system 1700 of FIG. 17 is similar to the headlight radar system 1500 of FIG. 15, except that the headlight 1730 of the headlight radar system 1700 of FIG. 17 comprises an array of LEDs 1760 instead of a high-beam light bulb 1560a (refer to FIG. 15) and a low-beam light bulb 1560b (refer to FIG. 15).

The headlight radar system 1700 of FIG. 17 also comprises a conformal radar array 1720 (e.g., similar to the continuously steering phased array radar system 1200 of FIG. 12) configured around the headlight 1730 of the vehicle 1710. The conformal radar array 1720 of the headlight radar system 1700 comprises two arrays of transmit elements 1740a, 1740b and two arrays of receive elements 1750a, 1750b. Each of the two arrays of transmit elements 1740a, 1740b are configured around a respective portion of a perimeter of the headlight 1730, and each of the two arrays of receive elements 1750a, 1750b are configured around a respective different portion of the perimeter of the headlight 1530.

During operation of the headlight radar system 1700, at least one light emitting diode (LED) in the array of LEDs 1760 radiates light. Also, the arrays of transmit elements 1740a, 1740b each transmit at least one transmit signal. At least one transmit signal then reflects off of at least one object (e.g., a target, such as vehicles 110, 114, 120 of FIG. 1) to generate at least one receive signal. Then, the arrays of receive elements 1750a, 1750b each receive at least one receive signal.

Figure 18:
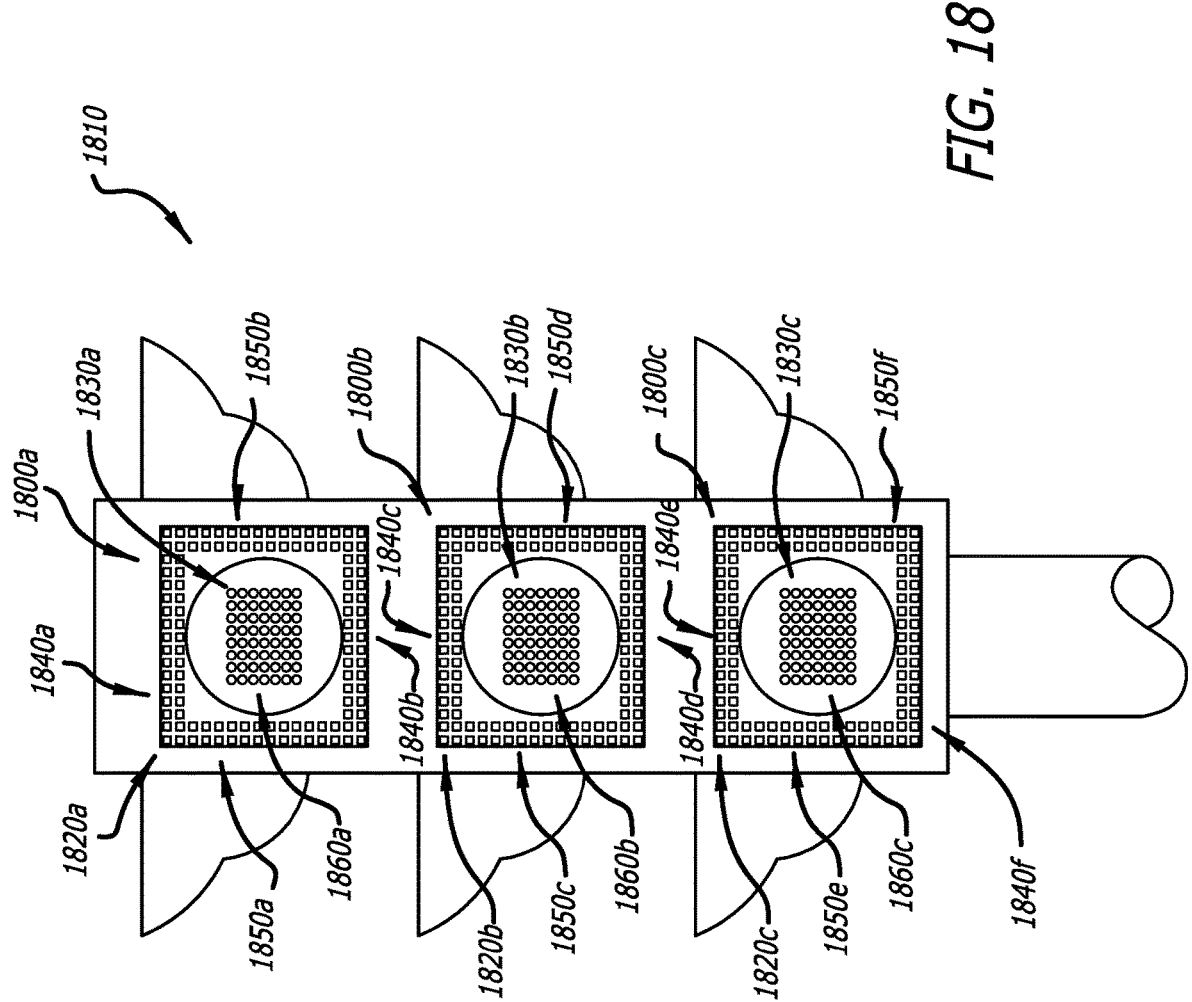
FIG. 18 illustrates a schematic diagram of a headlight radar system implemented in a traffic light in accordance with some implementations of the subject technology.

FIG. 18 illustrates a schematic diagram of headlight radar systems 1800a, 1800b, 1800c implemented in a traffic light 1810 in accordance with some implementations of the subject technology. Each of the headlight radar systems 1800a, 1800b, 1800c of FIG. 18 are similar to the headlight radar system 1700 of FIG. 17, except that the headlight radar systems 1800a, 1800b, 1800c of FIG. 18 are implemented into a traffic light 1810 instead of into a vehicle 1710 (refer to FIG. 17).

Each of the headlight radar systems 1800a, 1800b, 1800c of FIG. 18 comprises a light 1830a, 1830b, 1830c, which is employed for the traffic light 1810. Each light 1830a, 1830b, 1830c comprises an array of LEDs 1860a, 1860b, 1860c. Each of the headlight radar systems 1800a, 1800b, 1800c also comprises a conformal radar array 1820a, 1820b, 1820c (e.g., similar to the continuously steering phased array radar system 1200 of FIG. 12) configured around each respective light 1830a, 1830b, 1830c of the traffic light 1810. Each conformal radar array 1820a, 1820b, 1820c of each headlight radar system 1800a, 1800b, 1800c comprises two arrays of transmit elements 1840a, 1840b, 1840c, 1840d, 1840e, 1840f and two arrays of receive elements 1850a, 1850b, 1850c, 1850d, 1850e, 1850f. For each of the headlight radar systems 1800a, 1800b, 1800c, each of the two arrays of transmit elements 1840a, 1840b, 1840c, 1840d, 1840e, 1840f is configured around a respective portion of a perimeter of a respective light 1830a, 1830b, 1830c of the traffic light 1810, and each of the two arrays of receive elements 1850a, 1850b, 1850c, 1850d, 1850e, 1850f is configured around a respective different portion of the perimeter of a respective light 1830a, 1830b, 1830c of the traffic light 1810.

During operation of each headlight radar system 1800a, 1800b, 1800c, at least one LED in the array of LEDs 1860a, 1860b, 1860c radiates light. Also, the arrays of transmit elements 1840a, 1840b, 1840c, 1840d, 1840e, 1840f each transmit at least one transmit signal. At least one transmit signal then reflects off of at least one object (e.g., a target, such as vehicles 110, 114, 120 of FIG. 1) to generate at least one receive signal. Then, the arrays of receive elements 1850a, 1850b, 1850c, 1850d, 1850e, 1850f each receive at least one receive signal. It should be noted that all of the headlight radar systems 1800a, 1800b, 1800c need not be operating at the same time. As such, one or more of the headlight radar systems 1800a, 1800b, 1800c may be operating at a time.

Figure 19:
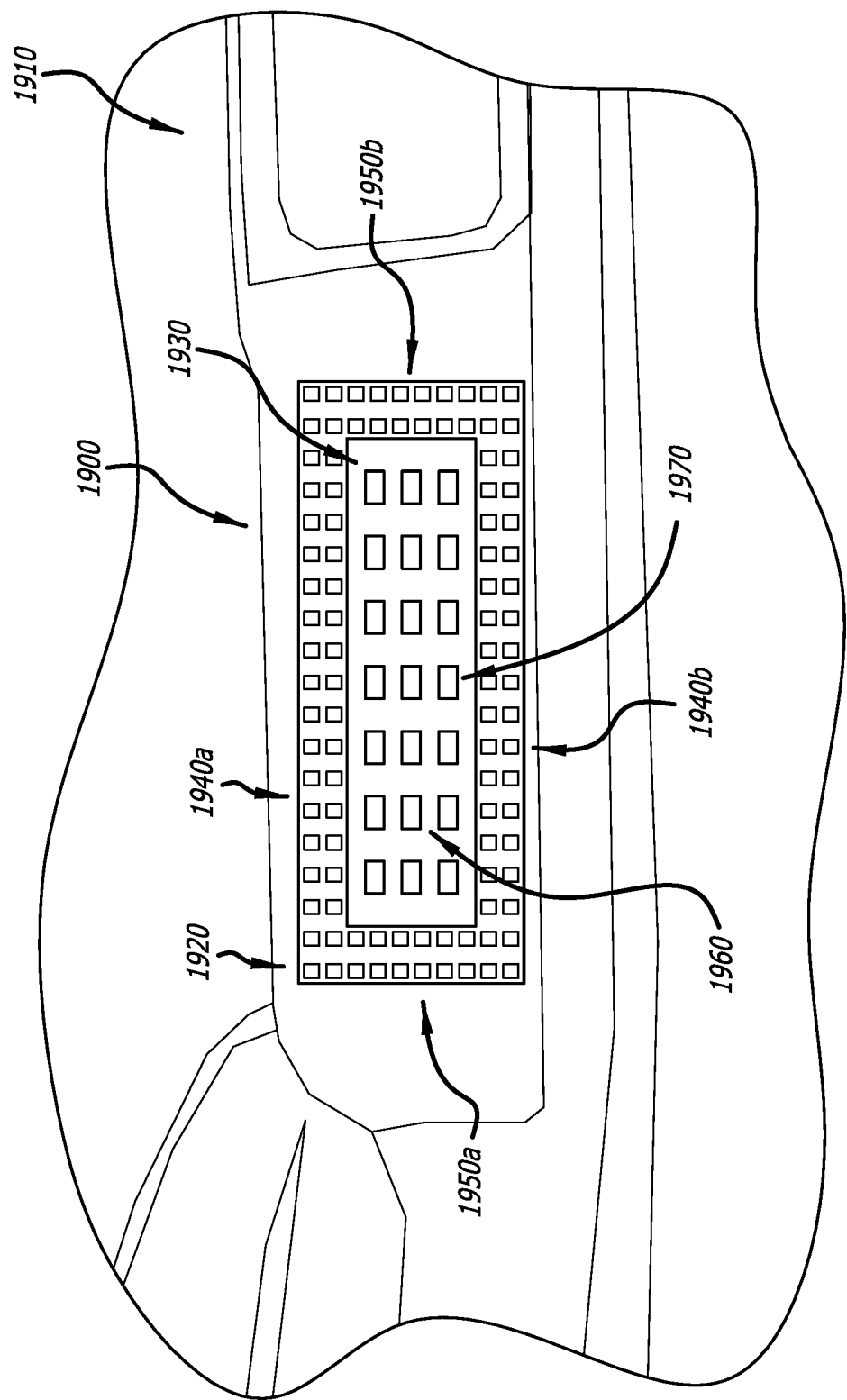
FIG. 19 illustrates a schematic diagram of a headlight radar system employing a plurality of combination elements in accordance with some implementations of the subject technology.

FIG. 19 illustrates a schematic diagram of a headlight radar system 1900 employing a plurality of combination elements 1960 in accordance with some implementations of the subject technology. The headlight radar system 1900 of FIG. 19 is similar to the headlight radar system 1700 of FIG. 17, except that the headlight 1930 of the headlight radar system 1900 of FIG. 19 comprises an array of combination elements 1960 instead of an array of LEDs 1760 (refer to FIG. 17).

Figure 20A:
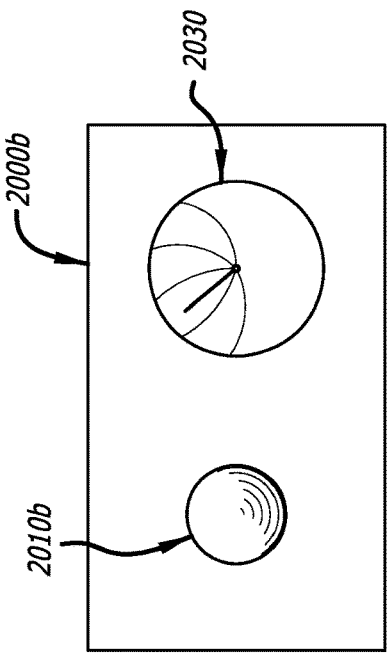
FIG. 20A illustrates a schematic diagram of a combination element employing a light emitting diode (LED) and a patch antenna in accordance with some implementations of the subject technology.
Figure 20B:
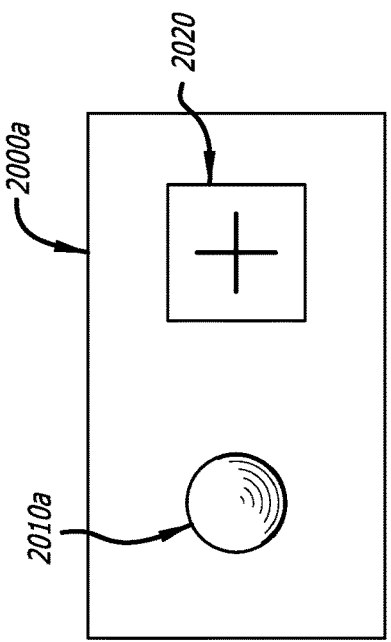
FIG. 20B illustrates a schematic diagram of a combination element employing a LED and a cup-dipole antenna in accordance with some implementations of the subject technology.
Figure 20C:
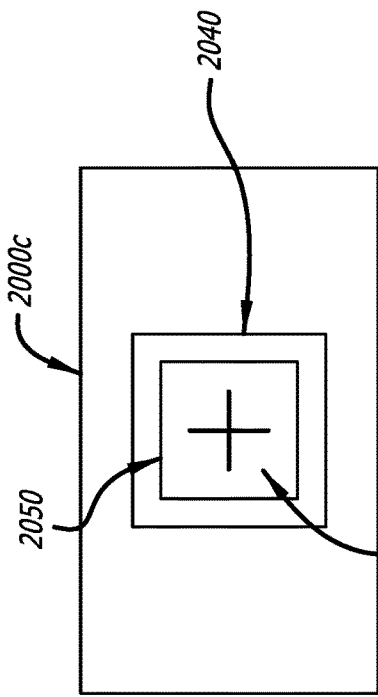
FIG. 20C illustrates a schematic diagram of a combination element employing a conformal LED with a patch antenna in accordance with some implementations of the subject technology.

In one or more implementations, each element 1970 of the array of combination elements 1960 comprises at least one lighting unit (e.g., an LED) and at least one RF antenna. Refer to FIGS. 20A, 20B, and 20C to view different types of exemplary elements 2000a, 2000b, 2000c that may be employed for each of the elements 1970 of the array of combination elements 1960 of FIG. 19. For each element 1970 of the array of combination elements 1960 at least one lighting unit and at least one RF antenna may be separate units (e.g., refer to combinations elements 2000a and 2000b of FIGS. 20A and 20B, respectively) or housed (e.g., formed) together as a single unit (e.g., refer to combination element 2000c of FIG. 20C).

Various different types of RF antennas may be employed for the RF antenna of each of the elements 1970 of the array of combination elements 1960 including, but not limited to, a patch antenna, a dipole antenna, an antenna horn (e.g., a conical, pyramidal, or a corrugated horn), and a cup-dipole antenna. In addition, the RF antennas employed for the elements 1970 of the array of combination elements 1960 may be of various different polarizations including horizontal polarization, vertical polarization, right-hand circular-polarization, and/or left-hand circular-polarization. Also, in one or more implementations, each RF antenna of each of the elements 1970 of the array of combination elements 1960 may be a RF transmit antenna, a RF receive antenna, or a RF transmit and receive antenna.

The headlight radar system 1900 of FIG. 19 also comprises a conformal radar array 1920 (e.g., similar to the continuously steering phased array radar system 1200 of FIG. 12) configured around the headlight 1930 of the vehicle 1910. The conformal radar array 1920 of the headlight radar system 1900 comprises two arrays of transmit elements 1940a, 1940b and two arrays of receive elements 1950a, 1950b. Each of the two arrays of transmit elements 1940a, 1940b are configured around a respective portion of a perimeter of the headlight 1930, and each of the two arrays of receive elements 1950a, 1950b are configured around a respective different portion of the perimeter of the headlight 1930.

During operation of the headlight radar system 1900, at least one lighting unit (e.g., LED) of the elements 1970 in the array of combination elements 1960 radiates light. In addition, at least one RF antenna of the elements 1970 in the array of combination elements 1960 and the arrays of transmit elements 1940a, 1940b each transmit at least one transmit signal. At least one transmit signal then reflects off of at least one object (e.g., a target, such as vehicles 110, 114, 120 of FIG. 1) to generate at least one receive signal. Then, at least one RF antenna of the elements 1970 in the array of combination elements 1960 and the arrays of receive elements 1750a, 1750b each receive at least one receive signal.

It should be noted that in one or more implementations, during operation, the RF antennas of the elements 1970 in the array of combination elements 1960 may or may not be transmitting and/or receiving. In addition, in one or more implementations, the RF antennas of the elements 1970 in the array of combination elements 1960 and the arrays of transmit elements 1940a, 1940b may be transmitting transmit signals on the same or different transmit frequency bands. Similarly, the RF antennas of the elements 1970 in the array of combination elements 1960 and the arrays of receive elements 1950a, 1950b may be receiving receive signals on the same or different receive frequency bands.

FIG. 20A illustrates a schematic diagram of a combination element 2000a employing a LED 2010a and a patch antenna 2000a in accordance with some implementations of the subject technology. In this figure, combination element 2000a comprises an LED 2010a and a patch antenna 2020 that are two separate units. The patch antenna 2020 in FIG. 20A is shown to be linearly polarized. However, in other implementations, a circularly polarized patch antenna may be employed for the combination element 2000a instead. The patch antenna 2020 may be a RF transmit antenna, a RF receive antenna, or a RF transmit and receive antenna.

FIG. 20B illustrates a schematic diagram of a combination element 2000b employing a LED 2010b and a cup-dipole antenna 2030 in accordance with some implementations of the subject technology. In this figure, combination element 2000b comprises an LED 2010b and a cup-dipole antenna 2030 that are two separate units. The cup-dipole antenna 2030 may be linearly polarized or circularly polarized. In addition, the cup-dipole antenna 2030 may be a RF transmit antenna, a RF receive antenna, or a RF transmit and receive antenna.

FIG. 20C illustrates a schematic diagram of a combination element 2000c employing a conformal LED 2050 with a patch antenna 2060 in accordance with some implementations of the subject technology. The LED 2050 is formed to be conformal to the patch antenna 2060 such that the LED 2050 and patch antenna 2060 together form a single unit 2040. The patch antenna 2060 is depicted to be linearly polarized. However, in other implementations, a circularly polarized patch antenna may be employed for the combination element 2000c instead. The patch antenna 2060 may be a RF transmit antenna, a RF receive antenna, or a RF transmit and receive antenna.

Figure 21:
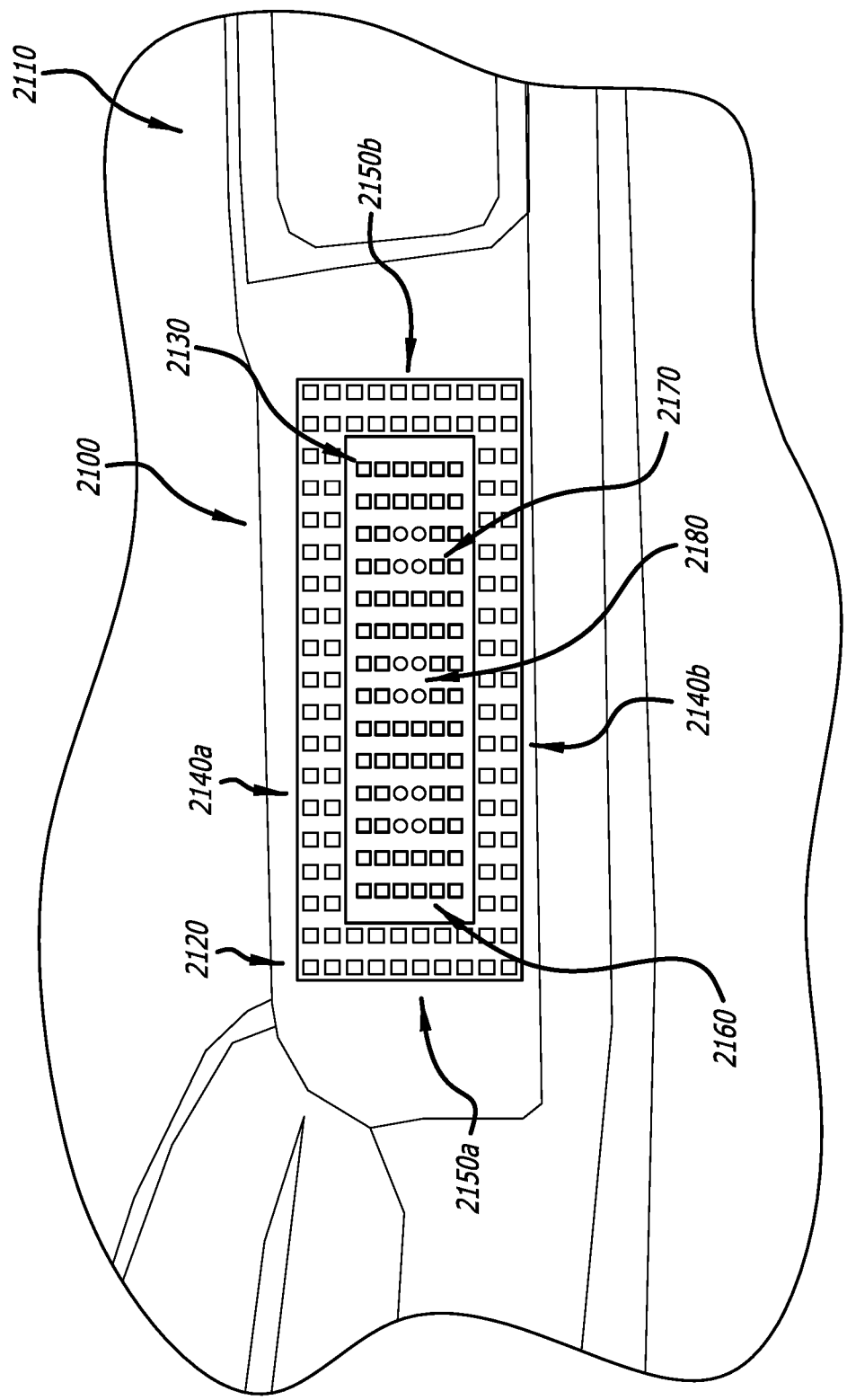
FIG. 21 illustrates a schematic diagram of a headlight radar system employing a combination array in accordance with some implementations of the subject technology.

FIG. 21 illustrates a schematic diagram of a headlight radar system 2100 employing a combination array 2160 in accordance with some implementations of the subject technology. The headlight radar system 2100 of FIG. 21 is similar to the headlight radar system 1900 of FIG. 19, except that the headlight 2130 of the headlight radar system 2100 of FIG. 21 comprises a combination array 2160 instead of an array of combination elements 1960 (refer to FIG. 19).

In one or more implementations, the combination array 2160 comprises a plurality of LEDs 2180 and a plurality of RF antennas 2170. Various different types of RF antennas may be employed for the RF antennas 2170 of the combination array 2160 including, but not limited to, a patch antenna, a dipole antenna, an antenna horn (e.g., a conical, pyramidal, or a corrugated horn), and a cup-dipole antenna. In addition, the RF antennas 2170 in the combination array 2160 may be of various different polarizations including horizontal polarization, vertical polarization, right-hand circular-polarization, and/or left-hand circular-polarization. In addition, each RF antenna 2170 in the combination array 2160 may be a RF transmit antenna, a RF receive antenna, or a RF transmit and receive antenna.

The headlight radar system 2100 also comprises a conformal radar array 2120 (e.g., similar to the continuously steering phased array radar system 1200 of FIG. 12) configured around the headlight 2130 of the vehicle 2110. The conformal radar array 2120 of the headlight radar system 2100 comprises two arrays of transmit elements 2140a, 2140b and two arrays of receive elements 2150a, 2150b. Each of the two arrays of transmit elements 2140a, 2140b is configured around a respective portion of a perimeter of the headlight 2130, and each of the two arrays of receive elements 2150a, 2150b is configured around a respective different portion of the perimeter of the headlight 2130.

During operation of the headlight radar system 2100, at least one LED 2180 in combination array 2160 radiates light. In addition, at least one RF antenna 2170 in the combination array 2160 and the arrays of transmit elements 2140a, 2140b transmits at least one transmit signal. At least one transmit signal then reflects off of at least one object (e.g., a target, such as vehicles 110, 114, 120 of FIG. 1) to generate at least one receive signal. Then, at least one RF antenna 2170 in the combination array 2160 and the arrays of receive elements 2150a, 2150b receives at least one receive signal.

In one or more implementations, during operation, the RF antennas 2170 of the combination array 2160 may or may not be transmitting and/or receiving. In addition, in one or more implementations, the RF antennas 2170 of the combination array 2160 and the arrays of transmit elements 2140a, 2140b may be transmitting transmit signals on the same or different transmit frequency bands. Similarly, the RF antennas 2170 of the combination array 2160 and the arrays of receive elements 2150a, 2150b may be receiving receive signals on the same or different receive frequency bands.

Figure 22A:
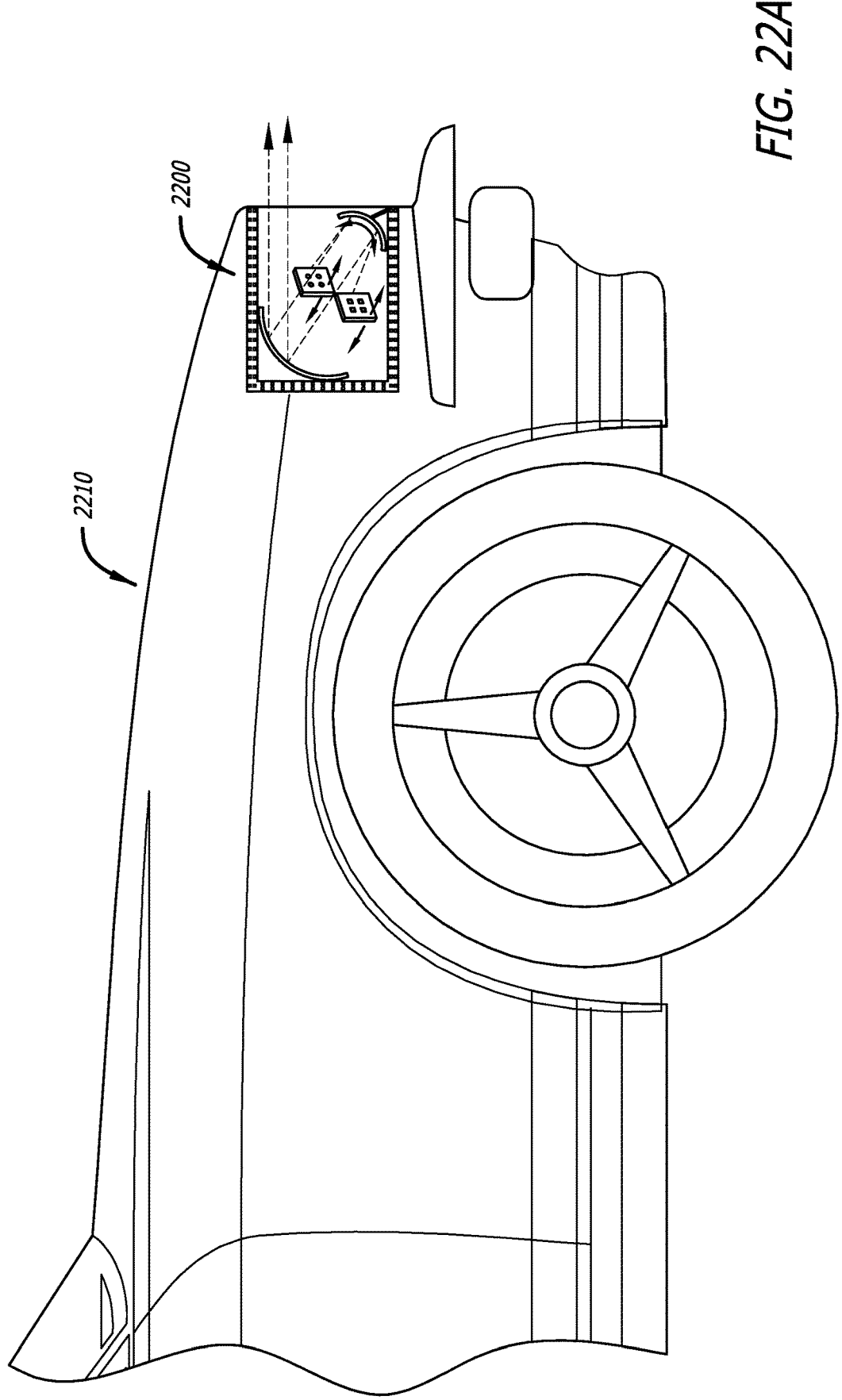
FIG. 22A illustrates a schematic diagram of a reflector headlight radar system implemented in an ego vehicle in accordance with some implementations of the subject technology.
Figure 22B:
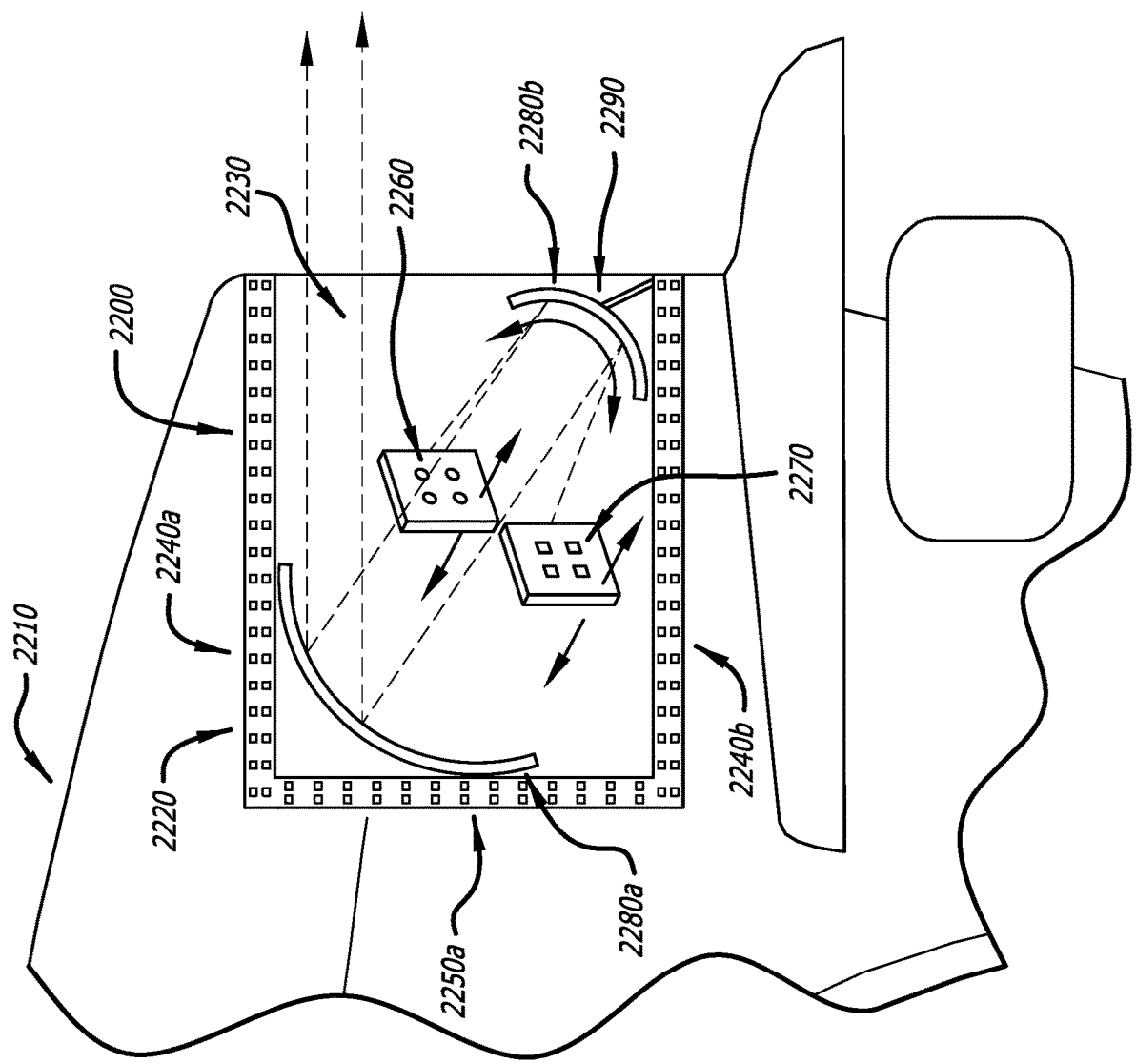
FIG. 22B illustrates a schematic diagram of the reflector headlight radar system of FIG. 22A, which employs dual reflectors with LEDs and antenna elements, in accordance with some implementations of the subject technology.

FIG. 22A illustrates a schematic diagram of a reflector headlight radar system 2200 implemented in an ego vehicle 2210 in accordance with some implementations of the subject technology. FIG. 22B illustrates a schematic diagram of the reflector headlight radar system 2200 of FIG. 22A, which employs dual reflectors 2280a, 2280b with LEDs 2260 and antenna elements 2270, in accordance with some implementations of the subject technology.

The headlight 2230 of the headlight radar system 2200 comprises a dual reflector system, which comprises a main reflector 2280a and a subreflector 2280b. The dual reflector system of the headlight radar system 2200 may be a Gregorian dual reflector system or a Cassegrain dual reflector system. Each of the reflectors 2280a, 2280b may be a parabolic reflector or a non-parabolic reflector. A gimballing mechanism 2290 may be employed for each of the reflectors 2280a, 2280b to gimbal at least one of the reflectors 2280a, 2280b to steer a transmit and/or receive beam and to steer a radiated light beam.

The headlight radar system 2200 also comprises a plurality of LEDs 2260 that are mounted together on a mounting, and comprises a plurality of antenna elements (e.g., RF antennas) 2270 that are mounted together on another mounting. Various different types of RF antennas may be employed for the antenna elements 2270 of the headlight radar system 2200 including, but not limited to, a patch antenna, a dipole antenna, an antenna horn (e.g., a conical, pyramidal, or a corrugated horn), and a cup-dipole antenna. In addition, the RF antennas employed for the antenna elements 2270 may be of various different polarizations including horizontal polarization, vertical polarization, right-hand circular-polarization, and/or left-hand circular-polarization. Also, each RF antenna of the antenna elements 2270 may be a RF transmit antenna, a RF receive antenna, or a RF transmit and receive antenna. In one or more implementations, the plurality of antenna elements 2270 is a phased array antenna.

A translation mechanism (not shown) may be employed for the plurality of LEDs 2260 to translate the LEDs 2260 to adjust (i.e. narrow or broaden) the beam width of a radiated light beam. In addition, another translation mechanism (not shown) may be employed for the plurality of antenna elements 2270 to translate the antenna elements 2270 to adjust (i.e. narrow or broaden) the beam width of a radiated transmit beam and/or a radiated receive beam.

During operation of the dual reflector system of the headlight radar system 2200, the plurality of LEDs 2260 radiates light. At least some of the radiated light reflects of the subreflector 2280b to generate a first reflected light beam. A least a portion of the first reflected light beam then reflects off of the main reflector 2280a to generate a second reflected light beam. The second reflected light beam radiates away from the vehicle 2210. In some implementations, the translation mechanism (not shown) for the LEDs 2260 translates the LEDs 2260 to adjust (i.e. narrow or broaden) the beam width of the radiated light beam (e.g., the second reflected light beam).

Also during operation of the dual reflector system, at least one RF transmit element in the plurality of antenna elements 2270 transmits at least one transmit signal. At least one transmit signal reflects off of the subreflector 2280b to generate at least one first reflected transmit signal. At least one first reflected transmit signal reflects off of the main reflector 2280a to generate at least one second reflected transmit signal, which is radiated away from the vehicle 2210. At least one second reflected transmit signal reflects off of at least one target (e.g. an object) to generate at least one target signal, which is radiated towards the vehicle 2210. At least one target signal reflects off of the main reflector 2280a to generate at least one first receive signal. At least one first receive signal reflects off of the subreflector 2280b to generate at least one second receive signal. Then, at least one RF receive element in the plurality of antenna elements 2270 receives at least one second receive signal.

In some implementations, the translation mechanism (not shown) for the antenna elements 2270 translates the antenna elements 2270 to adjust (i.e. narrow or broaden) the beam width of the radiated transmit beam (e.g., the second reflected transmit signal) and/or the beam width of the radiated receive beam (e.g., the second receive signal).

Also, in one or more implementations, the gimbal mechanism 2290 for the subreflector 2280b gimbals the subreflector 2280b and/or the gimbal mechanism (not shown) for the main reflector 2280a gimbals the main reflector 2280a to steer the radiated light beam (e.g., the second reflected light beam) and to steer the radiated transmit beam (e.g., the second reflected transmit signal) and/or to steer the radiated receive beam (e.g., the second receive signal).

In one or more implementations, when the plurality of antenna elements 2270 is a phased array antenna, phase shift elements coupled to the individual RF transmit antenna elements and/or to the individual RF receive antenna elements of the plurality of antenna elements 2270 apply a phase shift to change the phase of the radiated transmit beam (e.g., the second reflected transmit signal) and/or the radiated receive beam (e.g., the second receive signal) to steer the radiated transmit beam (e.g., the second reflected transmit signal) and/or the radiated receive beam (e.g., the second receive signal).

In this figure, the headlight radar system 2200 also comprises a conformal radar array 2220 (e.g., similar to the continuously steering phased array radar system 1200 of FIG. 12) implemented around the headlight (i.e. a lighting device) 2230 of the vehicle 2210. The conformal radar array 2220 of the headlight radar system 2200 comprises two arrays of transmit elements 2240a, 2240b and two arrays of receive elements 2250a (second array of receive elements not visible in figure). Each of the two arrays of transmit elements 2240a, 2240b are configured around a respective portion of a perimeter of the headlight 2230, and each of the two arrays of receive elements 2250a are configured around a respective different portion of the perimeter of the headlight 2230. It should be noted that, in one or more implementations of the headlight radar system 2200, there may be less or more than two arrays of transmit elements 2240a, 2240b and/or less or more than two arrays of receive elements 2250a. It should be noted that in some implementations of the headlight radar system 2200, the headlight radar system 2200 does not comprise the conformal radar array 2220

During operation of the conformal radar array 2220 of the headlight radar system 2200, the arrays of transmit elements 2240a, 2240b each transmit at least one transmit signal. At least one transmit signal then reflects off of at least one object (e.g., a target, such as vehicles 110, 114, 120 of FIG. 1) to generate at least one receive signal. Then, the arrays of receive elements 2250a, 2250b each receive at least one receive signal.

In one or more implementations, the headlight radar system 2200 may be employed in various different types of vehicles other than an ego vehicle (e.g., an automobile) 2210 as is shown in FIGS. 22A and 22B. Various different types of vehicles that the headlight radar system 2200 may be employed in include, but are not limited to, terrestrial vehicles (e.g., trucks, tanks, buses, or trains), marine vehicles (e.g., boats or ships), and airborne vehicles (e.g., aircraft). The various different types of vehicles may be manual vehicles or autonomous vehicles (e.g., unmanned vehicles). In some implementations, the headlight radar system 2200 may be employed in structures (e.g., buildings) or devices (e.g., electronic devices and machinery).

Figure 23:
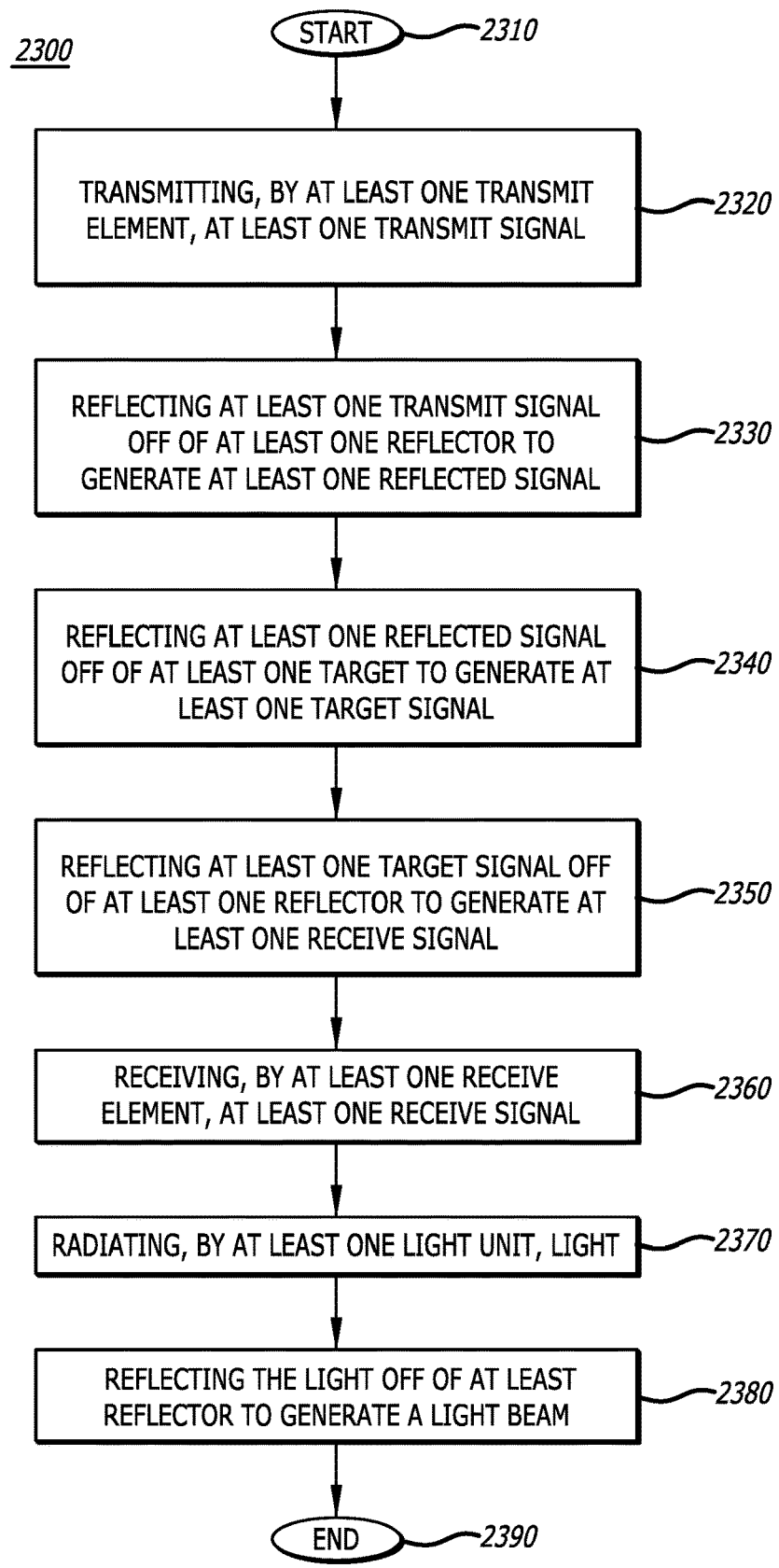
FIG. 23 illustrates a flow chart for the disclosed method for operation of a reflector radar system in accordance with some implementations of the subject technology.

FIG. 23 illustrates a flow chart for the disclosed method 2300 for operation of a reflector radar system in accordance with some implementations of the subject technology. At the start 2310 of the method 2300, at least one transmit element transmits at least one transmit signal 2320. Then, at least one transmit signal reflects off of at least one reflector to generate at least one reflected signal 2330. At least one reflected signal then reflects off of at least one target to generate at least one target signal 2340. Then, at least one target signal reflects off of at least one reflector to generate at least one receive signal 2350. At least one receive element then receives at least one receive signal 2360. Then, at least one light unit radiates light 2370. The light then reflects off of at least one reflector to generate a light beam 2380. Then, the method 2300 ends 2390.

Figure 24:
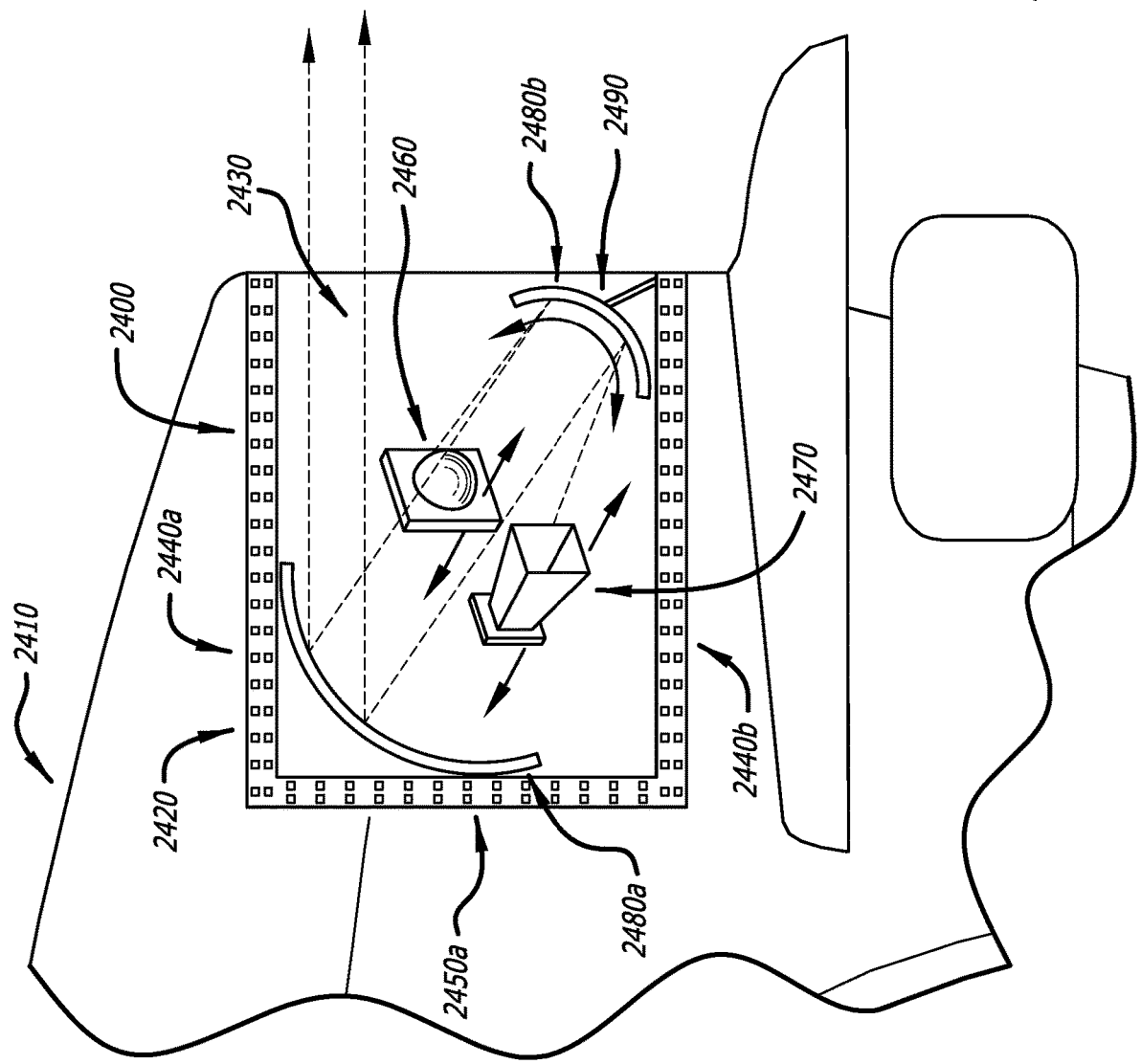
FIG. 24 illustrates a schematic diagram of a reflector headlight radar system, which employs dual reflectors with a light bulb and an antenna horn, in accordance with some implementations of the subject technology.

FIG. 24 illustrates a schematic diagram of a reflector headlight radar system 2400, which employs dual reflectors 2480a, 2480b with a light bulb 2460 and an antenna horn 2470, in accordance with some implementations of the subject technology. The reflector headlight radar system 2400 of FIG. 24 is similar to the reflector headlight radar system 2200 of FIGS. 22A and 22B, except that the reflector headlight radar system 2400 of FIG. 24 comprises a single antenna horn 2470 instead of a plurality of antenna elements 2270 (refer to FIG. 22B) and comprises a single light bulb 2460 instead of a plurality of LEDs 2260 (refer to FIG. 22B).

The headlight 2430 of the headlight radar system 2400 comprises a dual reflector system, which comprises a main reflector 2480a and a subreflector 2480b. A gimballing mechanism 2490 may be employed for each of the reflectors 2480a, 2480b to gimbal at least one of the reflectors 2480a, 2480b to steer a transmit and/or receive beam and to steer a radiated light beam. The headlight radar system 2400 also comprises a light bulb 2460 that is mounted on a mounting, and comprises an antenna horn 2470 that is mounted on another mounting. In one or more implementations, the headlight radar system 2400 may comprise more than one antenna horn 2470 and/or more than one light bulb 2460, as is shown in FIG. 24. Although the antenna horn 2470 is depicted as a pyramidal horn, various different types antenna horns may be employed for the antenna horn 2470 of the headlight radar system 2400 including, but not limited to, a conical horn or a corrugated horn. In addition, the antenna horn 2470 may be of various different polarizations including horizontal polarization, vertical polarization, right-hand circular-polarization, and/or left-hand circular-polarization. Also, the antenna horn may be a RF transmit antenna, a RF receive antenna, or a RF transmit and receive antenna.

A translation mechanism (not shown) may be employed for the light bulb 2460 to translate the light bulb 2460 to adjust (i.e. narrow or broaden) the beam width of a radiated light beam. In addition, another translation mechanism (not shown) may be employed for the antenna horn 2470 to translate the antenna horn 2470 to adjust (i.e. narrow or broaden) the beam width of a radiated transmit beam and/or a radiated receive beam.

During operation of the dual reflector system of the headlight radar system 2400, the light bulb 2460 radiates light. At least some of the radiated light reflects off of the subreflector 2480b to generate a first reflected light beam. A least a portion of the first reflected light beam then reflects off of the main reflector 2480a to generate a second reflected light beam, which radiates away from the vehicle 2410. In some implementations, the translation mechanism (not shown) for the light bulb 2460 translates the light bulb 2460 to adjust (i.e. narrow or broaden) the beam width of the radiated light beam (e.g., the second reflected light beam).

Also during operation of the dual reflector system, in one or more implementations, the antenna horn 2470 transmits at least one transmit signal. At one transmit signal reflects off of the subreflector 2480b to generate at least one first reflected transmit signal. At least one first reflected transmit signal reflects off of the main reflector 2480a to generate at least one second reflected transmit signal, which is radiated away from the vehicle 2410. At least one second reflected transmit signal reflects off of at least one target (e.g. an object) to generate a least one target signal, which is radiated towards the vehicle 2410. At least one target signal reflects off of the main reflector 2480a to generate at least one first receive signal. At least one first receive signal reflects off of the subreflector 2480b to generate at least one second receive signal. Then, the antenna horn 2470 receives at least one second receive signal.

In some implementations, the translation mechanism (not shown) for the antenna horn 2270 translates the antenna horn 2470 to adjust (i.e. narrow or broaden) the beam width of the radiated transmit beam (e.g., the second reflected transmit signal) and/or the beam width of the radiated receive beam (e.g., the second receive signal).

Also, in one or more implementations, the gimbal mechanism 2490 for the subreflector 2480b gimbals the subreflector 2480b and/or the gimbal mechanism (not shown) for the main reflector 2480a gimbals the main reflector 2480a to steer the radiated light beam (e.g., the second reflected light beam) and to steer the radiated transmit beam (e.g., the second reflected transmit signal) and/or to steer the radiated receive beam (e.g., the second receive signal).

In one or more implementations, the headlight radar system 2400 also comprises a conformal radar array 2420 (e.g., similar to the continuously steering phased array radar system 1200 of FIG. 12) implemented around the headlight (i.e. a lighting device) 2430 of the vehicle 2410. The conformal radar array 2420 of the headlight radar system 2400 comprises two arrays of transmit elements 2440a, 2440b and two arrays of receive elements 2450a (second array of receive elements not visible in figure). Each of the two arrays of transmit elements 2440a, 2440b is configured around a respective portion of a perimeter of the headlight 2430, and each of the two arrays of receive elements 2450a is configured around a respective different portion of the perimeter of the headlight 2430.

Figure 25:
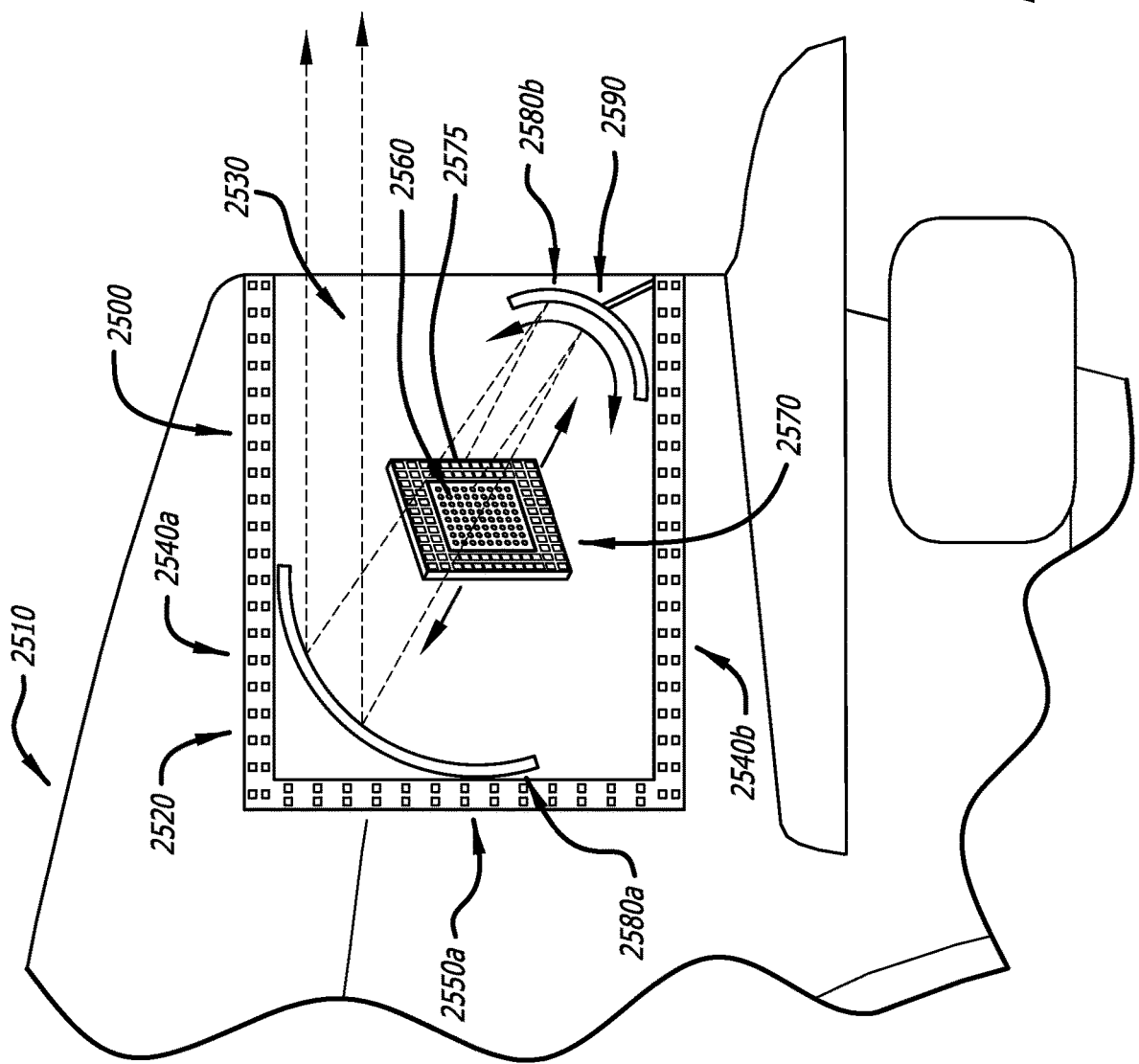
FIG. 25 illustrates a schematic diagram of a reflector headlight radar system, which employs dual reflectors with LEDs and antenna elements mounted together, in accordance with some implementations of the subject technology.

FIG. 25 illustrates a schematic diagram of a reflector headlight radar system 2500, which employs dual reflectors 2580a, 2580b with LEDs 2560 and antenna elements 2570 mounted together, in accordance with some implementations of the subject technology. The reflector headlight radar system 2500 of FIG. 25 is similar to the reflector headlight radar system 2200 of FIGS. 22A and 22B, except that the reflector headlight radar system 2500 of FIG. 25 comprises a plurality of antenna elements 2570 and a plurality of LEDs 2560 mounted together on a single mounting 2575 instead of mounted separately on two separate mountings (refer to FIGS. 22A and 22B).

The headlight 2530 of the headlight radar system 2500 comprises a dual reflector system, which comprises a main reflector 2580a and a subreflector 2580b. A gimballing mechanism 2590 may be employed for each of the reflectors 2580a, 2580b to gimbal at least one of the reflectors 2580a, 2580b to steer a transmit and/or receive beam and to steer a radiated light beam.

The headlight radar system 2500 also comprises a plurality of LEDs 2560 that are mounted together with a plurality of antenna elements (e.g., RF antennas) 2570 on a single mounting 2575. Various different types of RF antennas may be employed for the antenna elements 2570 of the headlight radar system 2500 including, but not limited to, a patch antenna, a dipole antenna, an antenna horn (e.g., a conical, pyramidal, or a corrugated horn), and a cup-dipole antenna. In addition, the RF antennas employed for the antenna elements 2570 may be of various different polarizations including horizontal polarization, vertical polarization, right-hand circular-polarization, and/or left-hand circular-polarization. Also, each RF antenna of the antenna elements 2570 may be a RF transmit antenna, a RF receive antenna, or a RF transmit and receive antenna. In one or more implementations, the plurality of antenna elements 2570 is a phased array antenna.

A translation mechanism (not shown) may be employed for the plurality of LEDs 2560 and the plurality of antenna elements 2570 (which are mounted together) to translate the LEDs 2560 and the antenna elements 2570 to adjust (i.e. narrow or broaden) the beam width of a radiated light beam and to adjust (i.e. narrow or broaden) the beam width of a radiated transmit beam and/or a radiated receive beam.

During operation of the dual reflector system of the headlight radar system 2500, the plurality of LEDs 2560 radiates light. At least some of the radiated light reflects of the subreflector 2580b to generate a first reflected light beam. A least a portion of the first reflected light beam then reflects off of the main reflector 2580a to generate a second reflected light beam. The second reflected light beam radiates away from the vehicle 2510.

Also during operation of the dual reflector system, at least one RF transmit element in the plurality of antenna elements 2570 transmits at least one transmit signal. At least one transmit signal reflects off of the subreflector 2580b to generate at least one first reflected transmit signal. At least one first reflected transmit signal reflects off of the main reflector 2580a to generate at least one second reflected transmit signal, which is radiated away from the vehicle 2510. At least one second reflected transmit signal reflects off of at least one target (e.g. an object) to generate a least one target signal, which is radiated towards the vehicle 2510. At least one target signal reflects off of the main reflector 2580a to generate at least one first receive signal. At least one first receive signal reflects off of the subreflector 2580b to generate at least one second receive signal. Then, at least one RF receive element in the plurality of antenna elements 2570 receives at least one second receive signal.

In some implementations, the translation mechanism (not shown) for the antenna elements 2570 and the LEDs 2560 translates the antenna elements 2570 and the LEDs 2560 to adjust (i.e. narrow or broaden) the beam width of the radiated light beam (e.g., the second reflected light beam) and to adjust (i.e. narrow or broaden) the beam width of the radiated transmit beam (e.g., the second reflected transmit signal) and/or the beam width of the radiated receive beam (e.g., the second receive signal).

Also, in one or more implementations, the gimbal mechanism 2590 for the subreflector 2580b gimbals the subreflector 2580b and/or the gimbal mechanism (not shown) for the main reflector 2580a gimbals the main reflector 2580a to steer the radiated light beam (e.g., the second reflected light beam) and to steer the radiated transmit beam (e.g., the second reflected transmit signal) and/or to steer the radiated receive beam (e.g., the second receive signal).

In one or more implementations, when the plurality of antenna elements 2570 is a phased array antenna, phase shift elements coupled to the individual RF transmit antenna elements and/or to the individual RF receive antenna elements of the plurality of antenna elements 2570 apply a phase shift to change the phase of the radiated transmit beam (e.g., the second reflected transmit signal) and/or the radiated receive beam (e.g., the second receive signal) to steer the radiated transmit beam (e.g., the second reflected transmit signal) and/or the radiated receive beam (e.g., the second receive signal).

In this figure, the headlight radar system 2500 also comprises a conformal radar array 2520 (e.g., similar to the continuously steering phased array radar system 1200 of FIG. 12) implemented around the headlight (i.e. a lighting device) 2530 of the vehicle 2510. The conformal radar array 2520 of the headlight radar system 2500 comprises two arrays of transmit elements 2540a, 2540b and two arrays of receive elements 2550a (second array of receive elements not visible in figure).

Figure 26:
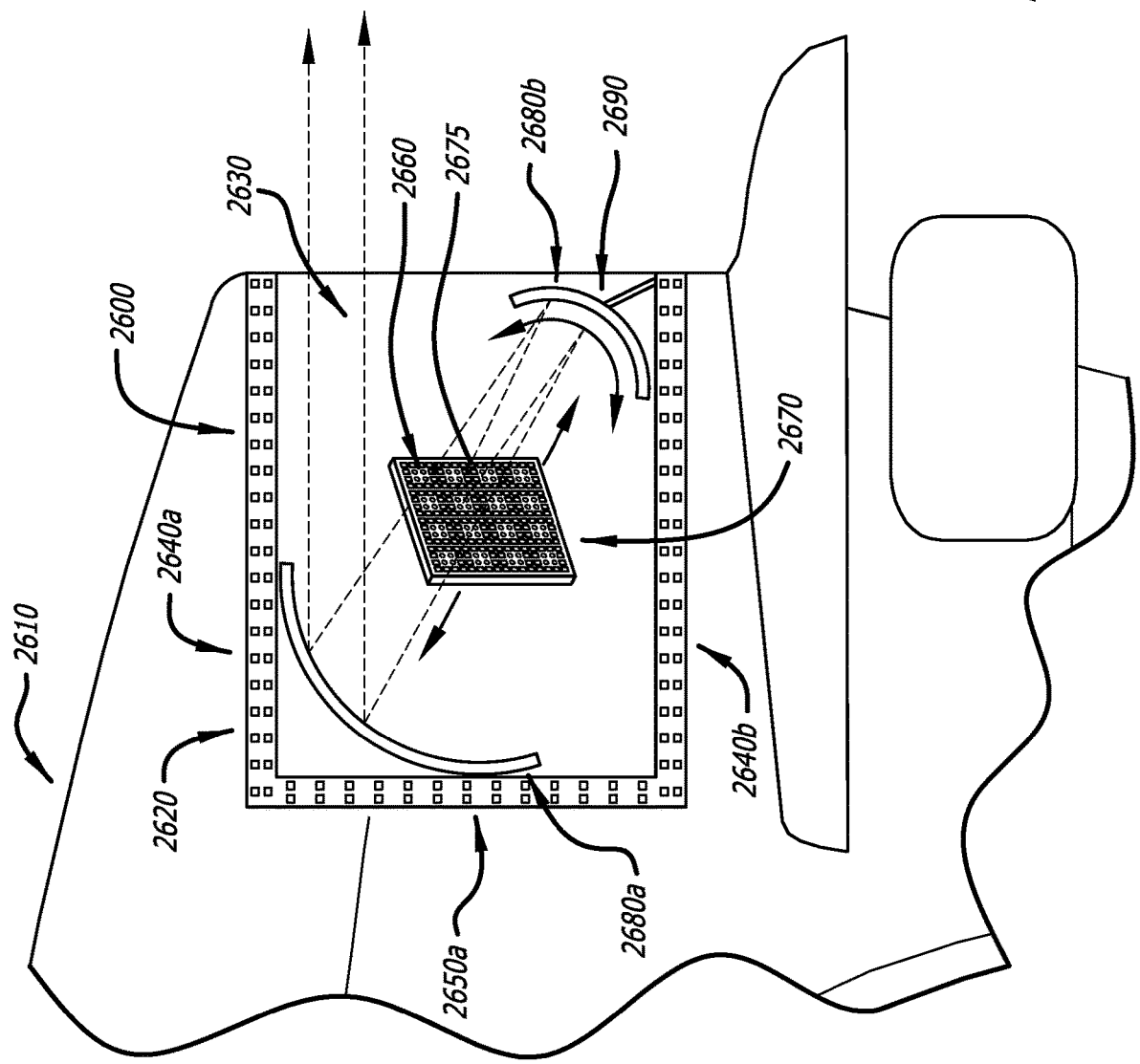
FIG. 26 illustrates a schematic diagram of a reflector headlight radar system, which employs dual reflectors with a combination array of LEDs and antenna elements, in accordance with some implementations of the subject technology.

FIG. 26 illustrates a schematic diagram of a reflector headlight radar system 2600, which employs dual reflectors 2680a, 2680b with a combination array 2675 of LEDs 2660 and antenna elements 2670, in accordance with some implementations of the subject technology. The reflector headlight radar system 2600 of FIG. 26 is similar to the reflector headlight radar system 2500 of FIG. 25, except that the reflector headlight radar system 2600 of FIG. 26 comprises a combination array 2675 comprising a plurality of antenna elements 2670 and a plurality of LEDs 2660, which are configured in a repeating pattern.

The headlight 2630 of the headlight radar system 2600 comprises a dual reflector system comprising a main reflector 2680a and a subreflector 2680b. A gimballing mechanism 2690 may be employed for each of the reflectors 2680a, 2680b to gimbal at least one of the reflectors 2680a, 2680b to steer a transmit and/or receive beam and to steer a radiated light beam.

The headlight radar system 2600 also comprises the combination array 2675 comprising a plurality of LEDs 2660 that are mounted together with a plurality of antenna elements (e.g., RF antennas) 2670 on a single mounting. Various different types of RF antennas may be employed for the antenna elements 2670 of the headlight radar system 2600 including, but not limited to, a patch antenna, a dipole antenna, an antenna horn (e.g., a conical, pyramidal, or a corrugated horn), and a cup-dipole antenna. In addition, the RF antennas employed for the antenna elements 2670 may be of various different polarizations including horizontal polarization, vertical polarization, right-hand circular-polarization, and/or left-hand circular-polarization. In addition, each RF antenna of the antenna elements 2670 may be a RF transmit antenna, a RF receive antenna, or a RF transmit and receive antenna. In one or more implementations, the plurality of antenna elements 2670 may together form a phased array antenna.

A translation mechanism (not shown) may be employed for combination array 2675 to translate the LEDs 2660 and the antenna elements 2670 of the combination array 2675 to adjust (i.e. narrow or broaden) the beam width of a radiated light beam and to adjust (i.e. narrow or broaden) the beam width of a radiated transmit beam and/or a radiated receive beam.

During operation of the dual reflector system of the headlight radar system 2600, the plurality of LEDs 2660 of the combination array 2675 radiates light. At least some of the radiated light reflects of the subreflector 2680b to generate a first reflected light beam. A least a portion of the first reflected light beam then reflects off of the main reflector 2680a to generate a second reflected light beam. The second reflected light beam radiates away from the vehicle 2610.

Also during operation of the dual reflector system, at least one RF transmit element in the plurality of antenna elements 2670 of the combination array 2675 transmits at least one transmit signal. At one transmit signal reflects off of the subreflector 2680b to generate at least one first reflected transmit signal. At least one first reflected transmit signal reflects off of the main reflector 2680a to generate at least one second reflected transmit signal, which is radiated away from the vehicle 2610. At least one second reflected transmit signal reflects off of at least one target (e.g. an object) to generate a least one target signal, which is radiated towards the vehicle 2610. At least one target signal reflects off of the main reflector 2680a to generate at least one first receive signal. At least one first receive signal reflects off of the subreflector 2680b to generate at least one second receive signal. Then, at least one RF receive element in the plurality of antenna elements 2670 of the combination array 2675 receives at least one second receive signal.

In one or more implementations, the translation mechanism (not shown) for the combination array 2675 translates the antenna elements 2670 and the LEDs 2660 of the combination array 2675 to adjust (i.e. narrow or broaden) the beam width of the radiated light beam (e.g., the second reflected light beam) and to adjust (i.e. narrow or broaden) the beam width of the radiated transmit beam (e.g., the second reflected transmit signal) and/or the beam width of the radiated receive beam (e.g., the second receive signal).

In some implementations, the gimbal mechanism 2690 for the subreflector 2680b gimbals the subreflector 2680b and/or the gimbal mechanism (not shown) for the main reflector 2680a gimbals the main reflector 2680a to steer the radiated light beam (e.g., the second reflected light beam) and to steer the radiated transmit beam (e.g., the second reflected transmit signal) and/or to steer the radiated receive beam (e.g., the second receive signal).

In some implementations, when the plurality of antenna elements 2670 of the combination array 2675 together form a phased array antenna, phase shift elements coupled to the individual RF transmit antenna elements and/or to the individual RF receive antenna elements of the plurality of antenna elements 2670 of the combination array 2675 apply a phase shift to change the phase of the radiated transmit beam (e.g., the second reflected transmit signal) and/or the radiated receive beam (e.g., the second receive signal) to steer the radiated transmit beam (e.g., the second reflected transmit signal) and/or the radiated receive beam (e.g., the second receive signal).

The headlight radar system 2600 also comprises a conformal radar array 2620 (e.g., similar to the continuously steering phased array radar system 1200 of FIG. 12) implemented around the headlight (i.e. a lighting device) 2630 of the vehicle 2610. The conformal radar array 2620 of the headlight radar system 2600 comprises two arrays of transmit elements 2640a, 2640b and two arrays of receive elements 2650a (second array of receive elements not visible in figure).

Figure 27:
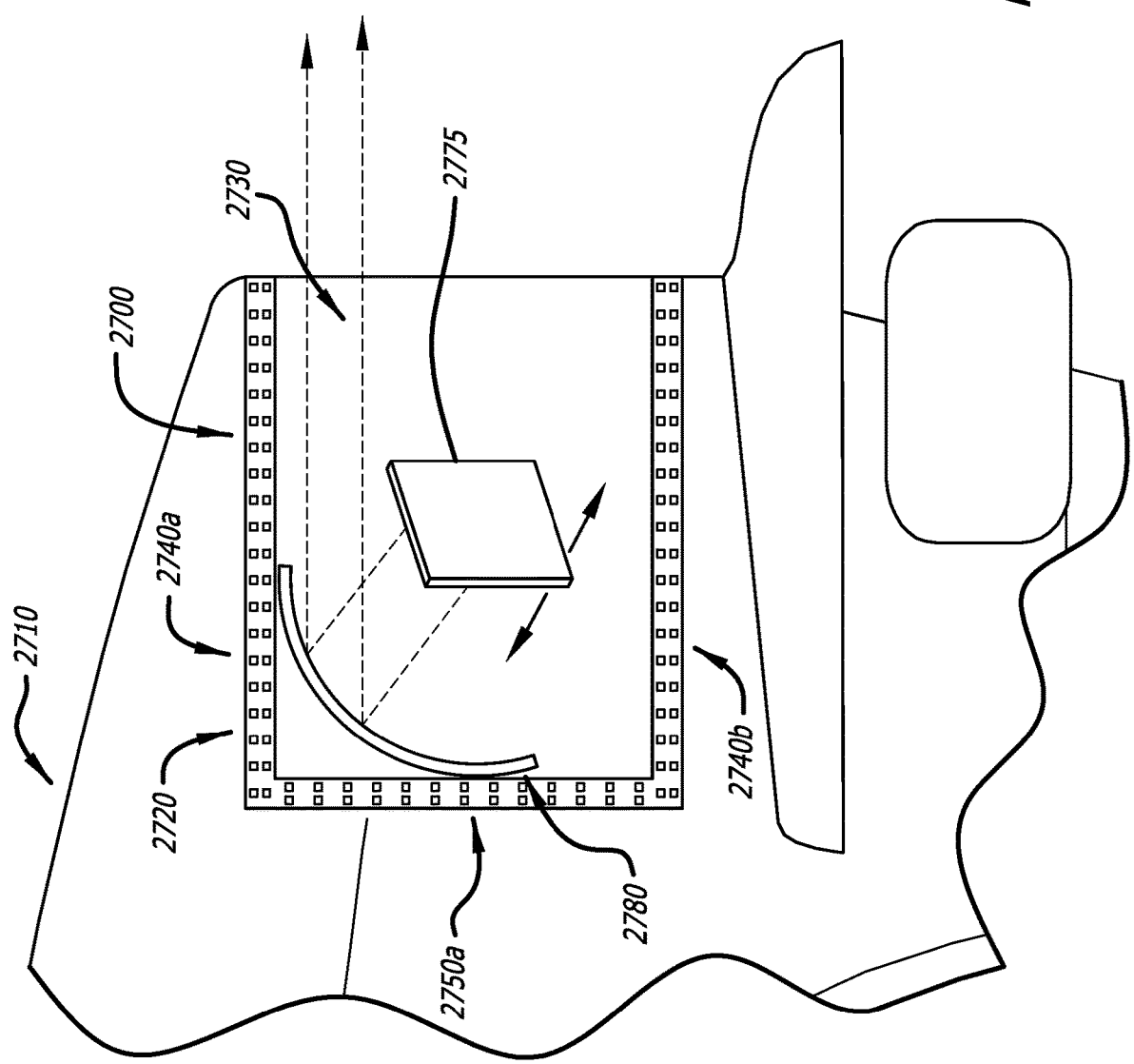
FIG. 27 illustrates a schematic diagram of a reflector headlight radar system, which employs a single reflector with a combination array of LEDs and antenna elements, in accordance with some implementations of the subject technology.

FIG. 27 illustrates a schematic diagram of a reflector headlight radar system 2700, which employs a single reflector 2780 with a combination array 2775 of LEDs (not visible in figure) and antenna elements (not visible in figure), in accordance with some implementations of the subject technology. The reflector headlight radar system 2700 of FIG. 27 is similar to the reflector headlight radar system 2600 of FIG. 26, except that the reflector headlight radar system 2700 of FIG. 27 comprises a single reflector 2780 instead of a dual reflector system comprising dual reflectors 2680a, 2680b (refer to FIG. 26).

The headlight 2730 of the headlight radar system 2700 comprises the single reflector 2780. A gimballing mechanism (not shown) may be employed for the reflector 2780 to gimbal the reflector 2780 to steer a transmit and/or receive beam and to steer a radiated light beam.

The headlight radar system 2700 also comprises the combination array 2775 comprising a plurality of LEDs (not visible in figure) that are mounted together with a plurality of antenna elements (e.g., RF antennas) (not visible in figure) on a single mounting. It should be noted that the front side of the combination array 2775 is not visible in FIG. 27, but rather the back side of the combination array 2775 is visible in FIG. 27. To view the front side of the combination array 2775, refer to the combination array 2675 as shown in FIG. 26. Various different types of RF antennas may be employed for the antenna elements of the combination array 2775 of the headlight radar system 2700 including, but not limited to, a patch antenna, a dipole antenna, an antenna horn (e.g., a conical, pyramidal, or a corrugated horn), and a cup-dipole antenna. In addition, the RF antennas employed for the antenna elements of the combination array 2775 may be of various different polarizations including horizontal polarization, vertical polarization, right-hand circular-polarization, and/or left-hand circular-polarization. In addition, each RF antenna of the antenna elements of the combination array 2775 may be a RF transmit antenna, a RF receive antenna, or a RF transmit and receive antenna. In one or more implementations, the plurality of antenna elements of the combination array 2775 may together form a phased array antenna.

A translation mechanism (not shown) may be employed for combination array 2775 to translate the LEDs and the antenna elements of the combination array 2775 to adjust (i.e. narrow or broaden) the beam width of a radiated light beam and to adjust (i.e. narrow or broaden) the beam width of a radiated transmit beam and/or a radiated receive beam.

During operation of the headlight radar system 2700, the plurality of LEDs of the combination array 2775 radiates light. At least some of the radiated light reflects of the reflector 2780 to generate a reflected light beam. The reflected light beam radiates away from the vehicle 2710.

Also during operation, at least one RF transmit element in the plurality of antenna elements of the combination array 2775 transmits at least one transmit signal. At least one transmit signal reflects off of the reflector 2780 to generate at least one reflected signal, which is radiated away from the vehicle 2710. At least one reflected signal reflects off of at least one target (e.g. an object) to generate a least one target signal, which is radiated towards the vehicle 2710. At least one target signal then reflects off of the reflector 2780 to generate at least one receive signal. Then, at least one RF receive element in the plurality of antenna elements of the combination array 2775 receives at least one receive signal.

In one or more implementations, the translation mechanism (not shown) for the combination array 2775 translates the antenna elements and the LEDs of the combination array 2775 to adjust (i.e. narrow or broaden) the beam width of the radiated light beam (e.g., the reflected light beam) and to adjust (i.e. narrow or broaden) the beam width of the radiated transmit beam (e.g., the reflected signal) and/or the beam width of the radiated receive beam (e.g., the receive signal).

In some implementations, the gimbal mechanism (not shown) for the reflector 2780 gimbals the reflector 2780 to steer the radiated light beam (e.g., the reflected light beam) and to steer the radiated transmit beam (e.g., the reflected signal) and/or to steer the radiated receive beam (e.g., the receive signal).

In some implementations, when the plurality of antenna elements of the combination array 2775 together form a phased array antenna, phase shift elements coupled to the individual RF transmit antenna elements and/or to the individual RF receive antenna elements of the plurality of antenna elements of the combination array 2775 apply a phase shift to change the phase of the radiated transmit beam (e.g., the reflected signal) and/or the radiated receive beam (e.g., the receive signal) to steer the radiated transmit beam (e.g., the reflected signal) and/or the radiated receive beam (e.g., the receive signal).

The headlight radar system 2700 also comprises a conformal radar array 2720 (e.g., similar to the continuously steering phased array radar system 1200 of FIG. 12) implemented around the headlight (i.e. a lighting device) 2730 of the vehicle 2710. The conformal radar array 2720 of the headlight radar system 2700 comprises two arrays of transmit elements 2740*a*, 2740*b* and two arrays of receive elements 2750*a* (second array of receive elements not visible in figure).

Figure 28:
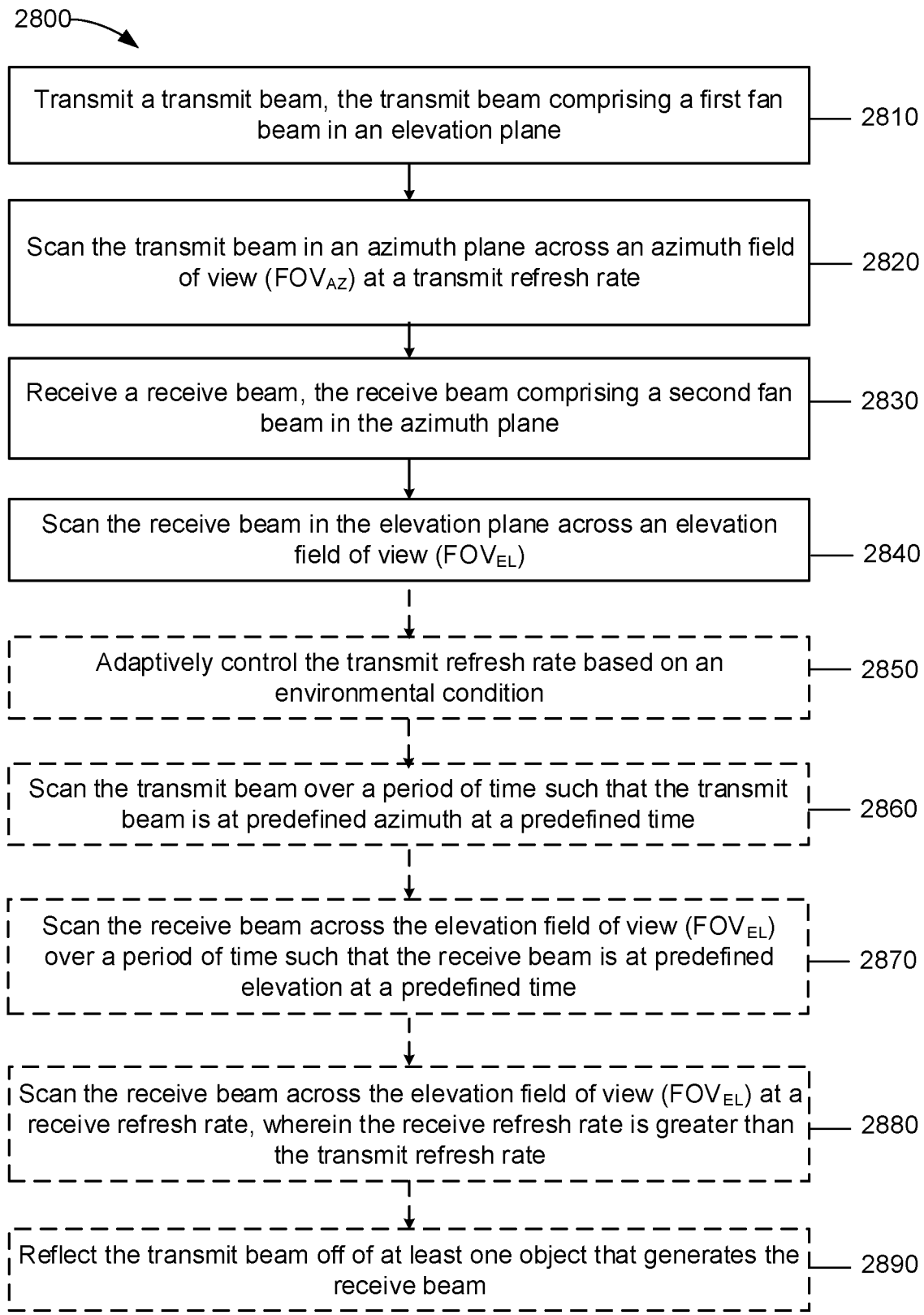
FIG. 28 illustrates a flow chart for the disclosed method for operating a radar system, in accordance with some implementations of the subject technology.

FIG. 28 illustrates a flow chart for a disclosed method 2800 for operating a radar system, in accordance with some implementations of the subject technology. In accordance with various embodiments, the method 2800 includes transmitting a transmit beam, the transmit beam comprising a first fan beam in an elevation plane at step 2810; scanning the transmit beam in an azimuth plane across an azimuth field of view ($FOV_{AZ}$) at a transmit refresh rate at step 2820; receiving a receive beam, the receive beam comprising a second fan beam in the azimuth plane at step 2830; and scanning the receive beam in the elevation plane across an elevation field of view ($FOV_{EL}$) at step 2840.

In various embodiments, the radar system includes an array of transmit elements and an array of receive elements, wherein the array of transmit elements is configured to transmit the transmit beam and the array of receive elements is configured to transmit the receive beam.

In various embodiments, the method 2800 optionally includes, at step 2850, adaptively controlling the transmit refresh rate based on an environmental condition. In various embodiments, the method 2800 optionally includes, at step 2860, scanning the transmit beam over a period of time such that the transmit beam is at predefined azimuth at a predefined time. In various embodiments, the method 2800 optionally includes, at step 2870, scanning the receive beam across the elevation field of view ($FOV_{EL}$) over a period of time such that the receive beam is at predefined elevation at a predefined time. In various embodiments, the method 2800 optionally includes, at step 2880, scanning the receive beam across the elevation field of view ($FOV_{EL}$) at a receive refresh rate, wherein the receive refresh rate is greater than the transmit refresh rate.

In various embodiments, the array of transmit elements is arranged along a first axis and the array of receive elements is arranged along a second axis orthogonal to the first axis. In various embodiments, the array of transmit elements comprises at least two rows of radio frequency (RF) transmit antenna elements and the array of receive elements comprises at least two rows of RF receive antenna elements, and wherein each of the RF transmit antenna elements and each of the RF receive antenna elements is one of a patch antenna, a dipole antenna, an antenna horn, or a cup dipole antenna. In various embodiments, the method 2800 optionally includes, at step 2890, reflecting the transmit beam off of at least one object that generates the receive beam. In various embodiments, an intersection of the transmit beam and the receive beam forms an active aperture.

Figure 29:
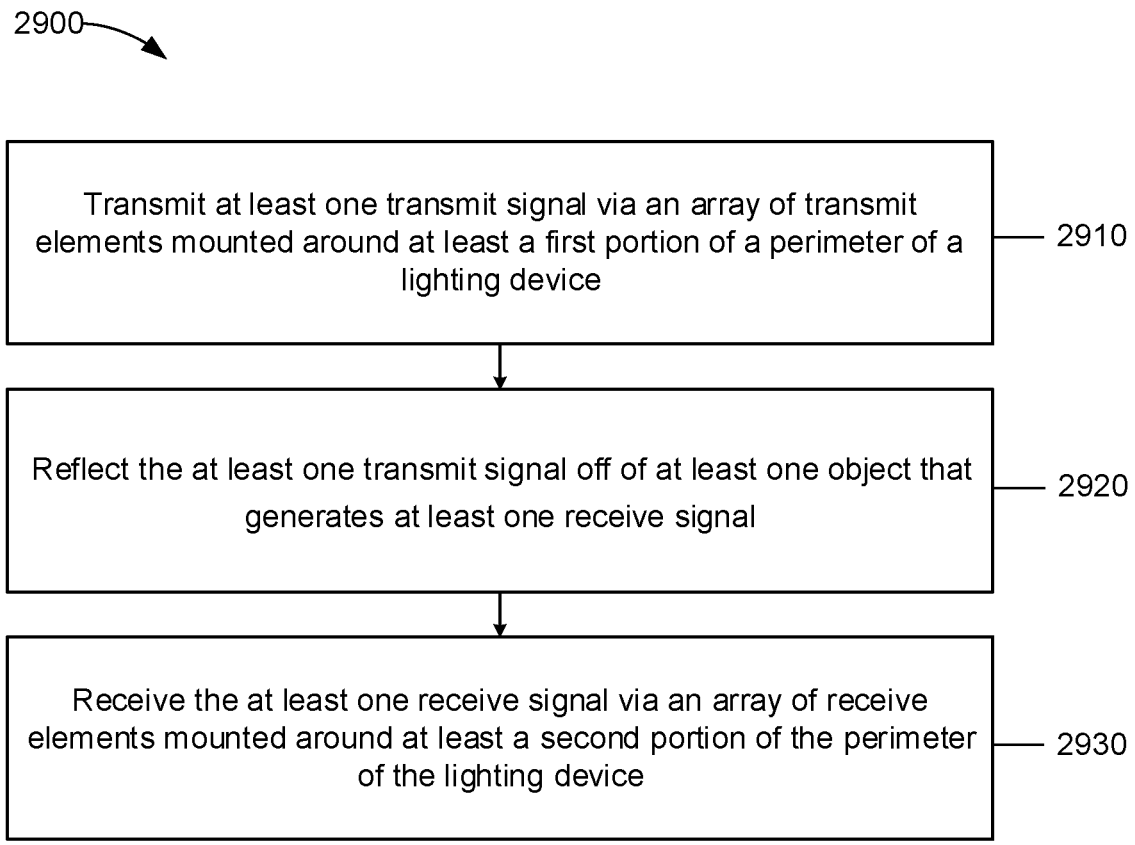
FIG. 29 illustrates a flow chart for the disclosed method for operating an integrated radar system, in accordance with some implementations of the subject technology.

FIG. 29 illustrates a flow chart for a disclosed method 2900 for operating an integrated radar system, in accordance with some implementations of the subject technology. In accordance with various embodiments, the method 2900 includes transmitting at least one transmit signal via an array of transmit elements mounted around at least a first portion of a perimeter of a lighting device at step 2910; reflecting the at least one transmit signal off of at least one object that generates at least one receive signal at step 2920; and receiving the at least one receive signal via an array of receive elements mounted around at least a second portion of the perimeter of the lighting device at step 2930.

In various embodiments, the lighting device comprises at least one light bulb or at least one light emitting diode (LED). In various embodiments, the integrated radar system is disposed on a terrestrial vehicle, a marine vehicle, an airborne vehicle, a structure, an equipment, or a device. In various embodiments, the array of transmit elements comprises at least two rows of radio frequency (RF) transmit antenna elements, and the array of receive elements comprises at least two rows of RF receive antenna elements. In various embodiments, the array of transmit elements is arranged on a first axis and the array of receive elements is arranged on a second axis orthogonal to the first axis. In various embodiments, the lighting device comprises at least one combination element comprising at least one LED and at least one RF antenna, wherein the at least one RF antenna is one of a patch antenna, a dipole antenna, an antenna horn, or a cup dipole antenna. In various embodiments, the at least one LED and the at least one RF antenna are housed together as a single unit.

Figure 30:
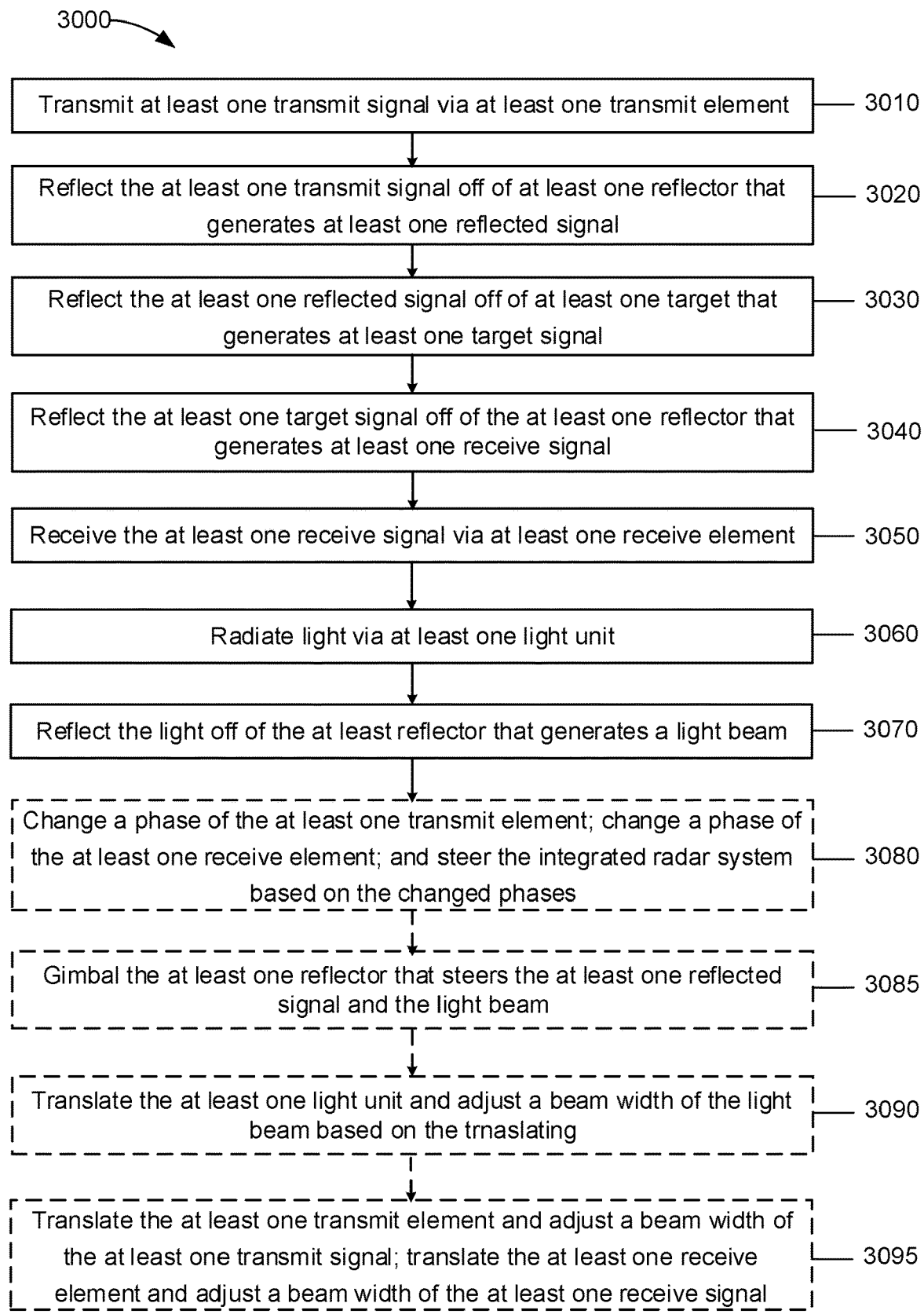
FIG. 30 illustrates a flow chart for the disclosed method for operating an integrated radar system, in accordance with some implementations of the subject technology.

FIG. 30 illustrates a flow chart for a disclosed method 3000 for operating an integrated radar system, in accordance with some implementations of the subject technology. In accordance with various embodiments, the method 3000 includes transmitting at least one transmit signal via at least one transmit element at step 3010; reflecting the at least one transmit signal off of at least one reflector that generates at least one reflected signal at step 3020; reflecting the at least one reflected signal off of at least one target that generates at least one target signal at step 3030; reflecting the at least one target signal off of the at least one reflector that generates at least one receive signal at step 3040; receiving the at least one receive signal via at least one receive element at step 3050; radiating light via at least one light unit at step 3060; and reflecting the light off of the at least reflector that generates a light beam at step 3070.

In various embodiments, the integrated radar system comprises the at least one transmit element, the at least one receive element, the at least one reflector, and the at least one light unit. In various embodiments, the integrated radar system is disposed on a terrestrial vehicle, a marine vehicle, an airborne vehicle, a structure, an equipment, or a device.

In various embodiments, the method 3000 optional includes, at step 3080, changing a phase of the at least one transmit element; changing a phase of the at least one receive element; and steering the integrated radar system based on the changed phase of the at least one transmit element and the changed phase of the at least one receive element. In various embodiments, the method 3000 optional includes, at step 3085, gimballing the at least one reflector that steers the at least one reflected signal and the light beam. In various embodiments, the method 3000 optional includes, at step 3090, translating the at least one light unit; and adjusting a beam width of the light beam based on the translating. In various embodiments, the method 3000 optional includes, at step 3095, translating the at least one transmit element; adjusting a beam width of the at least one transmit signal based on the translated at least one transmit element; translating the at least one receive element; and adjusting a beam width of the at least one receive signal based on the translated at least one receive element.

In various embodiments, each of the at least one transmit element and the at least one receive element is a radio frequency (RF) antenna, wherein the RF antenna is one of a patch antenna, a dipole antenna, an antenna horn, or a cup dipole antenna. In various embodiments, the at least one light unit is one of a light bulb or a light emitting diode (LED).

Numerous embodiments have thus been described herein. In accordance with various embodiments, a method for operating a radar system is provided. The method includes transmitting a transmit beam, the transmit beam comprising a first fan beam in an elevation plane; scanning the transmit beam in an azimuth plane across an azimuth field of view ($FOV_{AZ}$) at a transmit refresh rate; receiving a receive beam, the receive beam comprising a second fan beam in the azimuth plane; and scanning the receive beam in the elevation plane across an elevation field of view ($FOV_{EL}$).

In various embodiments, the radar system includes an array of transmit elements and an array of receive elements, wherein the array of transmit elements is configured to transmit the transmit beam and the array of receive elements is configured to transmit the receive beam.

In various embodiments, the method further includes adaptively controlling the transmit refresh rate based on an environmental condition. In various embodiments, the method further includes scanning the transmit beam over a period of time such that the transmit beam is at predefined azimuth at a predefined time. In various embodiments, the method further includes scanning the receive beam across the elevation field of view ($FOV_{EL}$) over a period of time such that the receive beam is at predefined elevation at a predefined time. In various embodiments, the method further includes scanning the receive beam across the elevation field of view ($FOV_{EL}$) at a receive refresh rate, wherein the receive refresh rate is greater than the transmit refresh rate.

In various embodiments, the array of transmit elements is arranged along a first axis and the array of receive elements is arranged along a second axis orthogonal to the first axis. In various embodiments, the array of transmit elements comprises at least two rows of radio frequency (RF) transmit antenna elements and the array of receive elements comprises at least two rows of RF receive antenna elements, and wherein each of the RF transmit antenna elements and each of the RF receive antenna elements is one of a patch antenna, a dipole antenna, an antenna horn, or a cup dipole antenna. In various embodiments, the method further includes reflecting the transmit beam off of at least one object that generates the receive beam. In various embodiments, an intersection of the transmit beam and the receive beam forms an active aperture.

In accordance with various embodiments, a radar system is provided. The system includes an array of transmit elements configured to transmit a transmit beam and to scan the transmit beam in an azimuth plane across an azimuth field of view ($FOV_{AZ}$) at a transmit refresh rate, wherein the transmit beam is a fan beam in an elevation plane, and wherein the array of transmit elements is arranged along a first axis; and an array of receive elements configured to receive a receive beam and to scan the receive beam in an elevation plane across an elevation field of view ($FOV_{EL}$) or to a predetermined elevation location.

In various embodiments, the array of receive elements is configured to scan the receive beam across the elevation field of view ($FOV_{EL}$) at a receive refresh rate, wherein the receive refresh rate is greater than the transmit refresh rate. In various embodiments, the receive beam is a fan beam in the azimuth plane, and wherein the array of receive elements is arranged along a second axis, the second axis being orthogonal to the first axis. In various embodiments, the array of transmit elements is configured to scan the transmit beam over a period of time such that the transmit beam is at predefined azimuth at a predefined time. In various embodiments, the array of receive elements is configured to scan the receive beam across the elevation field of view ($FOV_{EL}$) over a period of time such that the receive beam is at predefined elevation at a predefined time.

In various embodiments, the array of transmit elements comprises at least two rows of radio frequency (RF) transmit antenna elements, and the array of receive elements comprises at least two rows of RF receive antenna elements, wherein each of the RF transmit antenna elements and each of the RF receive antenna elements is one of a patch antenna, a dipole antenna, an antenna horn, or a cup dipole antenna.

In accordance with various embodiments, a radar system is provided. The system includes an array of transmit elements configured to transmit a transmit beam and to scan the transmit beam in an azimuth plane across an azimuth field of view ($FOV_{AZ}$) at a transmit refresh rate, wherein the array of transmit elements is arranged along a first axis; and an array of receive elements configured to receive a receive beam and to scan the receive beam in an elevation plane across an elevation field of view ($FOV_{EL}$) or to a predetermined elevation location, and wherein the array of receive elements is arranged along a second axis, the second axis being orthogonal to the first axis.

In various embodiments, the transmit beam is a first fan beam in an elevation plane and the receive beam is a second fan beam in the azimuth plane. In various embodiments, the array of receive elements is configured to scan the receive beam across the elevation field of view ($FOV_{EL}$) at a receive refresh rate, wherein the receive refresh rate is greater than the transmit refresh rate In various embodiments, the array of transmit elements comprises at least two rows of radio frequency (RF) transmit antenna elements, and the array of receive elements comprises at least two rows of RF receive antenna elements, wherein each of the RF transmit antenna elements and each of the RF receive antenna elements is one of a patch antenna, a dipole antenna, an antenna horn, or a cup dipole antenna.

In accordance with various embodiments, a method for operating an integrated radar system is provided. The method includes transmitting at least one transmit signal via an array of transmit elements mounted around at least a first portion of a perimeter of a lighting device; reflecting the at least one transmit signal off of at least one object that generates at least one receive signal; and receiving the at least one receive signal via an array of receive elements mounted around at least a second portion of the perimeter of the lighting device.

In various embodiments, the lighting device comprises at least one light bulb or at least one light emitting diode (LED). In various embodiments, the integrated radar system is disposed on a terrestrial vehicle, a marine vehicle, an airborne vehicle, a structure, an equipment, or a device. In various embodiments, the array of transmit elements comprises at least two rows of radio frequency (RF) transmit antenna elements, and the array of receive elements comprises at least two rows of RF receive antenna elements. In various embodiments, the array of transmit elements is arranged on a first axis and the array of receive elements is arranged on a second axis orthogonal to the first axis.

In various embodiments, the lighting device comprises at least one combination element comprising at least one LED and at least one RF antenna, wherein the at least one RF antenna is one of a patch antenna, a dipole antenna, an antenna horn, or a cup dipole antenna. In various embodiments, the at least one LED and the at least one RF antenna are housed together as a single unit.

In accordance with various embodiments, a radar system is provided. The system includes a lighting device; an array of transmit elements disposed on at least a first portion of a perimeter of the lighting device, wherein array of transmit elements is configured to transmit at least one transmit signal; and an array of receive elements disposed on at least a second portion of the perimeter of the lighting device, wherein the array of receive elements is configured to receive the at least one receive signal generated by a reflection of the at least one transmit signal off of at least one object.

In various embodiments, the lighting device comprises at least one of at least one light bulb or at least one light emitting diode (LED). In various embodiments, the lighting device is disposed on a terrestrial vehicle, a marine vehicle, an airborne vehicle, a structure, an equipment, or a device. In various embodiments, the array of transmit elements comprises at least two rows of radio frequency (RF) transmit antenna elements, and the array of receive elements comprises at least two rows of RF receive antenna elements. In various embodiments, the array of transmit elements is arranged on a first axis and the array of receive elements is arranged on a second axis, and wherein the first axis is orthogonal to the second axis. In various embodiments, the lighting device comprises at least one combination element comprising at least one LED and at least one RF antenna, wherein the at least one RF antenna is one of a patch antenna, a dipole antenna, an antenna horn, or a cup dipole antenna. In various embodiments, the at least one LED and the at least one RF antenna are housed together as a single unit.

In accordance with various embodiments, an integrated radar system is provided. The system includes a lighting device; and a radar system including an array of transmit elements configured to transmit at least one transmit signal, and an array of receive elements configured to receive at least one receive signal generated from a reflection of the at least one transmit signal off of at least one object. In various embodiments, the integrated radar system is disposed on a terrestrial vehicle, a marine vehicle, an airborne vehicle, a structure, an equipment, or a device. In various embodiments, the array of transmit elements and the array of receive elements are disposed on a perimeter of the lighting device. In various embodiments, the array of transmit elements is arranged on a first axis and the array of receive elements is arranged on a second axis, and wherein the first axis is orthogonal to the second axis. In various embodiments, the lighting device comprises at least one combination element comprising at least one LED and at least one RF antenna, wherein the at least one RF antenna is one of a patch antenna, a dipole antenna, an antenna horn, or a cup dipole antenna. In various embodiments, the at least one LED and the at least one RF antenna are housed together as a single unit.

In accordance with various embodiments, a method for operating an integrated radar system is provided. The method includes transmitting at least one transmit signal via at least one transmit element; reflecting the at least one transmit signal off of at least one reflector that generates at least one reflected signal; reflecting the at least one reflected signal off of at least one target that generates at least one target signal; reflecting the at least one target signal off of the at least one reflector that generates at least one receive signal; receiving the at least one receive signal via at least one receive element; radiating light via at least one light unit; and reflecting the light off of the at least reflector that generates a light beam.

In various embodiments, the integrated radar system comprises the at least one transmit element, the at least one receive element, the at least one reflector, and the at least one light unit. In various embodiments, the integrated radar system is disposed on a terrestrial vehicle, a marine vehicle, an airborne vehicle, a structure, an equipment, or a device.

In various embodiments, the method further includes changing a phase of the at least one transmit element; changing a phase of the at least one receive element; and steering the integrated radar system based on the changed phase of the at least one transmit element and the changed phase of the at least one receive element. In various embodiments, the method further includes gimballing the at least one reflector to steer the at least one reflected signal and the light beam. In various embodiments, the method further includes translating the at least one light unit; and adjusting a beam width of the light beam based on the translating. In various embodiments, the method further includes translating the at least one transmit element; adjusting a beam width of the at least one transmit signal based on the translated at least one transmit element; translating the at least one receive element; and adjusting a beam width of the at least one receive signal based on the translated at least one receive element.

In various embodiments, each of the at least one transmit element and the at least one receive element is a radio frequency (RF) antenna, wherein the RF antenna is one of a patch antenna, a dipole antenna, an antenna horn, or a cup dipole antenna. In various embodiments, the at least one light unit is one of a light bulb or a light emitting diode (LED).

In accordance with various embodiments, an integrated radar system is provided. The system includes a phased array antenna comprising at least one transmit element configured to transmit a radar signal and at least one receive element configured to receive the radar signal; at least one light unit configured to radiate light; and at least one reflector configured to reflect the radar signal and the light.

In various embodiments, the integrated radar system is disposed on a terrestrial vehicle, a marine vehicle, an airborne vehicle, a structure, an equipment, or a device. In various embodiments, each of the at least one transmit element and the at least one receive element is a radio frequency (RF) antenna, wherein the RF antenna is one of a patch antenna, a dipole antenna, an antenna horn, or a cup dipole antenna. In various embodiments, the phased array antenna is configured to steer via a phase change of the at least one transmit element or the at least one receive element. In various embodiments, a beam width of the radar signal is adjusted via a translation of the at least one transmit element or the at least one receive element. In various embodiments, the at least one light unit is one of a light bulb or a light emitting diode (LED).

In accordance with various embodiments, a radar system is provided. The system includes at least one reflector; at least one transmit element configured to transmit at least one signal; at least one receive element configured to receive the at least one signal; and at least one light unit configured to radiate light, wherein the at least one reflector reflects the light that generates a light beam.

In various embodiments, the radar system is disposed on a terrestrial vehicle, a marine vehicle, an airborne vehicle, a structure, an equipment, or a device. In various embodiments, each of the at least one transmit element and the at least one receive element is a radio frequency (RF) antenna, wherein the RF antenna is one of a patch antenna, a dipole antenna, an antenna horn, or a cup dipole antenna. In various embodiments, a phase of the at least one transmit element or the at least one receive element is changed for steering of the radar system. In various embodiments, a beam width of the at least one signal is adjusted via a translation of the at least one transmit element or the at least one receive element.

In accordance with various embodiments, a method for operation of a radar system is provided. The method includes transmitting, by an array of transmit elements, a transmit beam, wherein the transmit beam is a fan beam in an elevation plane. In some embodiments, the array of transmit elements is arranged along a first axis. The method also includes scanning, by the array of transmit elements, the transmit beam in an azimuth plane across an azimuth field of view ($FOV_{AZ}$) at a transmit refresh rate. The method further includes receiving, by an array of receive elements, a receive beam, wherein the receive beam is a fan beam in the azimuth plane. In some embodiments, the array of receive elements is arranged along a second axis. The method includes scanning, by the array of receive elements, the receive beam in an elevation plane across an elevation field of view ($FOV_{EL}$) or to a predetermined elevation location.

In some embodiments, the transmit refresh rate is variable. In some embodiments, the method further includes adaptively controlling the transmit refresh rate. In some embodiments, the transmit beam is scanned over a period of time such that the transmit beam is at predefined azimuth at a predefined time.

In some embodiments, the receive beam is scanned across the elevation field of view ($FOV_{EL}$) over a period of time such that the receive beam is at predefined elevation at a predefined time. In some embodiments, the receive beam is scanned across the elevation field of view ($FOV_{EL}$) at a receive refresh rate. In some embodiments, the receive refresh rate is greater than the transmit refresh rate. In some embodiments, the second axis is orthogonal to the first axis.

In some embodiments, the array of transmit elements includes at least two rows of radio frequency (RF) transmit antenna elements, and the array of receive elements includes at least two rows of RF receive antenna elements. In some embodiments, each of the RF transmit antenna elements and each of the RF receive antenna elements is one of a patch antenna, a dipole antenna, an antenna horn, or a cup dipole antenna.

In some embodiments, the method further includes reflecting the transmit beam off of at least one object that generates the receive beam. In some embodiments, an intersection of the transmit beam and the receive beam forms an active aperture.

In accordance with various embodiments, a radar system is provided. The system includes an array of transmit elements to transmit a transmit beam and to scan the transmit beam in an azimuth plane across an azimuth field of view ($FOV_{AZ}$) at a transmit refresh rate. In some embodiments, the transmit beam is a fan beam in an elevation plane, and wherein the array of transmit elements is arranged along a first axis. The system also includes an array of receive elements to receive a receive beam and to scan the receive beam in an elevation plane across an elevation field of view ($FOV_{EL}$) or to a predetermined elevation location. In some embodiments, the receive beam is a fan beam in the azimuth plane and the array of receive elements is arranged along a second axis.

In some embodiments, the array of transmit elements is configured to scan the transmit beam over a period of time such that the transmit beam is at predefined azimuth at a predefined time. In some embodiments, the array of receive elements is configured to scan the receive beam across the elevation field of view ($FOV_{EL}$) over a period of time such that the receive beam is at predefined elevation at a predefined time. In some embodiments, the array of receive elements is configured to scan the receive beam across the elevation field of view ($FOV_{EL}$) at a receive refresh rate. In some embodiments, the receive refresh rate is greater than the transmit refresh rate. In some embodiments, the second axis is orthogonal to the first axis.

In some embodiments, the array of transmit elements includes at least two rows of radio frequency (RF) transmit antenna elements and the array of receive elements includes at least two rows of RF receive antenna elements. In some embodiments, each of the RF transmit antenna elements and each of the RF receive antenna elements is one of a patch antenna, a dipole antenna, an antenna horn, or a cup dipole antenna.

In accordance with various embodiments, a method for operation of a radar system is provided. The method includes transmitting, by an array of transmit elements, at least one transmit signal, wherein the array of transmit elements is configured around at least a first portion of a perimeter of a lighting device; reflecting the at least one transmit signal off of at least one object that generates at least one receive signal, and receiving, by an array of receive elements, the at least one receive signal, wherein the array of receive elements is configured around at least a second portion of the perimeter of the lighting device.

In some embodiments, the lighting device includes at least one of at least one light bulb or at least one light emitting diode (LED). In some embodiments, one of a vehicle, a structure, or a device includes the lighting device. In some embodiments, the vehicle is one of a terrestrial vehicle, a marine vehicle, or an airborne vehicle. In some embodiments, the array of transmit elements includes at least two rows of radio frequency (RF) transmit antenna elements and the array of receive elements comprises at least two rows of RF receive antenna elements. In some embodiments, the array of transmit elements is arranged on a first axis and the array of receive elements is arranged on a second axis, and wherein the first axis is orthogonal to the second axis.

In some embodiments, the lighting device comprises at least one combination element. In some embodiments, each of the at least one combination element comprises at least one LED and at least one RF antenna. In some embodiments, each of the at least one RF antenna is one of a patch antenna, a dipole antenna, an antenna horn, or a cup dipole antenna. In some embodiments, the at least one LED and the at least one RF antenna of each of the at least one combination element are housed together as a single unit. In some embodiments, the lighting device includes a plurality of LEDs and a plurality of RF antennas.

In accordance with various embodiments, a radar system is provided. The system includes a lighting device, an array of transmit elements to transmit at least one transmit signal, wherein the at least one transmit signal reflects off of at least one object that generates at least one receive signal, and wherein the array of transmit elements is configured around at least a first portion of a perimeter of the lighting device, and an array of receive elements to receive the at least one receive signal, wherein the array of receive elements is configured around at least a second portion of the perimeter of the lighting device.

In some embodiments, the lighting device includes at least one of at least one light bulb or at least one light emitting diode (LED). In some embodiments, one of a vehicle, a structure, or a device comprises the lighting device. In some embodiments, the vehicle is one of a terrestrial vehicle, a marine vehicle, or an airborne vehicle. In some embodiments, the array of transmit elements includes at least two rows of radio frequency (RF) transmit antenna elements, and the array of receive elements includes at least two rows of RF receive antenna elements. In some embodiments, the array of transmit elements is arranged on a first axis and the array of receive elements is arranged on a second axis, and wherein the first axis is orthogonal to the second axis. In some embodiments, the lighting device includes at least one combination element. In some embodiments, each of the at least one combination element comprises at least one LED and at least one RF antenna. In some embodiments, each of the at least one RF antenna is one of a patch antenna, a dipole antenna, an antenna horn, or a cup dipole antenna.

In accordance with various embodiments, a method for operation of a radar system is provided. The method includes transmitting, by at least one transmit element, at least one transmit signal, reflecting the at least one transmit signal off of at least one reflector that generates at least one reflected signal, reflecting the at least one reflected signal off of at least one target that generates at least one target signal, reflecting the at least one target signal off of the at least one reflector that generates at least one receive signal, receiving, by at least one receive element, the at least one receive signal, radiating, by at least one light unit, light, and reflecting the light off of the at least reflector that generates a light beam, wherein a lighting device includes the at least one transmit element, the at least one receive element, the at least one reflector, and the at least one light unit.

In some embodiments, the at least one light unit is one of a light bulb or a light emitting diode (LED). In some embodiments, the lighting device is employed in one of a vehicle, a structure, or a device. In some embodiments, the vehicle is one of a terrestrial vehicle, a marine vehicle, or an airborne vehicle. In some embodiments, a phased array antenna includes the at least one transmit element and the at least one receive element. In some embodiments, the method further includes steering, by the phased array antenna, the at least one transmit element by changing a phase of the at least one transmit element. In some embodiments, the method further includes steering, by the phased array antenna, the at least one receive element by changing a phase of the at least one receive element. In some embodiments, each of the at least one transmit element is a radio frequency (RF) antenna, and wherein each of the at least one receive element is an RF antenna. In some embodiments, each of the at least one transmit element is one of a patch antenna, a dipole antenna, an antenna horn, or a cup dipole antenna and each of the at least one receive element is one of a patch antenna, a dipole antenna, an antenna horn, or a cup dipole antenna.

In some embodiments, the method further includes gimballing at least one of the at least one reflector to steer the at least one reflected signal and the light beam. In some embodiments, the method further includes translating the at least one transmit element to adjust a beam width of the at least one transmit signal. In some embodiments, the method further includes translating the at least one receive element to adjust a beam width of the at least one receive signal. In some embodiments, the at least one transmit element and the at least one receive element are mounted together. In some embodiments, the method further includes translating the at least one light unit to adjust a beam width of the light beam.

In accordance with various embodiments, a radar system is provided. The system includes at least one reflector, at least one transmit element configured to transmit at least one transmit signal, wherein the at least one transmit signal reflects off of the at least one reflector to generate at least one reflected signal, wherein the at least one reflected signal reflects off of at least one target to generate at least one target signal, and wherein the at least one target signal reflects off of the at least one reflector to generate at least one receive signal, at least one receive element configured to receive the at least one receive signal, and at least one light unit configured to radiate light, wherein the light off reflects of the at least reflector to generate a light beam.

In some embodiments, the at least one light unit is one of a light bulb or a light emitting diode (LED). In some embodiments, the system is employed in one of a vehicle, a structure, or a device. In some embodiments, the vehicle is one of a terrestrial vehicle, a marine vehicle, or an airborne vehicle. In some embodiments, the system further includes a phased array antenna, which comprises the at least one transmit element and the at least one receive element. In some embodiments, each of the at least one transmit element is a radio frequency (RF) antenna, and wherein each of the at least one receive element is an RF antenna.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A method for operating an integrated radar system in a vehicle, the method comprising:
   transmitting at least one transmit signal via an array of transmit elements mounted around at least a first portion of a perimeter of a lighting device;
   reflecting the at least one transmit signal off of at least one object that generates at least one receive signal;
   receiving the at least one receive signal via an array of receive elements mounted around at least a second portion of the perimeter of the lighting device, wherein the array of receive elements are arranged orthogonally to the array of transmit elements; and
   implementing a set of receive guard antennas as side lobe filters, wherein a first receive guard antenna of the set of receive guard antennas is arranged at a first end of the array of receive elements and a second receive guard antenna of the set of receive guard antennas is arranged at a second end of the array of receive elements, the second end is opposite the first end.

2. The method of claim 1, wherein the lighting device comprises at least one light bulb or at least one light emitting diode (LED).

3. The method of claim 1, wherein the integrated radar system is disposed on a terrestrial vehicle, a marine vehicle, an airborne vehicle, a structure, an equipment, or a device.

4. The method of claim 1, wherein the array of transmit elements comprises at least two rows of radio frequency (RF) transmit antenna elements, and the array of receive elements comprises at least two rows of RF receive antenna elements.

5. The method of claim 1, wherein the array of transmit elements is arranged on a first axis and the array of receive elements is arranged on a second axis orthogonal to the first axis.

6. The method of claim 1, wherein the lighting device comprises at least one combination element comprising at least one LED and at least one RF antenna, wherein the at least one RF antenna is one of a patch antenna, a dipole antenna, an antenna horn, or a cup dipole antenna.

7. The method of claim 6, wherein the at least one LED and the at least one RF antenna are housed together as a single unit.

8. A radar system, comprising:
   a lighting device;
   an array of transmit elements disposed on at least a first portion of a perimeter of the lighting device, wherein the array of transmit elements is configured to transmit at least one transmit signal;
   an array of receive elements disposed on at least a second portion of the perimeter of the lighting device, wherein the array of receive elements is configured to receive at least one receive signal generated by a reflection of the at least one transmit signal off of at least one object, wherein the array of receive elements is configured orthogonal to the array of transmit elements; and
   a set of receive guard antennas as side lobe filters, wherein a first receive guard antenna of the set of receive guard antennas is arranged at a first end of the array of receive elements and a second receive guard antenna of the set of receive guard antennas is arranged at a second end of the array of receive elements, the second end is opposite the first end.

9. The radar system of claim 8, wherein the lighting device comprises at least one of at least one light bulb or at least one light emitting diode (LED).

10. The radar system of claim 8, wherein the lighting device is disposed on a terrestrial vehicle, a marine vehicle, an airborne vehicle, a structure, an equipment, or a device.

11. The radar system of claim 8, wherein the array of transmit elements comprises at least two rows of radio frequency (RF) transmit antenna elements, and the array of receive elements comprises at least two rows of RF receive antenna elements.

12. The radar system of claim 8, wherein the array of transmit elements is arranged on a first axis and the array of receive elements is arranged on a second axis orthogonal to the first axis.

13. The radar system of claim 8, wherein the lighting device comprises at least one combination element comprising at least one LED and at least one RF antenna, wherein the at least one RF antenna is one of a patch antenna, a dipole antenna, an antenna horn, or a cup dipole antenna.

14. The radar system of claim 13, wherein the at least one LED and the at least one RF antenna are housed together as a single unit.

15. An integrated radar system, comprising:
   a lighting device; and
   a radar system comprising:
      an array of transmit elements configured to transmit at least one transmit signal,
      an array of receive elements positioned orthogonal to the array of transmit element and configured to receive at least one receive signal generated from a reflection of the at least one transmit signal off of at least one object; and a set of receive guard antennas as side lobe filters, wherein a first receive guard antenna of the set of receive guard antennas is arranged at a first end of the array of receive elements and a second receive guard antenna of the set of receive guard antennas is arranged at a second end of the array of receive elements, the second end is opposite the first end.

16. The integrated radar system of claim 15, wherein the integrated radar system is disposed on a terrestrial vehicle, a marine vehicle, an airborne vehicle, a structure, an equipment, or a device.

17. The integrated radar system of claim 15, wherein the array of transmit elements and the array of receive elements are disposed on a perimeter of the lighting device.

18. The integrated radar system of claim 15, wherein the array of transmit elements is arranged on a first axis and the array of receive elements is arranged on a second axis orthogonal to the first axis.

19. The integrated radar system of claim 15, wherein the lighting device comprises at least one combination element comprising at least one LED and at least one RF antenna, wherein the at least one RF antenna is one of a patch antenna, a dipole antenna, an antenna horn, or a cup dipole antenna.

20. The integrated radar system of claim 19, wherein the at least one LED and the at least one RF antenna are housed together as a single unit.

* * * * *